(12) United States Patent
Gao et al.

(10) Patent No.: US 9,374,406 B2
(45) Date of Patent: Jun. 21, 2016

(54) DASH CLIENT AND RECEIVER WITH A DOWNLOAD RATE ESTIMATOR

(71) Applicant: QUALCOMM Incorporated, San Diego, CA (US)

(72) Inventors: Qiang Gao, San Diego, CA (US); Michael George Luby, Berkeley, CA (US); Yinian Mao, San Diego, CA (US); Lorenz Christoph Minder, Berkeley, CA (US)

(73) Assignee: QUALCOMM Incorporated, San Diego, CA (US)

( * ) Notice: Subject to any disclaimer, the term of this patent is extended or adjusted under 35 U.S.C. 154(b) by 95 days.

(21) Appl. No.: 13/745,799

(22) Filed: Jan. 19, 2013

(65) Prior Publication Data

US 2014/0156863 A1    Jun. 5, 2014

Related U.S. Application Data

(60) Provisional application No. 61/603,569, filed on Feb. 27, 2012.

(51) Int. Cl.
*G06F 15/16* (2006.01)
*H04L 29/06* (2006.01)
(Continued)

(52) U.S. Cl.
CPC ............ *H04L 65/60* (2013.01); *H04L 65/4084* (2013.01); *H04L 65/608* (2013.01);
(Continued)

(58) Field of Classification Search
CPC ....... H04L 1/0002; H04L 47/10; H04L 47/30; H04L 47/263; H04L 43/0888; H04L 43/0894; H04N 21/2401; H04N 21/2402; H04N 21/23805; H04N 21/44209; H04N 21/6373; H04W 28/22

USPC ......... 709/203, 217, 219, 224, 228, 231, 232, 709/233, 235; 370/229, 231, 232, 235, 241, 370/252; 710/29, 60
See application file for complete search history.

(56) References Cited

U.S. PATENT DOCUMENTS 6,058,109 A *  5/2000  Lechleider ................... 370/352
6,247,072 B1   6/2001  Firestone
(Continued)

FOREIGN PATENT DOCUMENTS

WO    2010111261 A1    9/2010

OTHER PUBLICATIONS

Tullimas S., et al., "Multimedia Streaming Using Multiple TCP Connections," ACM Transactions on Multimedia Computing, Communications and Applications, May 2008, vol. 4 (2), Article 12, pp. 1-20.
(Continued)

*Primary Examiner* — Liangche A Wang
*Assistant Examiner* — Johnny Aguiar
(74) *Attorney, Agent, or Firm* — Campbell C. Chiang

(57) ABSTRACT

A client device presents streaming media and includes a stream manager for controlling streams, a request accelerator for making network requests for content, a source component coupled to the stream manager and the request accelerator for determining which requests to make, a network connection, and a media player. A process for rate estimation is provided that will react quickly to reception rate changes. The rate estimator can use an adaptive windowed average and take into account the video buffer level and the change in video buffer level in a way so to guarantee that the rate adjusts fast enough if there is a need, while keeping the windowing width large (and thus the measurement variance) large. A guarantee might be that when a rate drop or rise happens, the estimator adjusts its estimate within a time proportional to a buffer drain rate or buffer fill level.

17 Claims, 33 Drawing Sheets

(51) Int. Cl.
*H04L 12/801* (2013.01)
*H04L 12/835* (2013.01)
*H04L 12/825* (2013.01)
*H04L 12/26* (2006.01)
*H04N 21/24* (2011.01)
*H04N 21/442* (2011.01)
*H04N 21/6373* (2011.01)
*H04W 28/22* (2009.01)

(52) U.S. Cl.
CPC ............ *H04L 65/80* (2013.01); *H04L 43/0888* (2013.01); *H04L 43/0894* (2013.01); *H04L 47/10* (2013.01); *H04L 47/263* (2013.01); *H04L 47/30* (2013.01); *H04N 21/2401* (2013.01); *H04N 21/2402* (2013.01); *H04N 21/44209* (2013.01); *H04N 21/6373* (2013.01); *H04W 28/22* (2013.01)

(56) References Cited

U.S. PATENT DOCUMENTS

| | | | |
|---|---|---|---|
| 6,978,306 B2 | 12/2005 | Miller et al. | |
| 7,721,315 B2 | 5/2010 | Brown et al. | |
| 7,821,937 B1 | 10/2010 | Guo | |
| 7,886,073 B2 | 2/2011 | Gahm et al. | |
| 7,895,629 B1 | 2/2011 | Shen et al. | |
| 8,462,684 B1 | 6/2013 | Kopikare et al. | |
| 2002/0048259 A1* | 4/2002 | Adam et al. | 370/230 |
| 2002/0122385 A1 | 9/2002 | Banerjee | |
| 2003/0063564 A1 | 4/2003 | Ha et al. | |
| 2003/0165150 A1* | 9/2003 | Zimmermann et al. | 370/412 |
| 2004/0250286 A1 | 12/2004 | Fraser et al. | |
| 2005/0005024 A1 | 1/2005 | Samuels et al. | |
| 2005/0071451 A1 | 3/2005 | Key et al. | |
| 2005/0147033 A1 | 7/2005 | Chin et al. | |
| 2005/0223141 A1 | 10/2005 | Seto et al. | |
| 2005/0265345 A1 | 12/2005 | Chen et al. | |
| 2005/0271357 A1 | 12/2005 | Adler et al. | |
| 2006/0215574 A1 | 9/2006 | Padmanabhan et al. | |
| 2006/0282566 A1* | 12/2006 | Virdi et al. | 710/52 |
| 2007/0008883 A1 | 1/2007 | Kobayashi | |
| 2007/0055967 A1 | 3/2007 | Poff et al. | |
| 2007/0076621 A1 | 4/2007 | Malhotra et al. | |
| 2007/0076726 A1 | 4/2007 | Weston et al. | |
| 2007/0169161 A1 | 7/2007 | Kienzle et al. | |
| 2007/0204056 A1 | 8/2007 | Deshpande | |
| 2008/0022005 A1 | 1/2008 | Wu et al. | |
| 2008/0175262 A1 | 7/2008 | Kawano et al. | |
| 2009/0089445 A1* | 4/2009 | Deshpande | 709/231 |
| 2010/0017533 A1 | 1/2010 | Han | |
| 2010/0054123 A1 | 3/2010 | Yong | |
| 2010/0082833 A1 | 4/2010 | Masunaga et al. | |
| 2010/0146145 A1 | 6/2010 | Tippin et al. | |
| 2011/0013514 A1* | 1/2011 | Mahkonen | 370/235 |
| 2011/0090795 A1 | 4/2011 | Li et al. | |
| 2011/0096828 A1 | 4/2011 | Chen et al. | |
| 2011/0137984 A1 | 6/2011 | Kim et al. | |
| 2011/0138427 A1* | 6/2011 | Shen et al. | 725/62 |
| 2011/0310800 A1 | 12/2011 | Lin et al. | |
| 2012/0023254 A1 | 1/2012 | Park et al. | |
| 2012/0059951 A1 | 3/2012 | Gutarin et al. | |
| 2012/0137019 A1 | 5/2012 | Kotecha et al. | |
| 2012/0140621 A1 | 6/2012 | Wu et al. | |
| 2012/0179834 A1 | 7/2012 | Van Der Schaar et al. | |
| 2012/0210216 A1 | 8/2012 | Hurst | |
| 2012/0263058 A1 | 10/2012 | Constantine | |
| 2013/0033985 A1 | 2/2013 | Nakagawa et al. | |
| 2013/0046857 A1 | 2/2013 | Howe | |
| 2013/0046902 A1 | 2/2013 | Villegas et al. | |
| 2013/0227080 A1 | 8/2013 | Gao et al. | |
| 2013/0227081 A1 | 8/2013 | Luby et al. | |
| 2013/0227122 A1 | 8/2013 | Gao et al. | |
| 2013/0227158 A1 | 8/2013 | Miller et al. | |
| 2014/0101330 A1* | 4/2014 | Xu et al. | 709/231 |
| 2014/0136653 A1 | 5/2014 | Luby et al. | |
| 2015/0032899 A1 | 1/2015 | Willars et al. | |

OTHER PUBLICATIONS

Begen, A., et al., "Watching Video over the Web: Part 1: Streaming Protocols", IEEE Internet Computing, IEEE Service Center, New York, NY.—Institute of Electrical and Electronics Engineers, US, vol. 15, No. 2, Mar. 1, 2011, pp. 54-63, XP011363531, ISSN: 1089-7801, DOI: 10.1109/MIC.2010.155 the whole document.

International Search Report and Written Opinion—PCT/US2013/027807—ISA/EPO—Jul. 2, 2013.

Kuschnig, R., et al., "Improving Internet Video Streaming Performance by Parallel TCP-Based Request-Response Streams", Consumer Communications and Networking Conference (CCNC), 2010 7th IEEE, IEEE, Piscataway, NJ, USA, Jan. 9, 2010, pp. 1-5, XP031642982.

Mok, R.K.P., et al., "QDASH: A QoE-aware DASH system", Proceeding MMSys '12 Proceedings of the 3rd Multimedia Systems Conference, Feb. 24, 2012, pp. 11-22, XP055065409, NY, USA, DOI: 10.1145/2155555.2155558 ISBN: 978-1-45-031131-1 Retrieved from the Internet: URL:http://dl.acm.org.citation.cfm?id=2155558 [retrieved on Jun. 5, 2013] the whole document.

Nguyen, T., et al., "Multimedia streaming using multiple TCP connections", Performance, Computing, and Communications Conference, 2005. IPCCC 2005. 24th IEEE International Phoenix, AZ, USA Apr. 7-9, 2005, Piscataway, NJ, USA IEEE, Apr. 7, 2005, pp. 215-223, XP010812713, ISBN: 978-0-7803-8991-5.

Qualcomm Incorporated: "Discussion paper on QoS support for DASH", 3GPP Draft; S4-110874_DASH_QOS, 3rd Generation Partnership Project (3GPP), Mobile Competence Centre ;650, Route Des Lucioles ; F-06921 Sophia-Antipolis Cedex ;France,vol. SA WG4, no. Jeju Island, Korea; 20111107-20111111, Nov. 5, 2011, XP050577906, [retrieved on Nov. 5, 2011] p. 8.

Sodagar I., "The MPEG-DASH Standard for Multimedia Streaming Over the Internet", IEEE Multimedia, vol. 18, No. 4, Apr. 1, 2011, pp. 62-67, XP011378371, ISSN: 1070-986X, DOI: 10.1109/MMUL.2011.71.

Stockhammer, T., "Dynamic Adaptive Streaming over HTTP Design Principles and Standards", Second W3C Web and TV Workshop, Jan. 22, 2011, pp. 1-3, XP007916969, Retrieved from the Internet: URL :http://www.w3.org/2010/11/web-and-tv/papers.html [retrieved on Feb. 2, 2011] the whole document.

Tunali, T., et al., "Adaptive available bandwidth estimation for internet video streaming", Signal Processing. Image Communication, Elsevier Science Publishers, Amsterdam, NL, vol. 21, No. 3, Mar. 1, 2006, pp. 217-234, XP027934232, ISSN: 0923-5965 [retrieved on Mar. 1, 2006] the whole document.

Wu Huawei Q: "HTTP streaming optimization Problem Statement; draft-wu-http-streaming-optimization-ps-00.txt", HTTP Streaming Optimization Problem Statement; draft-wu-http-streaming-optimization-ps.00.txt, Internet Enginnering Task Force, IETF; StandrardWorkingDraft, Internet Society (ISOC) 4, Rue Des Falaises CH-1205, Geneva, Witzerland, Jul. 5, 2010, pp. 1-19, XP015069722.

* cited by examiner

```
for every representation group i do
    m ← smallest available rate for this group
    for j = 1, ... , N_i do
        if representation-rate(F_{i,j}) = m then
            continue
        end if
        u ← starttime(F_{i,j}) – T
        R ← aggregate rate over max(u, 300ms)
        if R cannot be computed then
            Continue
        end if
        d_avail ← R u
        d_need ← (1 – α (F_{i,j})) ·size(F_{i,j})
        if d_avail < d_need and d_need > R ·duration (F_{i,j}) then
            return (i,j)
        end if
    end for
end for
return nil
```

*FIG. 29*

$S \leftarrow$ the size of the original request
$N_{\text{target}} \leftarrow$ the target number of connections
$R \leftarrow$ rate estimate over the last $T_{wn}$
$RTT \leftarrow$ RTT estimate
if no valid RTT estimate or no valid rate estimate is known then
    $n \leftarrow N_{\text{target}}$
    return $n$
end if
$D \leftarrow \max(D_{\min}, c_S \cdot RTT)$
if $S < R \cdot D$ then
    $n \leftarrow \dfrac{N_{\text{target}} \cdot S}{R \cdot D}$
else
    $n \leftarrow N_{\text{target}}$
end if
return $n$

Let v[1], ..., v[n-1] be iid random variables chosen uniformly
in the range [0,1]

Sort the v[] in ascending order for i = 1, ..., n-1:
      w[i] := (1 - a)*i/n +a*v[i]

w[n] := 1 prev := 0 for i = 1, ..., n
      x := floor(w[i] * S)
      s[i] := x- prev
      prev := x Sort the vector s[] in decreasing size order
return s[1], ..., s[n]
```

*FIG. 34*

MLB parameter set:

| T | lambda | mu |
|---|---|---|
| 0 | 0.4*R | 0.9 |

Conservative parameter set:

| t | lambda | mu |
|---|---|---|
| 0 | 0.2 | 0.2 |
| 1 | 0.4 | 0.3 |
| 2 | 0.5 | 0.4 |
| 3 | 0.5 | 0.7 |
| 4 | 0.5 | 0.9 |

Moderate parameter set:

| t | lambda | mu |
|---|---|---|
| 0 | 0.4 | 0.3 |
| 1 | 0.5 | 0.4 |
| 2 | 0.6 | 0.8 |
| 3 | 0.7 | 1.0 |
| 4 | 0.8 | 1.2 |

Aggressive parameter set:

| t | lambda | mu |
|---|---|---|
| 0 | 0.6 | 0.5 |
| 1 | 0.7 | 0.6 |
| 2 | 0.8 | 1.0 |
| 3 | 0.9 | 1.5 |
| 4 | 1.0 | 2.0 |

*FIG. 36*

DASH CLIENT AND RECEIVER WITH A DOWNLOAD RATE ESTIMATOR

CROSS-REFERENCE TO RELATED APPLICATIONS

The present application claims the benefit of U.S. Provisional Application No. 61/603,569 entitled "Improved DASH Client and Receiver with Rate Adaptation and Downloading for Adaptive Video," filed Feb. 27, 2012, the entire contents of which is herein incorporated by reference in its entirety for all purposes.

BACKGROUND OF THE INVENTION

DASH refers to "Dynamic Adaptive Streaming over HTTP." Using DASH, a content provider formats content into segments, fragments, representations, adaptations and the like, along with associated metadata such as MPD files and stores all of those as files available via a standard HTTP server or a specialized HTTP server. A DASH client is a receiver that obtains these files as needed to present a presentation to a user of the DASH client.

DASH clients have tight constraints, as users typically want high-quality streaming, with little or no advance notice, in environments where networks are constrained. Thus, improved DASH clients are desirable.

BRIEF SUMMARY OF THE INVENTION

A client device presents streaming media and includes a stream manager for controlling streams, a request accelerator for making network requests for content, a source component coupled to the stream manager and the request accelerator for determining which requests to make, a network connection, and a media player. The request accelerator comprises a request data buffer for buffering requests and logic for returning complete responses to each request it can respond to. The stream manager, the request accelerator, and the source component can be implemented as processor instructions or program code, the client device further comprising program memory, working memory, a processor, and a power source. The client device may also include a display and a user input device. The client tasks are parsed among the source component, stream manager, and request accelerator to efficiently stream data.

In various aspects, as described herein, the client can perform operations such as determining when to maintain a representation or switch to another representation, determine which fragments to request and ensure that the media player can obtain, in most conditions, sufficient data to continue a stream without stalling.

A process for rate estimation is provided that will react quickly to reception rate changes. The download rate estimator can use an adaptive windowed average, specially tailored for use in media streaming. A download rate estimator takes into account the video buffer level and the change in video buffer level in a way so as to guarantee that the rate adjusts fast enough if there is a need, while keeping the windowing width large (and thus the measurement variance) large. The guarantees provided by the process might be that (a) If B is the amount of video data (in seconds of playback time) in the buffer when a rate drop happens, then the estimator will have adjusted its rate estimate within the time it takes for the buffer to drain to B/2, and (b) if B is the amount of data in the buffer while a rate increase happens, the rate estimator adjusts quickly enough to the new rate so it could in principle be seen within time at most 3*B (provided a smart rate changing process).

In an example method or apparatus, a receiver monitors a presentation buffer of the receiver, wherein the presentation buffer stores media data at least between a time the media data is received and a time the media data is consumed by a presentation element associated with the receiver, determines a nonzero estimation period over which an estimate of the download rate is to be based, stores indications of buffer levels over the estimation period, wherein a buffer level at a given time corresponds to how much of the presentation buffer is occupied at that time, at least approximately, by the media data that is received and not yet consumed by the presentation element, and uses the stored indications as part of a measure of the estimated download rate.

The presentation element can comprise a display and an audio output. The estimation period over which the download rate is measured might have a duration proportional to a measured buffer level, with a predetermined proportionality factor, such as a duration proportional to the number of bytes of unconsumed media data in the presentation buffer at a measuring time, and/or a function of an addition rate at which media is added to the presentation buffer and/or proportional to a time in use to download a predetermined portion of the presentation buffer, such as when the estimated download rate is an average download rate over a previous duration of time equal to the estimation period.

The estimation period can be the lesser of the time over which a predetermined proportion of the contents of the presentation buffer was downloaded and the presentation time of the media data present in the presentation buffer. The estimated download rate can be an average download rate over a previous duration of time equal to the estimation period.

Various elements might be implemented using computer readable media for execution by a processor for controlling data downloading over a network path between a source and a receiver coupled by the network path. The computer readable media could be a non-transitory computer readable medium.

Other aspects of the invention should be apparent from this description.

BRIEF DESCRIPTION OF THE DRAWINGS

FIG. 29 illustrates a process for request cancellation detection.

FIG. 33 illustrates a process for finding a number of sub-requests to make for a given fragment request.

FIG. 34 illustrates a process for selecting individual requests chosen to be disjoint intervals of source requests having computed sizes.

FIG. 36 comprises tables of values as might be used for lambda and mu in rate selection.

DETAILED DESCRIPTION OF THE INVENTION

Figure 2:
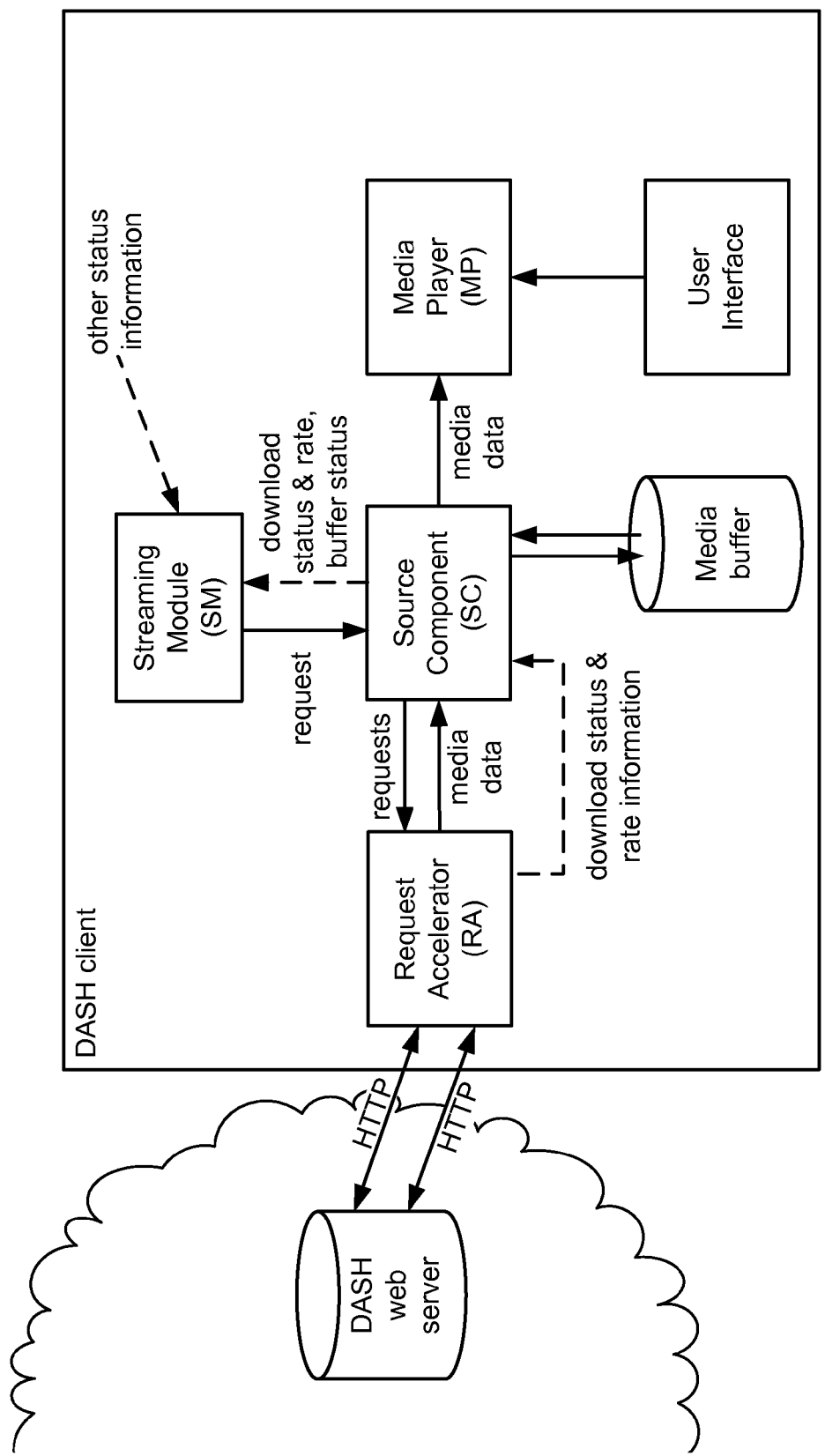
FIG. 2 shows an example architecture of a DASH client with the different components, including a stream manager, a request accelerator, a source component, a network connection, and a media player.

The DASH client explained herein includes a Stream Manager (SM), a Request Accelerator (RA), a Source Component (SC), a network connection, and a media player as illustrated in FIG. 2. The DASH client might also include one or more media data buffers. In some implementations, the RA, SC and media player might all have their own data buffers, or logical partitions of one large data buffer. In other implementations, perhaps only the RA has a data buffer for buffering requests so that it is able to return a complete response to every request it can respond to and the media player uses whatever data buffer the SC has set up. The SM may have local storage of its own (physical or logical) for storing metadata needed to make its decisions.

Figure 1:
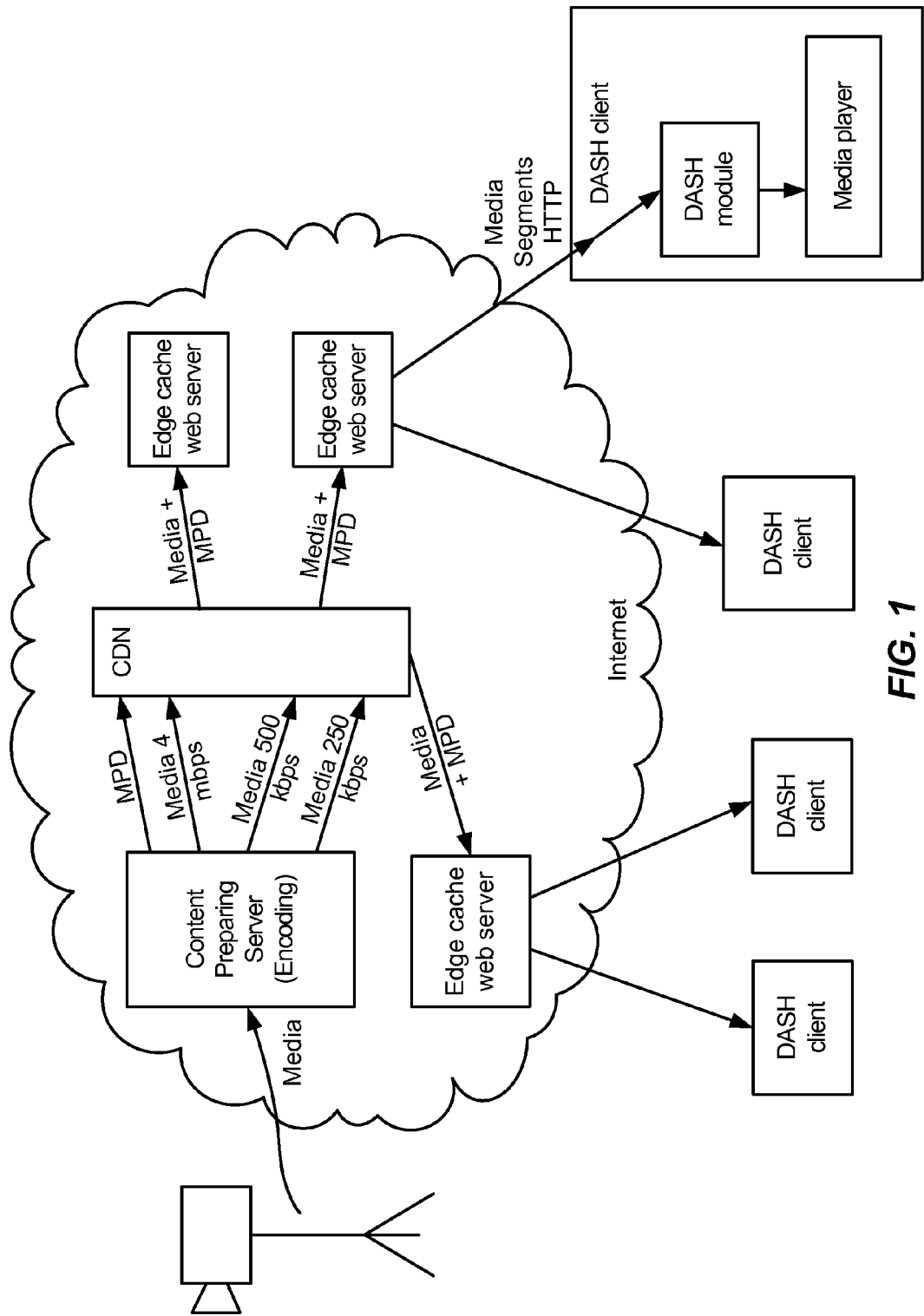
FIG. 1 illustrates various elements including a DASH client in a DASH deployment, displaying how a media recording arrives at the end user involving the recording, content preparation and content delivery stages.

FIG. 1 illustrates a DASH deployment, with a DASH client.

FIG. 2 shows an example architecture of a DASH client with the different components. It should be understood that the SM, RA, SC and media player might be implemented in hardware, software or some combination. Thus, where a functionality is ascribed to a component, it might be implemented as processor instructions, program code, or the like, in which case the necessary hardware to execute those instructions (program memory, ROM, RAM, processor, power source, connectors, circuit boards, etc.) is implied. Where network functions are described, a network connection should be understood to exist and might be wired, optical, wireless, etc., and where user interaction is implied, user interface capabilities (display, keyboard, touchpad, speakers, microphones, etc.) are also implied.

The DASH client maintains two clocks, or their logical equivalent. One clock is a real-time clock circuit or software that indicates time of the local clock running in the client, and the other clock is presentation time, representing the time of presentation of media content relative to its start. Herein, the real-time clock time is referred to as "r-time" and "p-time" is the descriptor that denotes presentation time.

Representations are media streams encoded at a different bit-rates or other differences, for the same content. Thus, a user will typically only need one representation, but the client might switch from one representation to another as conditions and/or requirements change. For example, if the bandwidth is high, the streaming client may choose a high quality, high bitrate representation. If the bandwidth is reduced, the client may adapt to these conditions by switching to a lower quality, lower bitrate representation.

Switch points (or random access points) are samples in a representation from which decoding of the media samples can start, without requiring knowledge of the data that precedes the stream. In particular in video representations, not every sample is a random access point, since the samples (frames) generally depend on prior frames. When a streaming client wants to switch representations, it should make sure to start decoding the new representation at a switch point to avoid wasted effort. In some cases, switch points are signalled in a segment index (sidx) to the streaming client.

A representation group (sometimes abbreviated to simply group) is a set of representations which are switchable. A media presentation may contain more than one representation groups. It may, for example have one representation group for the video representations at different bitrates, and another representation group for the audio bitrates. In the DASH standard, a representation group is sometimes also called an adaptation set.

A segment is a file that contains media data for at least a portion of one of the representations. A fragment is a part of a segment for which a mapping from the start p-time of the fragment to the byte range of the fragment within the segment is available. Sometimes, the term subsegment is used instead of fragment, they can be considered equivalent. Some media content is not split up in fragments; in such cases, "fragments" might refer to the segments themselves.

Figure 3A:
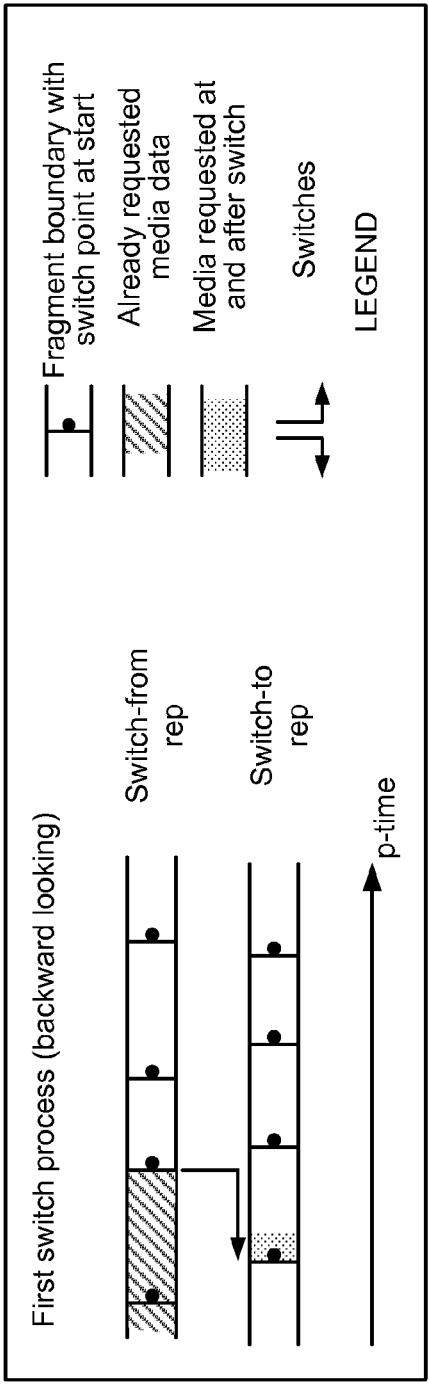
FIGS. 3A and 3B are timing charts illustrating representation switching processes and comprises FIG. 3A for a backward looking process and FIG. 3B for a forward looking process.
Figure 3B:
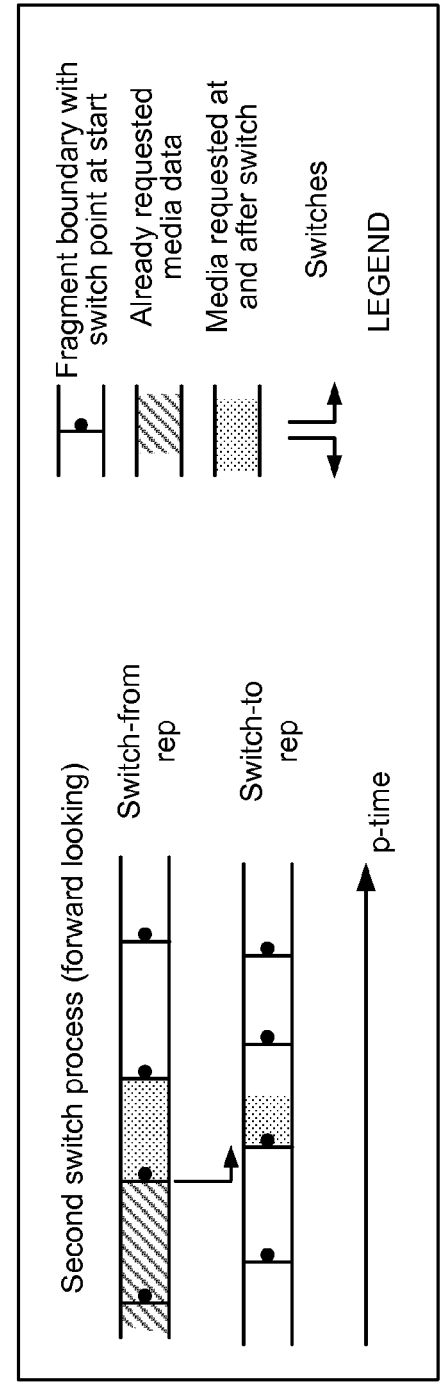

FIGS. 3A and 3B are timing charts illustrating two possible representation switching processes. The switch can be backward looking (first process; FIG. 3A), in which case the switch point in the switch-to representation is found by looking at the p-time stretch that has already been requested in the switch-from representation and choosing the previous switch point going backward in p-time from the switch-to representation that is closest to the end of this stretch. The second process (FIG. 3B) is forward looking: it finds the next switch point going forward in p-time in the switch-to representation starting from the last requested p-time in the switch-from representation.

Figure 4:
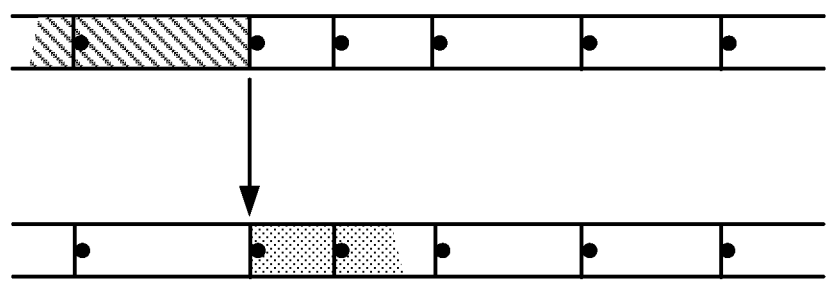
FIG. 4 is a timing chart illustrating the representation switching process for the case where switch points are aligned.

FIG. 4 is a timing chart illustrating the processes for switching when the switch point are aligned and when a switch point follows the last requested fragment immediately. The diagram depicts behavior of both the forward looking and backward looking method, as the two processes behave identically in such a setting. Thus, when the switch points are aligned, neither process has to download overlapping data.

A presentation time is a time period over which media is expected to play out or play back, typically at a normal speed. For example, a 30 minute video presentation would play for 30 minutes. The user may fast forward or rewind, which would change the actual time taken, but it should be understood that the presentation is still a 30 minute video presentation. A presentation element presents the presentation to the user over the presentation time. Examples of presentation elements include a visual display and an audio display, or a video/audio stream that is piped to a device that can present it. "Playback" is the term used to describe consumption of media. For example, a smartphone might download or obtain media data that represents a presentation over the presentation's presentation time (p-time), buffer it, and a media player is said to "consume" that media, preferably consuming such that the buffer does not completely empty at least until the end of the presentation time, so that the user does not experience a stall in the presentation while the receiver is waiting to obtain more data. Of course, "playback" or "play out" does not imply that the media is played more than once. In many instances, it may be that once the media is consumed, it is never used again.

A presentation buffer is a memory element in the receiver, media player or accessible to one or both. For simplicity of exposition, we interchangeably use the terms "presentation buffer", "buffer", "media buffer" and "playback buffer", with the understanding that this is a logical buffer that comprises data, typically media data, that has been downloaded but not yet played out or consumed. It can be the case that the data comprising the presentation buffer is partitioned within a device between different components, i.e., some portions of the downloaded data is held by one process, e.g., a receiving process within the device, whereas other parts might have already been passed on to another process, e.g., a play out process within the device. It can also be the case that at least some of the data comprising the presentation buffer might be at least partially duplicated across different buffers of different processes. In some cases not all of the data that has been downloaded but not yet played out is considered to still be within the presentation buffer, e.g., in some cases once the media content is passed off to the media player it may be no longer considered to be in the presentation buffer. Generally, the amount of media data, if any, that is downloaded but not yet played out and yet not considered to be within the presentation buffer is very small.

A presentation buffer accommodates unevenness is receiving and playing back media, storing received media data until it is consumed. After the media data is consumed, it can be deleted or will continue to be stored, depending on configuration. In some implementations, the size of the presentation buffer (as might be measured by the number of bytes of data that can be stored in the presentation buffer) might vary over time. For example, the presentation buffer might be dynamically allocated from a shared memory as needed.

In many examples described in detail herein, it might be assumed that the presentation buffer is characterized by a size. In the case of a fixed memory size dedicated to the presentation buffer, that size might be measured by the number of bytes that can be stored in the available memory. Where the presentation buffer is allocated dynamically, the "size" attributed to the presentation buffer could be equal to the number of bytes presently allocated to the presentation buffer, the maximum number of bytes that could possibly be allocated to the presentation buffer, or some other suitable measure. The presentation buffer size is also sometimes measured in terms of the presentation time play out duration of the media currently available in the presentation buffer.

The presentation buffer also has another characteristic, its "level" or "fill level." The level of a presentation buffer represents how much unconsumed media data is present in the presentation buffer, for example measured in bytes or presentation time duration. The level is expected to go up as media data is received and go down as it is consumed. It may be that the level is only logical—for example, the presentation buffer might be constantly full of media data but with some of the media, e.g., already consumed media data, marked for overwriting as new media data is received. Some receivers might be programmed so that an "empty buffer" is a condition where there is zero unconsumed media data and a "full buffer" is a condition where 100% of the presentation buffer is filled with unconsumed media data. Other receivers might have other bounds such that the level ranges over a range smaller than 0% to 100% of the presentation buffer size. In the case where shared memory is used and is only ever allocated the presentation buffer when unconsumed media data is stored there, it might not make sense to use the dynamically allocated size of the memory of the presentation buffer as the denominator when indicating a level ratio, as the presentation buffer would, by definition, be constantly full. Instead, the level of the presentation buffer might be measured as the ratio of the amount of unconsumed media data in the presentation buffer divided by a maximum allowed size for the presentation buffer.

1. Overview of Client Components

Referring again to FIGS. 1-2, various components of an example client are illustrated.

The SC keeps track of metadata, such as information about what representations are available, and what their fragments are. The SC is also responsible for buffering media data that has been received over the network and for handing it off to the media player. The SM is responsible for deciding what representations are to be downloaded at what point in time, and for making rate switch decisions. Finally, the RA is in charge of downloading the media fragments, given precise URL and byte-range information as provided by the SC.

The SM is the software component that is responsible for rate switching decisions. One of the SM's goals is to pick the best content for the given situation. For example, if there is a lot of bandwidth available, high download rates can be achieved, and so the SM should pick a high rate representation. If the download rate drops significantly, the chosen high representation may no longer be sustainable, and so the SM should switch to a lower representation rate, more appropriate for the conditions. The SM should switch rates fast enough to avoid draining the playback buffer completely (since that would cause a playback stall), but at the same time to try not to switch too hastily or too often. Furthermore, it should aim at requesting the highest quality content that can be downloaded over the network and played back without stalling. The SM can be extended to take factors other than the download speed into account in its decision making process. It can potentially account for things such as battery life, display size, and other factors when making representation decisions. Such further constraints can be added as filters to the SM, and do not affect the basic rate decision computation described herein.

A typical, high-level, operation of the client will now be described. Suppose a user requests a particular media content, such as a live sports broadcast, a pre-recorded movie, an audio stream, or other audio-visual or other content, possibly involving media types other than video and audio. The client would supply that request, perhaps through a user interface or a computer interface, to the SM. The SM would request from the SC and receive indications about which representations are available, what p-time spans are covered by which fragments, and where the switch points in the representations are located. In addition to that, the SM may have some information about the short term download rate at its disposal—as explained below, the RA reports this data to the SC and the SC reports or provides this to the SM.

The SM uses that information, together with past history, to estimate a sustainable rate and choose an appropriate switch point within a representation and amount of media content to download from that representation starting at that switch point. As the downloads are progressing and media content is played back, the SM uses information supplied to decide whether or not a rate switch is in order. If a rate switch is not in order, the SM tells the SC to continue fetching fragments from the current representation. If a rate switch is in order, the SM looks at the potential switch points and decides what fragments from what representations need to be fetched to make the desired switch. The SM then hands that information to the SC. This exchange between the SC and the SM is done periodically, whenever a decision on the next section of video to be downloaded is to be done. In order to make good decisions, the SM monitors the buffer level, and in some cases the SM may decide that the buffer is full enough, and no fragments need to be downloaded for some period of time.

Once the SM has decided on a fragment to download, the SC is in charge of getting the RA to actually download the fragment, to keep the downloaded fragment in the media buffer, and finally to hand the media data in the media buffer over to the media player when the time has come to play it out.

The SM is no longer actively involved in those fragments it has told the SC to download. However, the SM can, even after the download of a given fragment has already begun, change its mind and cancel a fragment request that it had previously issued. This functionality is useful in cases where it turns out that the download rate has dramatically dropped and that the fragment being downloaded is unlikely to be available by the time the media buffer is completely drained. If that condition occurs, the SM should detect it, cancel the request and switch to a more appropriate rate instead.

Once the SC receives a fragment handle from the SM to fetch, it looks up the URL and byte range of the corresponding fragment in its data structures, and uses that to create a request which it hands over to RA. It is also responsible for retrieving the response data from RA, and transforming the received media fragments to a stream that is playable. Finally, the SC is in charge of parsing and keeping track of metadata, such as the data obtained from the MPD, the segment index (sidx) boxes, or in the case of Apple's HTTP Live Streaming (HLS), the play lists.

The RA is a component that takes fragment and metadata requests received from the SC, creates corresponding HTTP requests, and sends those out over the network connection, retrieves the corresponding responses and hands those back to the SC. The network connection could be an internet connection, a cellular-based connection, a WiFi connection or other network connection able to handle HTTP requests and responses. The network connection may be internal within a single device, i.e., it may be an internal interface to media data already cached within the device. There may also be many combinations, i.e., some of the media content may be downloaded from a wired internet connection, some over a cellular based connection, some over a WiFi connection, some from local cache. In some cases a connection over which media data is downloaded may be mixed, i.e., parts are over cellular, parts over WiFi, parts over a wired connection, etc. The particular requests can be other than HTTP in some instances, but HTTP is preferred where the servers serving the media content are HTTP servers.

In its simplest form, the RA is an HTTP client. However, it might be desirable for the RA be more efficient than a generic HTTP client. One goal of the RA is to achieve a high enough download speed; it should aim at downloading significantly faster than what the selected playback media rate is. On the other hand, it should also be careful not to penalize timeliness for raw throughput: Fragments that are soon to be played out are more urgent than other ones further behind, and RA should attempt to receive them in time. Therefore, it may be necessary to sacrifice some throughput for timeliness. The RA should be designed to work well in all reasonable network conditions.

A basic design of the RA is one that uses several connections and possibly also FEC (forward error correction) to obtain the best results. Thus, the RA will typically need to manage more than one open HTTP connection. The RA will dispatch requests onto those connections. The RA may, in some circumstances, split requests into a set of smaller requests. When receiving the corresponding responses, the RA then reassembles the data into a coherent response. In other words, the RA is responsible deciding the granularity of the HTTP requests to send out, to which connections to dispatch the requests to, and to decide which portions of source fragments or repair segments to request. The granularity of those requests can depend on a number of things, such as buffer level, urgency of a request, the number of available connections, etc.

Each request sent out by the RA is an HTTP request either for metadata, or for part or all of a fragment request that has been passed to the RA by the SC. It may be a request for either source media data or repair data generated from the source media data. The responses to the RA requests generated from an SC fragment request should be sufficient, in most cases, for the RA to reconstruct all the media data in the fragment request, which the RA can then pass back to the SC. Thus, the RA is responsible for assembling the responses from the RA requests associated with a media fragment request back into a response to the fragment request provided to the SC. The assembling by the RA may include FEC decoding, if for example there are some RA requests for FEC repair data.

In addition to managing HTTP requests, the RA measures the download speed over short term periods, over time slices of some sampling rate. An example sampling rate is 100 ms, i.e., that the RA measures download speeds over 100 ms periods. This data is used by the SM to compute its download speed estimates, and ultimately make rate decisions. Other sampling rates are possible as well.

The RA does not need to know about metadata such as the DASH media presentation description (MPD) or about segment structures. In a specific implementation, the RA uses several simultaneous instances of a HTTP stack implementation to implement HTTP retrieval over several connections, even in some cases over different types of connections to similar or different servers.

The RA is responsible for letting the SC know when a new request can be accepted. The SC calls the SM to determine the next fragment to request and provides the RA with the appropriate request. The RA also provides some status information. The RA may regularly provide the short-term download speed, and the total time spent downloading, to the SM via the SC. The SM can also poll the RA for this information, indirectly via the SC. In addition to that, RA also informs the SM about what percentage of each individual request has been completed already. This information is similarly provided with an API that the SM calls to retrieve it.

There should be a very tight data flow between the RA, the SC and the actual media pipeline, with as little buffered data within the RA or SC as possible (aside from the intentional media buffer). The same is true for HTTP requests in their various forms; the SM should have to decide on a fragment to request only an insignificant amount of time earlier than when the actual corresponding HTTP requests are sent out over the network. One reason is that the further in advance the SM has to decide on a request, the less accurate and up to date its information is, and consequently the lower quality its decision will be.

The SM submits requests to be issued one at a time. However, the SM can issue new requests also if not all previous requests are completed; concurrent requests are allowed. The SC passes the requests to the RA in the order that the SM issues them. The RA then takes care of concurrent processing, and makes sure it hands the received data back to the SC.

Concurrent requests make it possible for RA to implement HTTP pipelining. Indeed, even an RA that makes use of multiple connections fits into this scheme.

1.1. The Stream Manager (SM)

The SM determines when to request fragments, and which fragments to request in response to a combination of user actions, network conditions, and other factors. When the user decides to start watching content, the SM is responsible for determining the first fragment to request for that content starting from the p-time specified by the user or by the service offered. For example, some live streaming services may require all users to be viewing the same p-time portion of the media content at the same r-time, whereas other live streaming and on-demand services may allow flexibility to the end user or application about which p-time to play back at which r-time. When the media buffer becomes full, the SM temporarily suspends providing further fragment requests. The SM is responsible for deciding at which quality to playback the content at each point in p-time, depending on network conditions and other factors, such as the size of the display, the remaining battery life, etc.

When the SM deems that it is appropriate to provide a fragment request, the SM can only provide a request if the RA is ready to receive and process fragment requests. The SC determines when this is the case by polling the RA, and forwards this information to the SM.

When the RA is ready to receive the next request, the SM decides whether a new request should be issued and chooses the next fragment to request. The SM makes requests for media data one fragment at a time. The SM is responsible for requesting fragments that allow the timely and seamless playback of the content. A playback change in representations can occur generally only at switch points, and there may be multiple fragments between two consecutive switch points; the SM respects that restriction.

Generally, the SM attempts to only request fragments for which it is reasonable to believe that they will be received in time for smooth playback. However, given that network conditions can sometimes change drastically very quickly, this cannot be guaranteed in all circumstances. Therefore, the SM also has the ability to cancel requests. The SM will cancel requests if congestion is detected and there is a significant risk of stalling if no action is taken. Stalling is a possibility if no action is taken, for example if the download rate suddenly drops precipitously due to deteriorating network conditions shortly after a fragment request is issued.

The SM keeps track of the representation, R, and the end p-time, E, of the most recent previously chosen fragment. The SM typically chooses to request a next fragment that has a start p-time of E'=E. Some variations might have the start time determined from the buffer level and the current playback time.

The SM produces a sequence of requests that are intended to produce a stream that can be played back smoothly if the potential overlap at the switch points is discarded. The order in which the SM creates requests is the same as the order in which RA should prioritize (though not necessarily issue) them. This is also the same order in which the RA hands the received data back to the SC, and in which the SC should play it out.

If the SM decides that it needs to switch rate, there are two processes to do this, in the general case. In one process, the SM looks for a switch point (also sometimes referred to as a "random access point" or "RAP") P in the new ("switch-to") representation with p-time less than or equal to E and once such a point has been identified, the SM starts requesting fragments in the new representation. The second process is one of looking for a switch point, P, with p-time later than or equal to that of E and continue requesting fragments in the old ("switch-from") representation until a fragment with end-time beyond P has been requested. In either case, it may be useful to signal the switching to the SC.

Note that both these processes have the property that some overlapping data may have to be downloaded. There is a stretch of p-time for which the data may need to be downloaded for both the switch-from representation and the switch-to representation.

Which of these switching processes is favorable depends on the situation. For example, it can be that in some specific situation, the overlap for one of the processes is unreasonably large, while it is quite short for the other one. In the simple case where all the fragments are aligned across representations, and all the fragments start with a RAP, these switching processes reduce to a simpler method, wherein the SM just switches by requesting the next fragment from the switch-to representation instead of the switch-from representation. Note also that in this case, no overlapping data needs to be downloaded.

1.1.1. SM Fragment Decision Process

This section describes an SM fragment decision process to decide which fragments to tell the SC to request. In these examples, a single representation group is assumed, but the examples can be extended to address processes that use multiple representation groups, e.g., choosing a video representation out of a video representation group and an audio representation out of an audio representation group.

The next fragment chosen by the SM typically has a start p-time that is the end p-time of the previous fragment request. Below is described some detailed logic that might be implemented in the SM for choosing the next fragment to request.

In the examples that follow, assume that fragments start with RAPs and are aligned between representations. If that is not the case, variations of this description are possible. If those conditions are present, the fragment decision of the SM reduces down to a rate decision, i.e., the SM decides whether to stay on the current representation, or to switch to a different one. In the more general case, where fragments are not necessarily aligned across representations and might not start with RAPs, the decision is similar, but the cost of switching higher, and that might be taken into account.

The SM representation process comprises two logically separate processes: a first process is the rate estimator, which computes the approximate sustained download rate from the short term samples that the RA provides, and the second process is a decision process that makes use of this estimate to make the switch decisions.

2. Rate Estimation Process

An adaptive bitrate streaming client generally uses a download rate estimator module that is used later by the rate decision module for choosing the right bitrate media. With this approach, when the download rate is large, higher quality media can be streamed. A change in download rate can trigger representation switches. The quality of the rate estimate has a big impact on the quality of the streaming client.

A good rate estimator for an adaptive video streaming device should have a number of properties. First, it should have little variance, even if the short-term download rate varies a lot. Second, it should adapt to rate changes on the underlying channel quickly. When the channel rate drops significantly, the estimate should reflect that fact quickly, so that the device can adjust the quality accordingly without stalling. Correspondingly, an increase in video quality should be observed quickly, so that better quality content can be fetched.

Satisfying those two requirements may require trade-offs. Typically, an estimator with small variance will have a large reaction time and vice versa. For example, consider a simple estimator that could be used in a device. That estimator would take the moving average over the last X seconds of download, for some fixed X Picking a large X for example, X=30 seconds (s), would result in a relatively smooth estimate with little variance, but it would only react to download rate changes slowly. If such an estimator was used for rate decisions, the resulting player might frequently stall on bandwidth drops, or fail to timely switch to a higher bitrate when it would be safely possible to do so. For these reasons, an implementation might pick a smaller X, say X=3 s. Such a choice will result in much quicker rate adjustment, but at the expense of stability. The rate estimate would vary a lot, and the player might therefore very frequently change the video playback rate, resulting in bad user experience.

Figure 5:
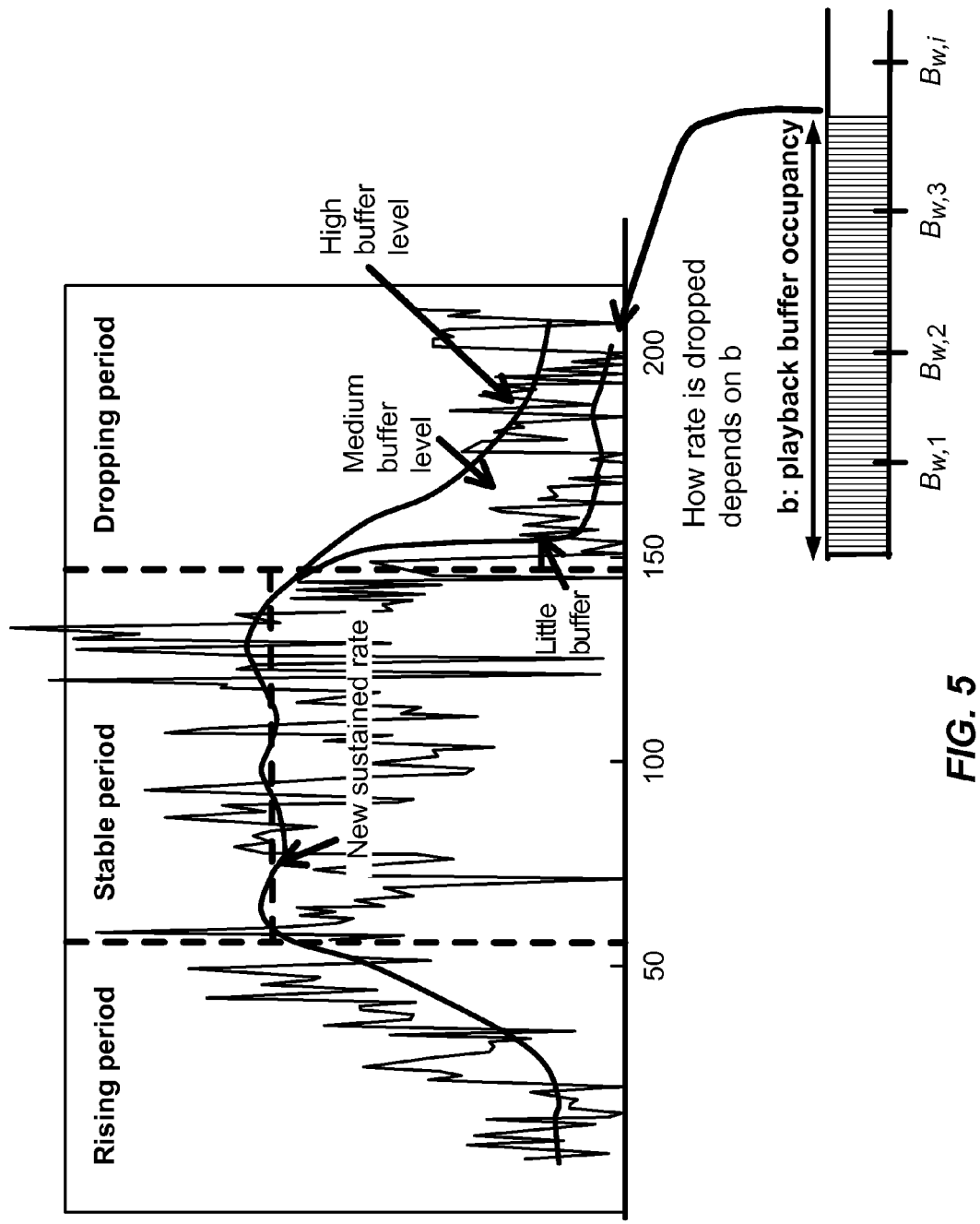
FIG. 5 is a plot illustrating rates over time as managed by a rate estimator, and particularly an estimator that is adaptive to the buffer level (such as a pker-type rate estimator).

In FIG. 5, the bumpy curve is a raw download rate, with a lot of short-term fluctuation. The rate estimator is a smoothed version of the bumpy download rate. On a rate change, it converges to the new sustained rate, and remains similar to it as long as the rate does not change.

One of the desired properties is that if there is little buffer level, the adjustment is quick, which causes a fast adaptation of the rate, so that the presentation buffer does not empty before adjustment when the download rate is dropping. If there is a lot of media data within the media buffer, on the other hand, the rate estimate should be smoother with slower adjustment. When there is more media data in the media buffer, the play out rate should tend to remain higher for longer periods of time when the download rate is dropping than when there is less media data in the media buffer.

The rate estimation process presented hereafter, called pker, pker process, or pker-type process, reacts quickly to rate changes, but is also stable, satisfying both the requirements for low variance, and high reactivity.

2.1. A pker Process

This section describes a rate estimation process that is referred to herein as pker, a pker-type process or just a "pker process". A basic rate estimator bases its estimates solely on short-term rate measurements, using one method or another to compute a longer running average from that. The basic moving window average ("MWA") as described above is an example of such a process.

Figure 6:
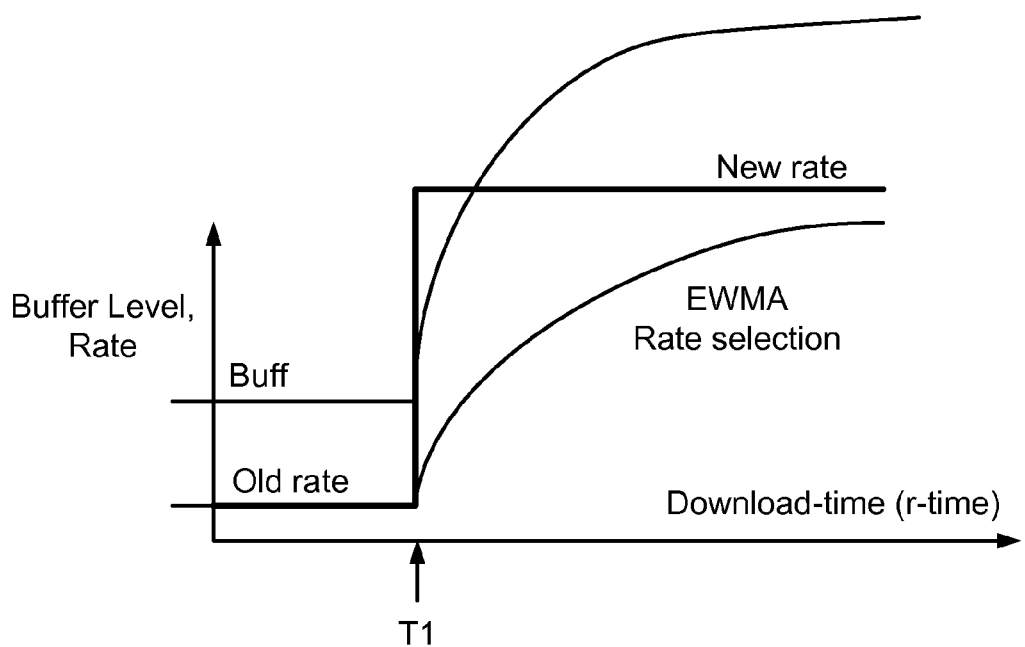
FIG. 6 is a plot illustrating a rate increase versus download time (r-time) when a non-adaptive exponential weighted moving average ("EWMA") filter is used.
Figure 7:
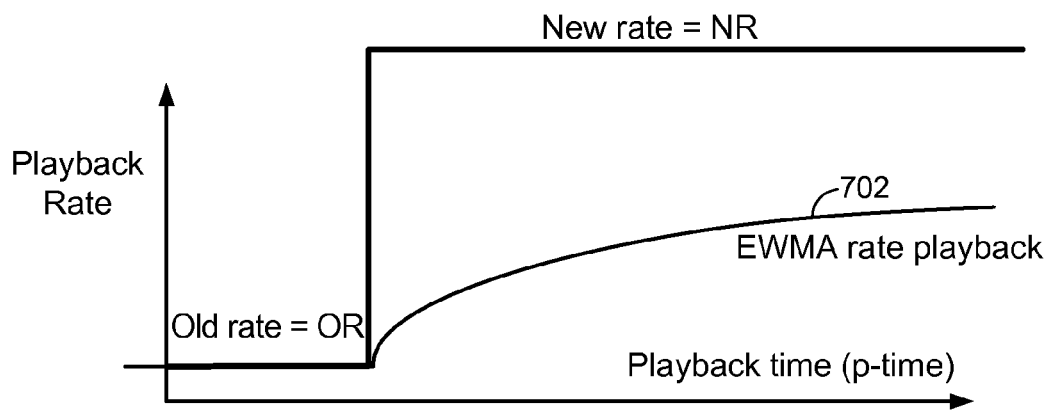
FIG. 7 is a plot illustrating a rate increase versus playback time (p-time) when the non-adaptive EWMA filter is used.

FIG. 6-7 illustrate effects of using a non-adaptive (fixed coefficient) exponential weighted average for rate selection purposes. Those plots assume, for simplicity, that a new rate estimate triggers a new download selection immediately (i.e., the fragments are relatively tiny), and the new rate selection is simply the rate estimate.

FIG. 6 illustrates the r-time aspect. As shown there, the x-axis is the download time (real time). When a dramatic rate increase occurs at time T1, the buffer starts growing very quickly, because video data is being downloaded much faster than it is being played out. The EWMA estimate gradually converges to the true rate.

FIG. 7 illustrates the p-time aspect of the same event. In the figure, line 702 depicts the bitrate that is displayed on screen. The rate adjusts much more slowly than in the r-time picture of FIG. 6. The speed of convergence for the p-time compared to the r-time is slowed down by a factor of NR/OR in the beginning (since the player received about NR/OR seconds of video per second of downloading at that point). Thus, the net effect is that the media can play out at a rate that is much lower than the download rate for a significant amount of p-time when using this type of rate estimator.

If the rate is estimated for the purpose of streaming media, an estimator can take advantage of other pertinent information. In particular, the buffer of the media player is of interest, or in general the download history of the media player (farther into the past than what is in the current buffer), including the information of how long it took to download each media segment, either buffered, or already played out.

An implementation can for example use an MWA estimator, but choose the window size as a function of the media buffer.

If the buffer level of the media player is high, the player is not in immediate danger of stalling, and so a long term estimate can be taken, using a large window, which will result in a more stable estimate. If the buffer level is low, on the other hand, the player should react quickly, and this suggests that shorter averaging windows are a better choice in this case.

So an implementation of a rate estimation process might use a varying window width, using an r-time window width proportional to the amount of p-time in the current media buffer (that is, the current amount of p-time downloaded and not yet played out).

Another implementation might choose the window width to be proportional to the number of bytes contained currently in the media buffer.

An implementation may also inspect the content of the buffer itself, rather than just its level. For example, if it determines that a big part of the buffer was downloaded in a time much shorter than what the playback duration of that same content is, this suggests that the download buffer is growing quickly, and a rate estimator might hence conclude that the estimates need to be adjusted.

Similarly, a rate estimator might track the change rate of the buffer level, and take fast change in the buffer level as indications that the rate estimate needs to be adjusted quickly.

Figure 8:
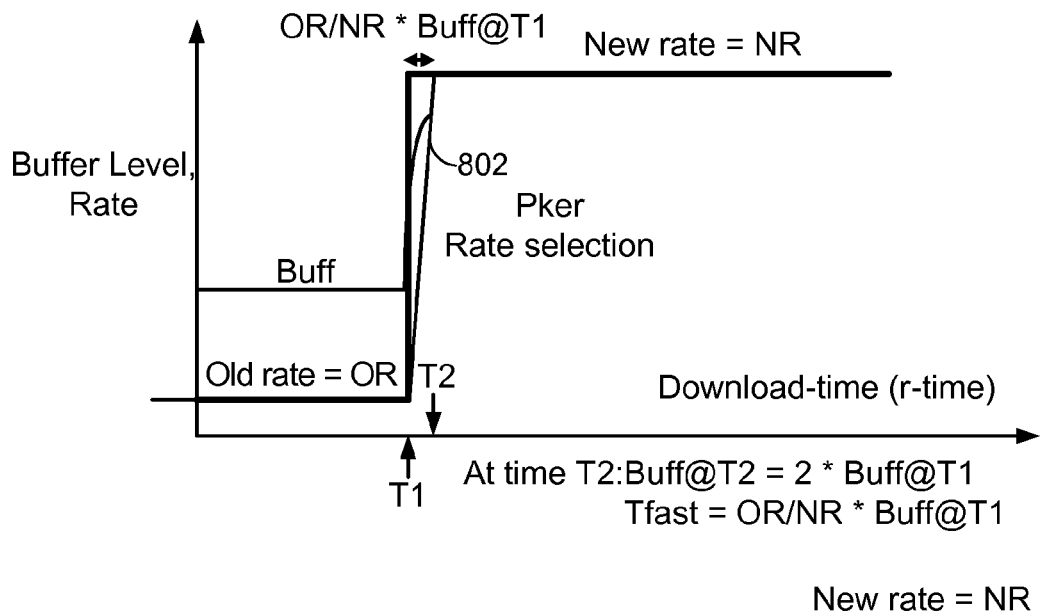
FIG. 8 is a plot illustrating a rate increase versus download time (r-time) when a variable window size weighted moving average ("WMA") filter is used.
Figure 9:
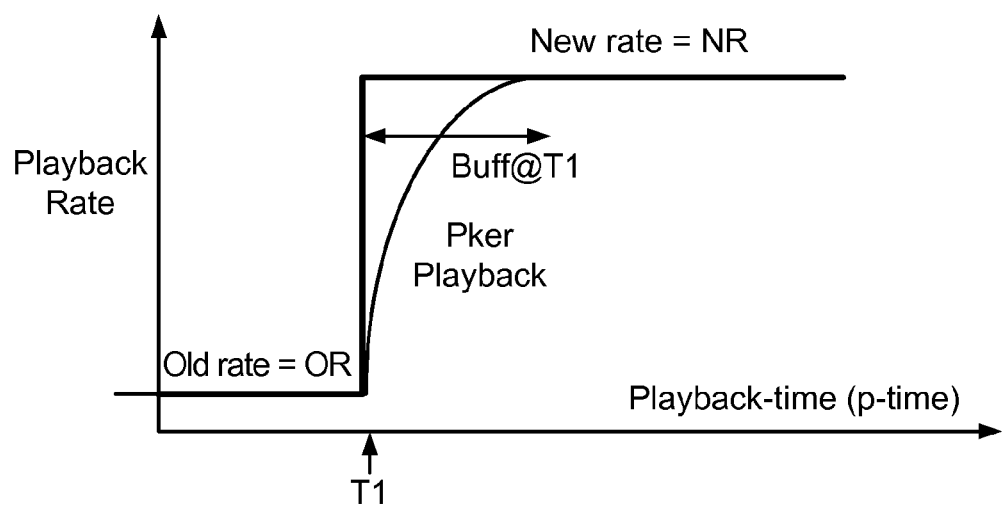
FIG. 9 is a plot illustrating a rate increase versus playback time (p-time) when a pker-type process is used.

FIGS. 8-9 illustrate the behavior in the same scenario as FIGS. 6-7 when a variable window size weighted moving average ("WMA") filter is used. In the examples, a "pker" process is explained as programming code as such a variable window size WMA filter. The pker process might be embodied as program instructions executed by a processor.

In FIG. 8, a line 802 is the pker rate estimate in the case where the underlying channel has a sudden rate increase from the rate OR (old rate) to the rate NR (new rate). The amount of r-time it takes for the rate selection to adjust to the new rate is proportional to OR/NR. The larger the increase is, the quicker the adjustment will happen in real time. As illustrated, at time T2, Buff@T2=2*Buff@T1 and $T_{fast}$=OR/NR*Buff@T1.

FIG. 9 displays the playback behavior in p-time. It takes about one buffer duration (the amount of p-time that was in the buffer when the rate increase happened) for the pker estimator to adjust to the new rate, i.e., the pker estimator has adjusted to the new rate by the time that the media buffer has an amount of media content with p-time duration B added to the media buffer, where B is the p-time duration of the media content in the media buffer at the time of the rate increase to the new rate.

A particular process that does this will now be described. The process determines how much r-time it took to download the last $\gamma_T$-fraction of the playback buffer, where $\gamma_T$ is an appropriately chosen constant. For example, this might be the complete time it took to download the entire current playback buffer ($\gamma_T$=1), or the time it took to download the last half ($\gamma_T$=0.5) of the playback buffer. It is also possible that $\gamma_T$>1. Let $T_{fast}$ be the amount of r-time it took to download the last $\gamma_T$-fraction of the playback buffer. An estimated download rate can be computed by estimating the download rate over the previous $T_{fast}$ seconds of download time. Note that other values of the $\gamma_T$ are possible. As explained herein, different values can serve different goals.

This kind of windowed average over a $T_{fast}$ wide window has the remarkable property that it will detect rate increases quickly. In fact, if a value $\gamma_T$<1 is used for determining $T_{fast}$, then the estimator has the property that if the rate increases by any factor at a certain instant of time when the p-time duration of media content in the media buffer is B, the buffer will grow to at most a limited multiple of B before the rate estimator converges to the increased rate.

A more elaborate rate estimation method can combine the two approaches mentioned above. It can in particular use the minimum of the buffer level B and $T_{fast}$ as the averaging window width, i.e., the amount of r-time over which to average the download rate. More generally, the download rate can be averaged over the previous r-time of the minimum of $\gamma_B$·B and $T_{fast}$, where $\gamma_B$ is an appropriately chosen constant. Such a choice will have the property that it will react quickly when there is a rate drop with a danger of stalling, because in those cases, B is the minimum and the averaging will be over r-time proportional to the p-time duration of the media content in the media buffer, and thus by the time the media buffer drains halfway the rate estimate will be the new rate. For example, suppose at the time of the rate decrease the media content duration in the media buffer is B, and the download rate decreases so that the download rate is a fraction $\alpha$<1 of the playback rate of the selected presentation before the download rate decrease, and that pessimistically the playback rate of the selected representation does not decrease until the rate estimate reduces to the new download rate. Then, as the download continues for an r-time of x beyond the time when the rate decrease occurs, the buffer level is B'=B−x+$\alpha$·x, i.e., x p-time drains from the media buffer and a·x is downloaded into the media buffer. The rate estimate will be the new rate at the point t in time such that x=B', i.e., at the point in time when the media buffer level in p-time is equal to the r-time for which the download has been at the new rate, because at this point in time the estimate over the previous r-time of downloading will be the new rate since during this entire time the download has been at the new rate. Solving for x in the equation x=B'=B−x+$\alpha$·x yields x=B'=B/(2−$\alpha$), i.e., the rate estimate will reach the new rate when the buffer B' is still at least B/2. If instead the rate increases significantly at some point in time then $T_{fast}$ will be the minimum and the average download rate over the previous $T_{fast}$ r-time will be significantly higher than the average over the previous B r-time.

We now give a detailed description of an example of the pker rate estimation process based on this construction. It uses short term rate measurements, which can be obtained from a download module, such as the Request Accelerator (RA), and buffer information to compute an estimate. The buffer information is used to determine the window width over which the short term rate measurements to get a useful estimate.

Figure 10:
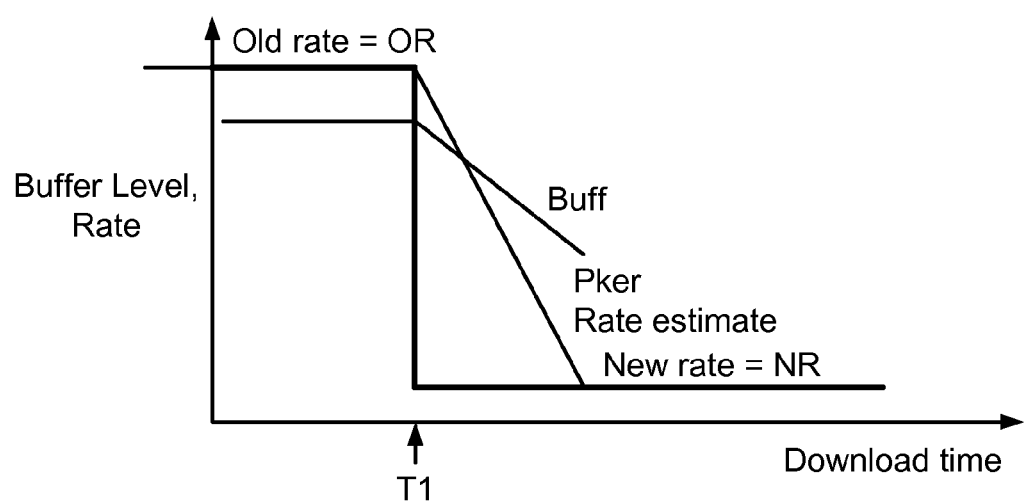
FIG. 10 is a plot illustrating a rate decrease versus download time when the pker process from section 2.1 is used.

FIG. 10 illustrates how the pker rate estimator evolves when the download rate drops precipitously. As soon as the rate drops, the buffer level starts dropping. The rate estimate starts adjusting, too. The rate estimate reaches the new rate (NR) at the latest when the buffer level has dropped by a factor of two. In the example, no intermediate rate decisions are made, so Buff drops linearly. If intermediate decisions were made, the descent of Buff would gradually slow down.

A design goal of a pker process is to use large enough averaging windows to avoid having noisy numbers, yet short enough numbers for it to be reactive. The pker process achieves this goal by using a windowed average with a dynamically changing window size. The RA maintains several variables in memory for use by the pker process, including B, the level of the playback buffer (in p-time), process parameters $\gamma_B$ and $\gamma_T$, and $T_{fast}$, the saved value for the r-time it took to download the last $\gamma_T$-fraction (in p-time) of the buffer, and R, the average download speed over the last C duration of downloading in r-time, where C=max(STP, min($\gamma_B$·B, $T_{fast}$)) with STP being a minimal acceptable window size, which should exceed the sample time period (such as 100 ms, for example). In some embodiments, $\gamma_B$=1 and $\gamma_T$=0.5, but other values are possible, and result in qualitatively similar behavior, so long as both are positive and $\gamma_T$<1. A small $\gamma_B$ causes the pker process to react quickly to rate reductions, while a small $\gamma_T$ causes it to react quickly to rate increases.

As explained herein, in order to compute the download speed over a duration of C, the SM uses the download speed information periodically provided by the RA. For that purpose, the SM may keep a history of the download speed information provided by the RA. The duration over which the average is taken is at most $\gamma_B$ buffer durations, which effectively limits how much history needs to be kept when there is an upper bound on the media buffer level.

Note that if the selected play out rate is approximately equal to the download rate, the buffering value, C, is of the order of a buffer duration, since if it takes the same amount of time to download the stream as it takes to play it out, we have $T_{fast} = \gamma_T \cdot B$. Choosing something of the order of the buffer level in r-time is a natural choice for a smoothing interval for the download rate estimate, since that is the amount of foresight a streaming client must have if it wants to avoid stalling.

In one simple implementation, the averaging window width is proportional to B, the amount of p-time contained in the video buffer. Such a choice protects well against stalling, but has a drawback: If the download rate is k times the rate of the selected media, every second of downloading results in k seconds of p-time of media being downloaded, causing the rate estimation to adjust really slowly. For example, if k=10, and there are 10 seconds of buffer, then the rate estimator would download about k·10 s=100 s of p-time before adjusting, which is a very long time. This motivates introducing the $T_{fast}$ parameter into the pker methods. In fact, matters can be even somewhat worse if an exponentially weighted moving average is used for smoothing, since such filters have infinite impulse response. For this reason, a pker process uses a finite impulse response filter instead. A plain moving average works; an implementation may also use more elaborate weighted moving averages.

Figure 13:
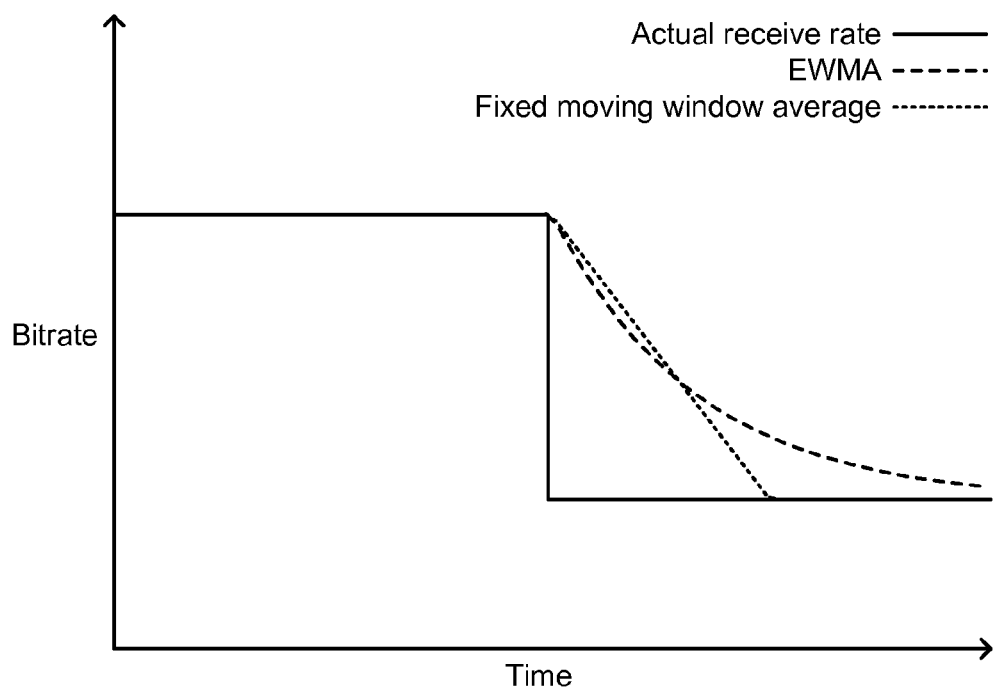
FIG. 13 illustrates a comparison of a simple (fixed-width) moving window average to an exponential weighted moving average.

FIG. 13 illustrates this last point. It shows a comparison of a simple (fixed-width) moving window average to an exponential weighted moving average. The graph illustrates that when a rate change is seen, the fixed window moving average might at first converge more slowly to the new rate, but it will converge within one window duration. The exponential weighted moving average tends to move quickly in the beginning, but in later stages it converges only slowly. Unlike the windowed moving average, it does not converge within a fixed window, but instead takes a time logarithmic in the magnitude of the rate change to converge.

With $\gamma_B=1$ and $\gamma_T=0.5$, the pker process can provide various guarantees. For one, if the download speed drops by any factor, the estimate is adjusted to the new download speed within the time it takes for the buffer to shrink to half its original duration. For another, if the download speed increases by any factor, at most one buffer worth of additional p-time will be downloaded before the pker process has converged to the new rate. Straightforward calculations will show that similar constant-fraction guarantees hold for any choice of $0 < \gamma_B$ and $0 < \gamma_T < 1$.

One approach to computing the buffer level, B, is as follows. Let T be the current playback p-time of the media player, and let $F_{i,1}, \ldots, F_{i,n}$ be the fragments that have been or are being downloaded and not yet played out in representation group i, sorted in increasing start time. Any fragment of group i that is still being downloaded is among $F_{i,1}, \ldots, F_{i,n}$. Let $\alpha(F_{i,j})$ be the fraction of fragment $F_{i,j}$ that has been downloaded, such as the number of bytes of fragment $F_{i,j}$ already downloaded divided by the size of fragment $F_{i,j}$ in bytes. The values for $\alpha(F_{i,j})$ for the various i and j can be calculated by the RA and passed to the SM. For a given group i, we define the current total amount of downloaded p-time to be as in Equation 1.

$$T_{p,i} := starttime(F_{i,1}) + \sum_{j=1}^{N_i} duration(F_{i,j}) \cdot \alpha(F_{i,j}) \quad \text{(Eqn. 1)}$$

To compute an overall $T_p$-value from the results of Equation 1, the DASH client considers weighting factors, w', of each group, which are determined from the MPD (Media Presentation Description metadata) and the number of representation groups, G, and performs the calculation of Equation 2. The buffer level B is then defined to be $B := T_p - T$.

$$T_p := \sum_{i=1}^{G} w'_i \cdot T_{p,i} \quad \text{(Eqn. 2)}$$

Equation 2 captures also the part of the buffer belonging to the fragments currently being played out. Note that this definition also works if several fragments are downloaded at once.

To compute $T_{fast}$, the SM keeps some history in the general case. Let $T_r$ be the total amount of r-time the RA spent (trying to) download media, and let Z be the total amount of bytes downloaded by the RA. The value of $T_r$ is computed by the RA. The SM keeps a history, H, of tuples $(T_r^i, Z^i, T_p^i)$, sampled at regular intervals (e.g., every 100 ms), for i=1, 2, ..., K, where the K-th observation is the last one. We assume the history is stored in observation order; so we have $T_{p,j}^1 \le T_{p,j}^2 \le \ldots \le T_{p,j}^K$ as well as $T_r^1 \le T_r^2 \le \ldots \le T_r^K$, and $Z^1 \le Z^2 \le \ldots \le Z^K$.

Now, to compute $T_{fast}$, assume that B has already been computed with the method given above. Then, the RA determines j such that the inequality of Equation 3 is met, for example by searching the history with binary search.

$$T_p^K - T_p^{j+1} < \gamma_T \cdot B \le T_p^K - T_p^j \quad \text{(Eqn. 3)}$$

Then $T_{fast} := T_r^K - T_r^j$. It should be noted that it is not necessary to keep an infinite history around, only enough for the $T_i$ values to span more than a $\gamma_B$-fraction of the maximal buffer duration.

Figure 15:
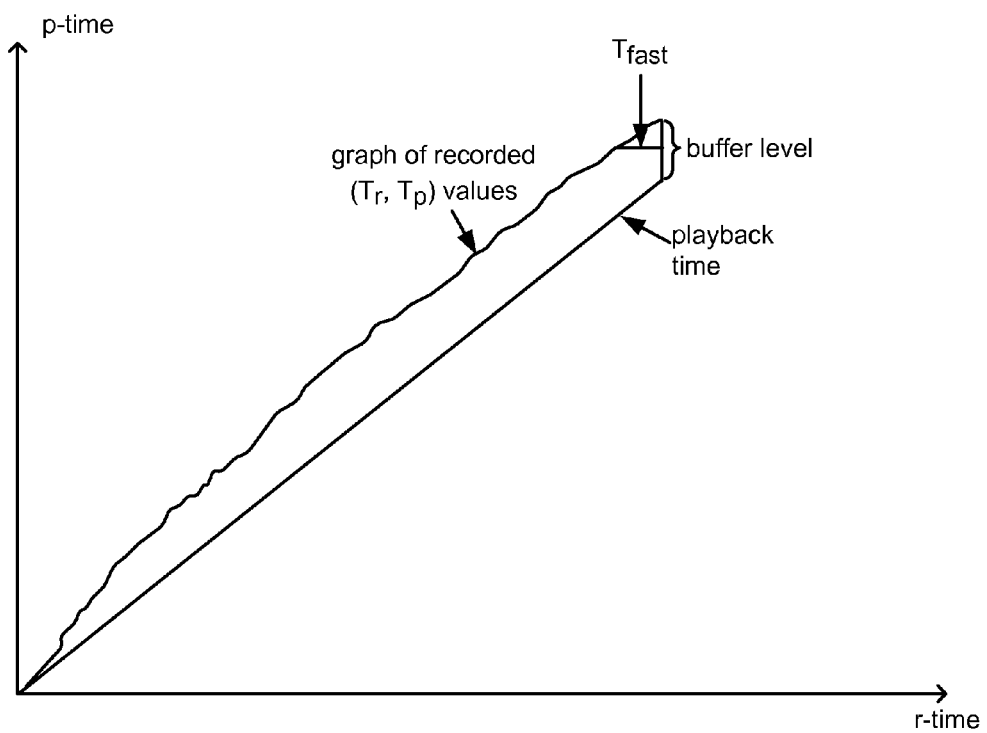
FIG. 15 illustrates how the values B and $T_{fast}$ used by a pker process can be determined from the history of recorded (Tp, Tr) values, along with FIG. 16.
Figure 16:
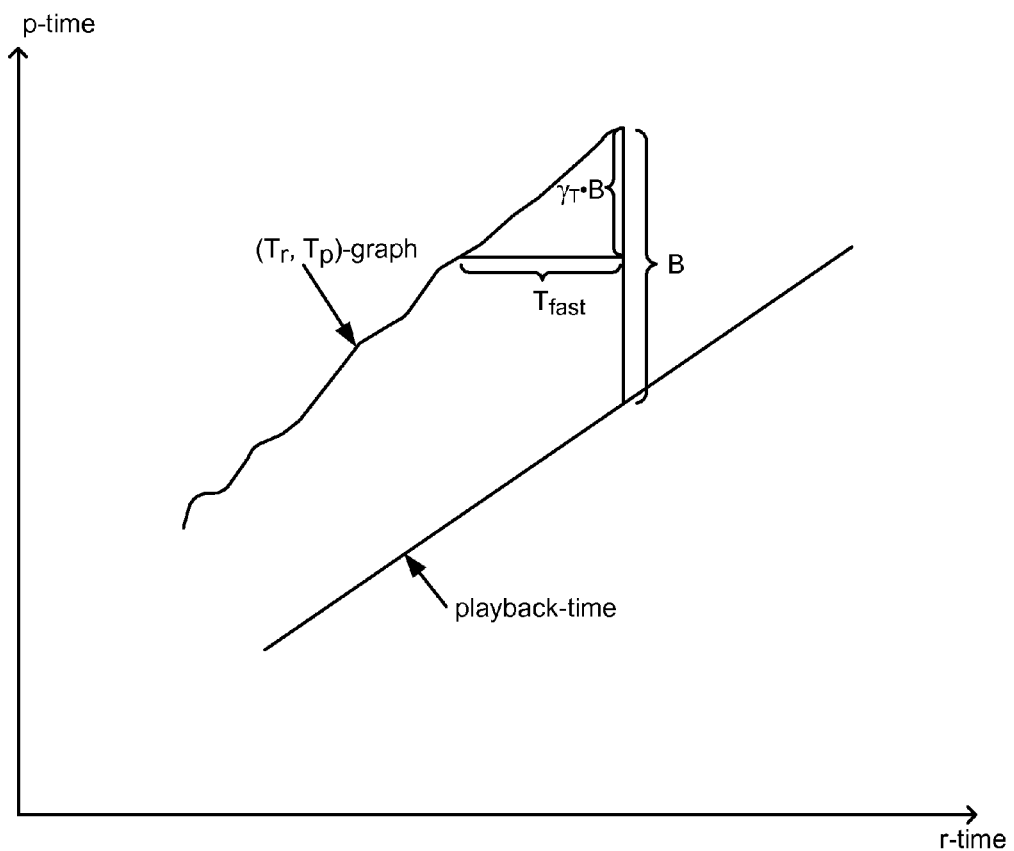
FIG. 16 illustrates aspects of determining values.

FIG. 15, along with the zoomed-in variant of FIG. 16, illustrates how the values B and $T_{fast}$ used by the pker process can be determined from the history of recorded $(T_p, T_r)$ values. The drawing illustrates the case where r-time and p-time progress equally fast (there are no download interruptions), and thus the playback time (p-time) is a 45 degree slope line of the download time (r-time). The history of $(T_p, T_r)$-values can be plotted in the graph, resulting in a curve that, if no playback stall occurred, is strictly above the playback time line. The buffer level B is then the difference of the last recorded $T_p$-value to the playout time. The value of $T_{fast}$ can be seen in this graph by measuring the horizontal distance to the $(T_p, T_r)$-curve at a level of $\gamma_T \cdot B$ below the current (last) $T_p$-value.

Figure 11:
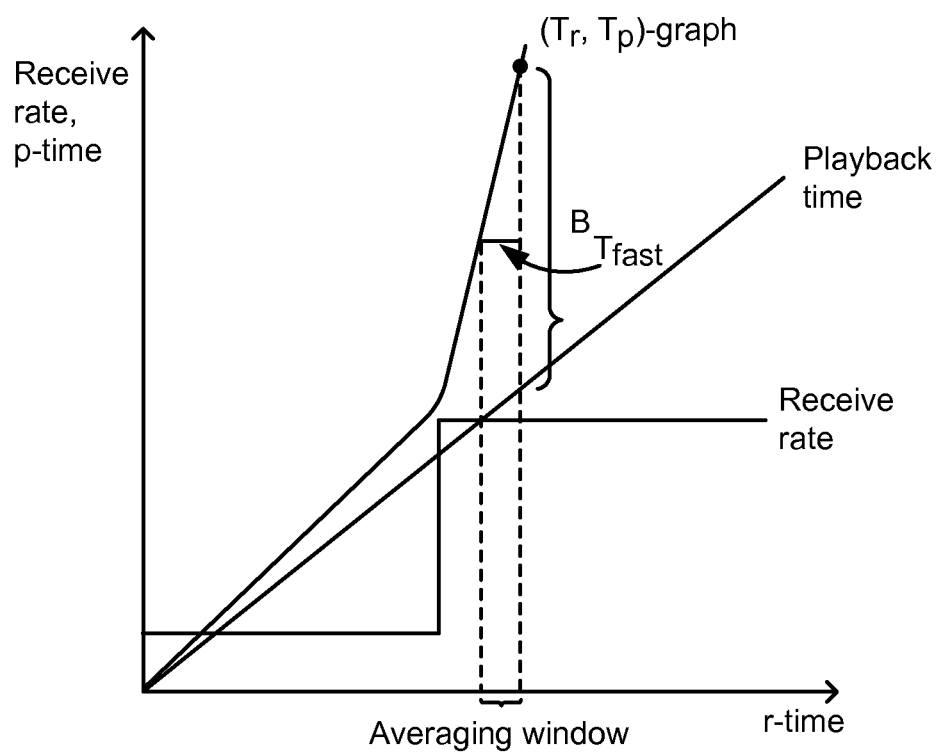
FIG. 11 illustrates the behavior of a pker process to sudden increases in rates.

FIG. 11 uses the same kind of presentation as FIGS. 15-16 to illustrate responses of a pker process to sudden increases in rates. $T_{fast}$ is relatively small when the receive rate sees a sudden increase to which the player has not yet reacted. It illustrates the fast response to high receive rate. Note that the averaging window is entirely within the high rate portion of the graph, since it is relatively narrow. Therefore, at this point, the pker estimate has already converged to the longer rate.

Figure 12:
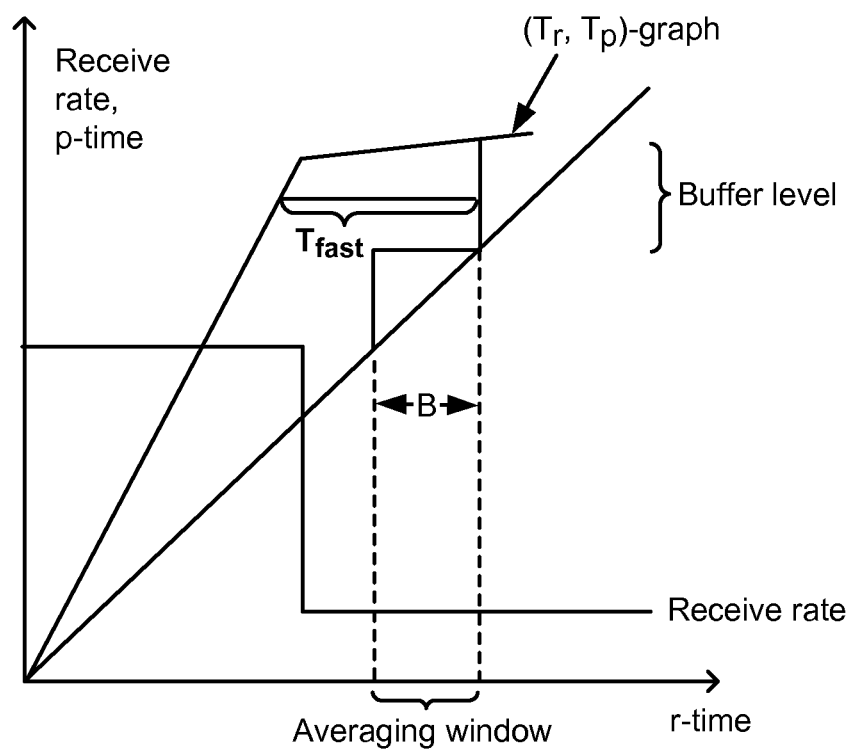
FIG. 12 illustrates the behavior of a pker process to sudden rate drops.

FIG. 12 again uses the presentation of FIG. 15 to illustrate the variable window size WMA filter (e.g., pker) response to a rate drop. In this case, $T_{fast}$ becomes relatively large, but the buffer drains, so B becomes small, causing the averaging window to fall entirely within the low-rate area after some draining time. As illustrated, the width, B, of the averaging window is such that B is smaller than $T_{fast}$, but the estimate still converges to the new lower rate before the buffer is completely drained.

Figure 14:
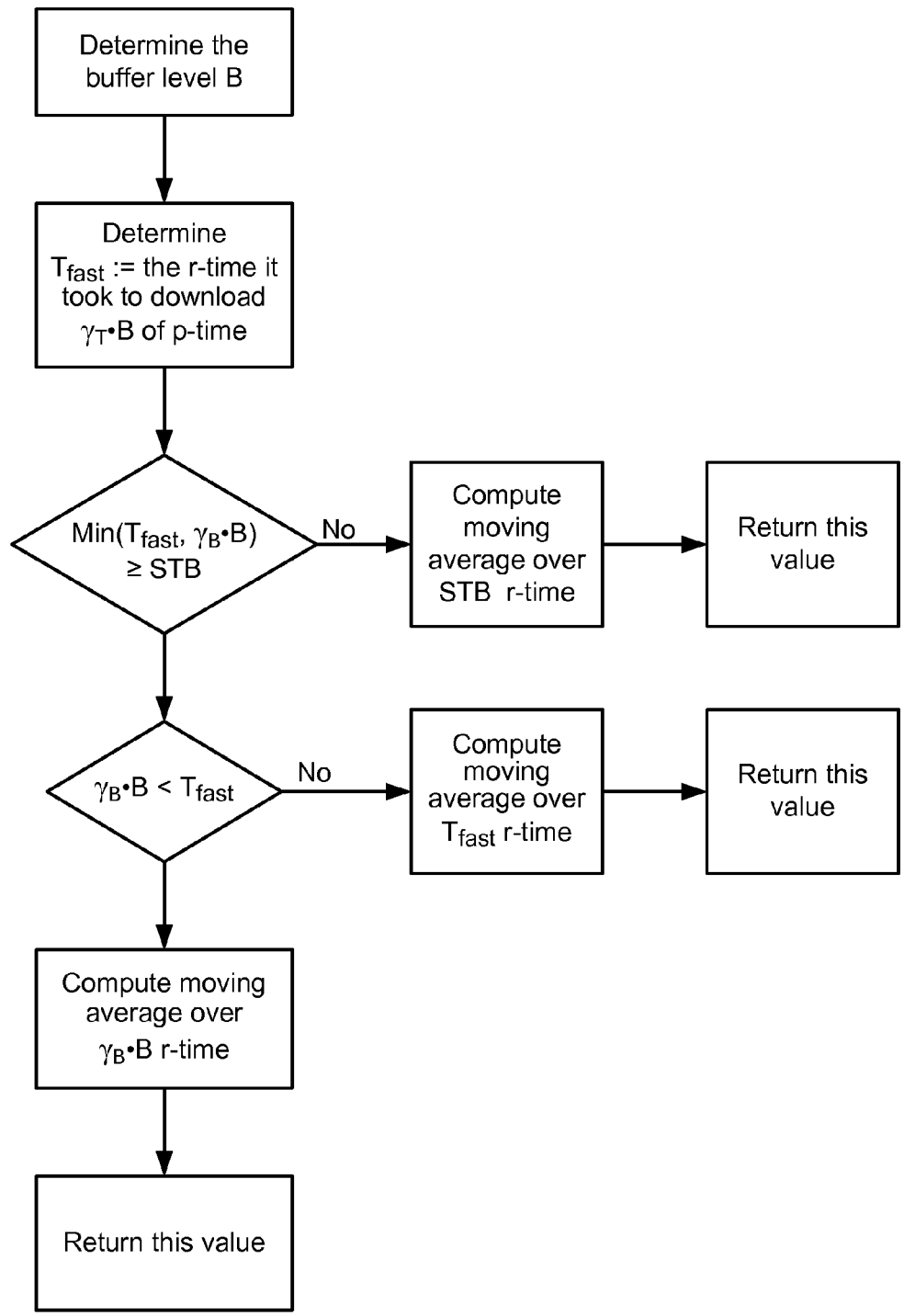
FIG. 14 is a flowchart of a pker rate estimation process.

FIG. 14 is a flowchart of a pker rate estimation process.

Once the values of $T_{fast}$ and B are computed, the value of C follows easily and the last step is that of computing the rate R over the past window of duration C. For that purpose, the $Z^i$ and $T_r^i$ values in the history are used.

In order to compute the rate over the interval C, the SM or RA does the following: (1) finds the largest j such that $T_r^K - T_r^j \geq C$, and then (2) computes the average download rate as in Equation 4. If no such j exists in the first step, the SM or RA sets j:=0, i.e., the oldest known observation. The value of j can efficiently be determined by binary search.

$$R := \frac{Z^K - Z^j}{T_r^K - T_r^K} \quad \text{(Eqn. 4)}$$

Each group has an associated weight, w, that corresponds to the fraction of the total bandwidth that is expected for that group to consume. It is a function of the information provided by the MPD, preferably after non-useable representations are filtered out. Herein, a proposed definition of the weight w of group g is w(g):=maxrate(g)+minrate(g), where maxrate( ) is the maximal playback rate in group g and minrate( ) the minimal one.

From the weights w, the SM or RA can compute the normalized weights w' as follows. Suppose the client wants to stream the groups 1, . . . , G, then the normalized weights are the weights divided by the sum of all weights, as in Equation 5.

$$w'_i = \frac{w_i}{\sum_{j=1}^{G} w_j} \quad \text{(Eqn. 5)}$$

The normalization is intended to be made over the weights that are actually streamed. For example, if there is a group which is not being streamed, then it should not be taken into account.

Some assumptions are made in the operation of this pker process. For example, the buffer levels of the individual representation groups should be be kept relatively close together. The pker process works better that way. For example, suppose one group has a very large buffer, and another one a very small one, and both have a similar weight. In such a case, it would be necessary to have quickly adjusting rate estimates, since for a small buffer that is necessary to avoid stalling when conditions change. But the pker process would still happily smooth out its estimates as if acting for a much larger buffer. Conversely, for the larger buffer, the measurements would have a somewhat high variance, for what the buffer level allows, and thus result in nervous rate decisions.

In some cases, having representation groups with big differences in buffer level is unavoidable. For this reason, another implementation can use a variant of the pker method that adjusts rates quicker when some buffers are very small, thus protecting a bit better against stalls in such cases. Such an implementation can compute $T_{fast}$ the same way as previously, but set the window size to C=max(STP, min($T_{fast}$, $T_{p,1}$-T, $T_{p,2}$-T, . . . , $T_{p,N}$-T)).

Other variants of these download rates estimate include using an independent pker estimate for each representation group to make decisions for that group.

3. Fetching Strategy

Streaming video players generally have a limited media buffer. It is therefore expected that in normal operation, the buffer full state may eventually be reached. When the buffer reaches full state, the streaming module should throttle the media input to avoid overfilling the buffer. An easy way to do this is to wait whenever the buffer is full until the buffer has drained enough to be able to hold the next fragment, and then resume fetching.

The effect of this method is that each fragment will be fetched individually, and there is a time gap between each fragment request, namely the amount of time it takes to drain enough of the buffer so that the next fragment fits and can be requested.

The TCP protocol automatically adjusts its download rate based on current network conditions. When a download is initiated over a TCP connection, the initial download rate is typically very slow, and increases as the TCP protocol probes to see if a higher download rate can be achieved. How fast TCP increases the download rate, and how TCP in general reacts to the properties of the end-to-end TCP connection, is quite complicated and depends on a number of factors, including the inherent end-to-end network latencies, the buffer capacities of network elements along the TCP delivery and acknowledgement paths, the competing traffic along these paths, what variant of TCP is in use, etc. Generally, TCP starts at a slow download rate and increases its download rate over time, and thus the average download rate of the TCP connection over the entire download time only approaches the sustainable TCP download rate when the entire download time is substantial. For example, if the sustainable TCP download rate is 1 megabit/second and the TCP connection starts at download rate essentially zero and increases linearly over time to 1 megabit/second over one second, then the average download rate over the first second is 500 kilobits/second, and it takes 10 seconds of downloading for the average download rate to achieve 95% of the sustainable download rate. For this reason, a fetching strategy that has many downloading gaps between requests is not ideal, where the download gaps are periods of time between the completion of one download request and the start of the next download request. Even when the gap between download requests is zero is non-ideal, as typically TCP takes some period of time to ramp up the download rate for the next request after the completion of the previous request. After each gap, the sustainable throughput may have to be achieved anew, which reduces the overall achieved average download rate.

Such a reduced rate can lead to smaller rate estimates, and hence the selection of smaller media rate. This in turn results typically in smaller (in terms of size in bytes) media fragments being downloaded, which further increases the relative magnitude of the gaps, resulting in a potentially even smaller playback rate to be selected. In other words, the effect is self-amplifying.

It is therefore advantageous for a DASH client implementation to use a process that minimizes the impact of this issue.

An implementation can download media data continuously, and then periodically drain the buffer level as follows. Whenever the amount of requested but not yet played out p-time, exceeds a preset high watermark, $M_h$, then the SM no longer issues any requests until the buffer level drops below a low watermark $M_l$. In a specific implementation, $M_h$=20 seconds and $M_l$=10 seconds, but in other implementations, those values could be lower or higher. After the drop below the low watermark, normal operation is resumed, and the SM starts emitting fragment decisions again.

Another implementation could use watermarks specified in bytes rather than presentation time to achieve a similar effect.

The fact that the buffer is periodically draining can be used by other parts of the system to their advantage. For example, it can be used to obtain fresh estimates of the RTT, as explained in section 6.1.2.

Figure 17:
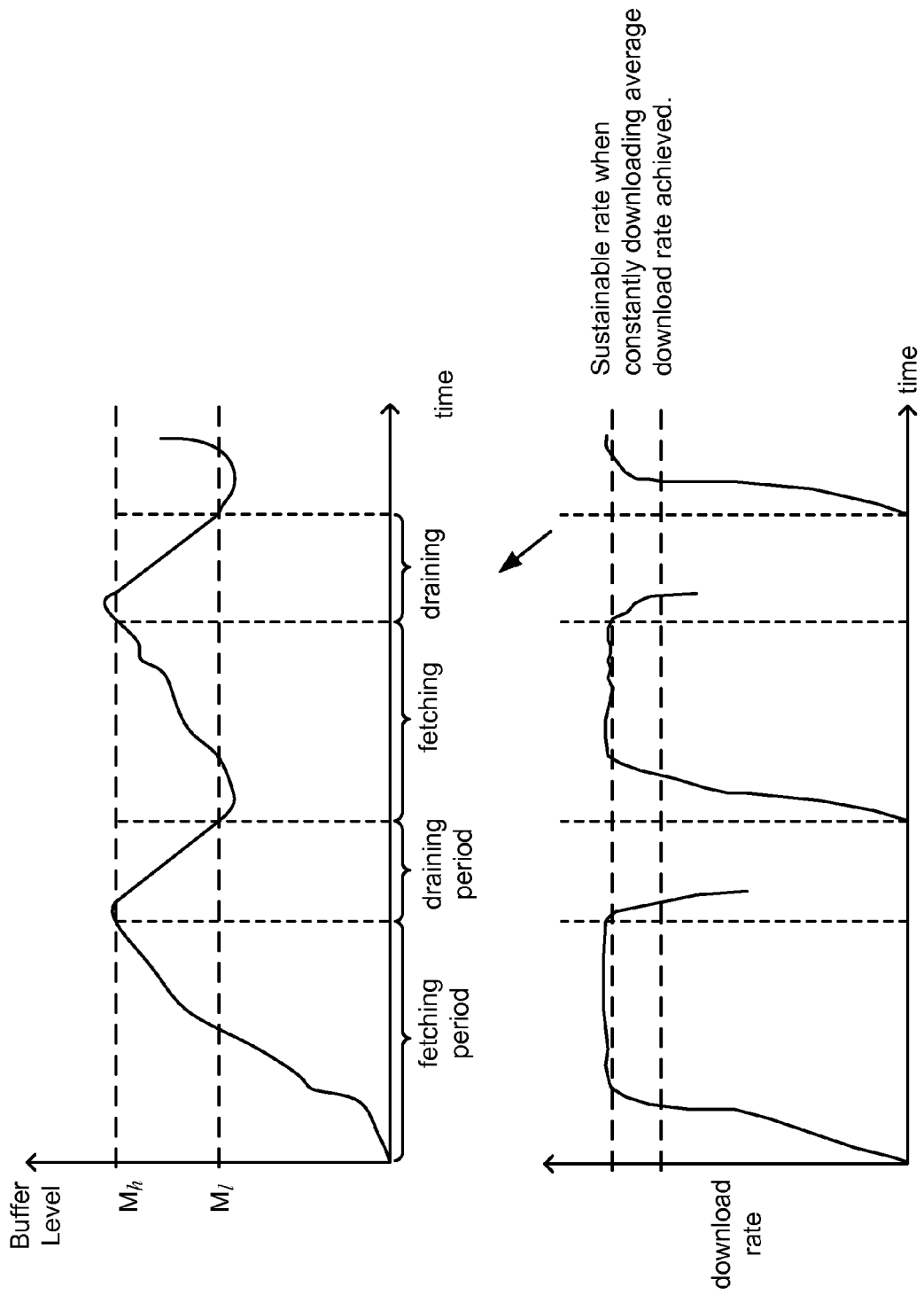
FIG. 17 illustrates the behavior of a "watermark" fetching process.

FIG. 17 illustrates the behavior of a "watermark" fetching process. The top graph is the buffer level graph in which the alternating pattern of draining periods and fetching periods is visible. The download rate is displayed in the bottom graphs. In the beginning of each fetching period, TCP takes some time to get to the sustainable maximum speed, and therefore the average download rate (during the fetching periods) is smaller than the maximum achievable download rate. The larger the difference between low and high watermark, the longer the fetching periods are, and the higher the average rate.

4. The Rate Selection Process

When starting to request media data, the streaming module (SM) uses some method to make the first play out rate choice. It could take the lowest available rate, or it could for example keep a history of network conditions and then determine an estimate of which play out rate to choose that can likely be sustained without stalls based on this history. When the SM is already receiving data and thus has a rate estimate R at its disposal (such for example one of the rate estimates computed with methods from section 2), it then makes decisions to stay at that rate or change representations.

A simple rate decision process will now be described. The receiver determines the highest bandwidth representation with a playback rate lower than the estimated download rate R, and picks that as the representation for which to play out (play back) data. While straightforward, this approach has a number of problems. First, it does not naturally cause small media buffers to grow, and is therefore susceptible to stalls even when the download rate only varies little. Second, a varying estimate R will lead to rapidly changing rate decisions, which might not be necessary and can be visually disturbing. Third, it leads to a startup time which is at least approximately the duration of a fragment, and therefore generally a few seconds.

A DASH client may therefore implement a rate decision process that bases its rate decisions not only on the download estimate R, but also on the buffer level B (that is, the amount of p-time buffered and not yet played out), and variables that depend on the content, such and the change rate D, which is an estimate of the p-time duration generally between two consecutive switch points.

Thus, one implementation may pick as the decision rate the largest playback rate proportional to R, where the proportionally factor is a function of the buffer level.

Typically, the proportionality factor $\lambda$ is an increasing function of the buffer level. An implementation could make $\lambda$ an affine function of the buffer level, for example.

If $\lambda$ is a function of the buffer level, an implementation can choose $\lambda$ to be small when the buffer is empty or small. Such a choice is advantageous, since it will cause small buffers to grow, and it will also provide some safety against stalling when the download rate is not predicted accurately.

For larger buffer levels, an implementation can choose values of $\lambda$ close to, equal to, or even exceeding 1. That will ensure that a high play out rate is chosen to be downloaded when there is no immediate risk of stalling, leading to high quality media being streamed in the steady state.

The rate decision process may implement a $\lambda$ that is a piecewise affine function of B rather than just a simple affine function. Piecewise affine functions can approximate arbitrary continuous functions to any desired degree of precision, which makes them a suitable choice. Any other parametrizable class of functions with the same property could be chosen instead.

Another implementation might make $\lambda$ a function of the buffer level in bytes, rather than the buffer level in p-time.

Yet another implementation makes $\lambda$ a function not only of the buffer level B, but of both the buffer level B and the frequency of switch opportunities. The reason for doing so is that a player with fewer opportunities to change the rate will commit itself further into the future with each decision than one with more frequent opportunities to change. Hence in the former case, each decision is a commitment to a larger time span, and also a higher risk. This suggests that it may be better to pick a lower rate in the former case than in the latter when the buffer level B and the estimated download rate R are the same, to keep the risk of stalling small.

A concrete way for a rate selection process to take the frequency of rate switch opportunities into account is as follows. Let D be a typical amount of p-time between two successive switch points in the stream. The value of D is dependent on the encoded video, and can be taken to be, for example, the maximum distance in p-time between two successive switch points, or the average distance of two successive switch points, or the 90-th percentile distance of two successive switch points, or any other suitable measure of the p-time distance of two successive switch points in the media. Given such a D, a method might include choosing $\lambda$ to be a piecewise affine function of B/D, or a variant thereof, such as for example B/max(u, D) or B/(D+u), where the value u is added to take into account the overhead incurred in issuing requests. The value of u can be a small constant amount of time (such as 100 ms, for example). As a further refinement, an implementation can make u a small multiple of the estimated RTT.

A process that bases its rate decision just on $\lambda \cdot R$, such as the methods described above, have the drawback that even relatively small variability in R, may result in many rate switches. This might not be desirable. When there is enough buffer, it might be better to not immediately to react to small changes in R, and instead let the buffer level vary accordingly.

To get such a behavior, a process may use values $\lambda$ and $\mu$, both functions of the same quantity (for example, B, B/D or B/max(100 ms, D), as explained above), which, together with the current rate, to pick a new rate decision. The functions should be chosen in such a way that $\lambda \cdot R$ is an low acceptable rate choice, and $\mu \cdot R$ is a high acceptable rate choice. The process can then be designed to use those two values as guides for a good rate decision.

In such a setting, the functions should be chosen such that generally $\lambda \leq \mu$.

The rate decision process can decide to keep the rate the same if the previous selection was already in the range from $\lambda \cdot R$ to $\mu \cdot R$. If the previous selection is less than $\lambda \cdot R$, the largest available playback rate equal to or less than $\lambda \cdot R$ is selected. If the previous selection is more than $\mu \cdot R$, the largest available playback rate equal to or less than $\mu \cdot R$ is selected.

An implementation can choose to have the functions $\lambda$ and $\mu$ hardcoded. Alternatively, it can select the functions in a more elaborate way dependent on the circumstances. In particular, an implementation can select appropriate $\lambda$ and $\mu$ functions as a function of the amount of buffering that the client will do at most. For on demand content, a client may choose to prebuffer a lot of data, potentially minutes of media data. For low latency live content, a client can only ever buffer at most the amount of media that is prescribed by the end-to-end latency, which is maybe only a few seconds. For content with little buffering, the client may decide to pick λ and µ functions which are more conservative, i.e., have smaller values.

A concrete implementation can for example interpolate the function linearly between two extremal functions $\lambda_1$ and $\lambda_2$, where the selected interpolation point is the low buffer watermark $M_l$ (see section 3). So it would have two hardcoded functions, $\lambda_1$ and $\lambda_2$, with $\lambda_4$ being used for small values of $M_l$, less than some $m_1$, and $\lambda_2$ being used when $M_L \geq m_2$ for some values $m_1$, $m_2$, where $m_1 < m_2$. For values in the range from $m_1$ to $m_2$, the function $\lambda(x):=\lambda_1(x)(m_2-M_l)/(m_2-m_1)+\lambda_2(x)(M_l-m_1)/(m_2-m_1)$ is used.

We now give a detailed example of a rate decision process following the above description. For this, we introduce some notation.
1) Let $S_1, S_2, \ldots, S_L$ be the stream rates of the L available representations (given in increasing order) of a representation group.
2) Let $\lambda(x)$ be a piece-wise linear function taking a non-negative scalar as input and returning a non-negative real scaling coefficient. The function $\lambda(x)$ should be settable either at compile time, or via a configuration file. For large $\lambda(x)$ should be non-changing, e.g., for x greater than $M_l$.

Here is one example on how such a function can be implemented. Given are the corner points $(0, \lambda_0), (x_1, \lambda_1), \ldots, (x_N, \lambda_N)$ where the $x_i$ are in increasing order. To evaluate $\lambda(x)$, find the largest i such that $x_i \leq x$. Then, using Equation 6, the receiver can evaluate the function.

$$\lambda(x) = \begin{cases} \lambda_i + (\lambda_{i+1} - \lambda_i) \cdot \frac{x - x_i}{x_{i+1} - x_i}, & \text{if } i < N \\ \lambda_N, & \text{if } i = N \end{cases} \quad \text{(Eqn. 6)}$$

A suitable example for such a $\lambda(x)$ function would be the one defined by the example parameters N=1, [(0, 0.5), (3, 1)], that is, the function that equals 0.5 at x=0, and linearly increases until x reaches 3, at which point the function is equal to 1 and remains 1 thereafter.
3) Let $\mu(x)$ be another such piece-wise linear function. An example such function is the one that evaluates to 0 at x=0 and reaches 1.5 at x=3, and remains constant after that.
4) Let D be an estimate of the duration in p-time from one switch point to the next one (as previously specified).
5) Let $x:=\min\{(T_d-T), M_l\}/\max\{D, 1 \text{ second}\}$, where T is the current playback p-time, $T_d$ is the p-time for which the rate decision is made, D is as given above, and $M_l$ is the buffer level low mark (see section 3).
6) Let CURR be the currently selected representation (i.e., the one which was used in the last fragment request). Let UP be the play out rate of the highest bitrate representation with a rate of at most $\lambda(x) \cdot R$, and if there is no such representation then UP is the play out rate of the lowest bitrate representation. Let DOWN be the play out rate of the highest bitrate representation of a rate of at most $\lambda(x) \cdot R$, and if there is no such representation then DOWN is the play out rate of the lowest bitrate representation. Since generally $\lambda(x) \leq \mu(x)$, then generally DOWN≥UP.

Then, the rate decision process picks the rate NEXT of the next fragment as follows: (1) If UP<CURR, then NEXT:=min (DOWN, CURR); (2) otherwise NEXT:=UP.

A reason for using max {D, 1 second} instead of simply D in step 5 above is because of the RTT; the role of 1 is to act as an upper bound of the RTT.

It is preferable that the functions $\lambda(x)$ and $\mu(x)$ are increasing as a function of x. It is preferable that the λ and µ functions are <1 for small x, which will ensure that the chosen play out rate is less than R, causing buffer growth for small buffer levels. Note that the selected playback rate is at most equal to $\max(\lambda(B/\max\{D, 1\}), \mu(B/\max\{D, 1\})) \cdot R$, assuring buffer growth for all the buffer levels B for which both $\lambda(B/\max\{D, 1\})$ and $\lambda(B/\max\{D, 1\})$ are less than one.

A simpler process could directly pick the new representation to be best representation with playback rate less than $\lambda(B) \cdot R$. This would still have the property that when the buffer is close to empty the buffer would tend to fill. However it would also cause a lot of representation switches, since R can fluctuate quite a lot. The more sophisticated rate selection process described herein tries to avoid switches, and instead allows the buffer to drain to some extent before switching down to a lower playback rate. For this to work, the functions µ and λ should be chosen in a way so that µ exceeds λ for moderate to large buffer levels: note that if the selected playback rate is CURR, and the measured rate is R, then no rate change will happen as long as Equation 7 is satisfied, allowing the receive rate to somewhat fluctuate without rate switches.

$$\frac{CURR}{\mu(B/\max\{D, 1\})} \leq R \leq \frac{CURR}{\lambda(B/\max\{D, 1\})} \quad \text{(Eqn. 7)}$$

In some versions, λ and µ would be just a function of the buffer level B instead of the ratio $B/\max\{D, 1\}$. The motivation for introducing the latter is as follows.

Let α denote the ratio of the playback rate of the selected representation versus the download rate. We want to determine a good α. It takes approximately α·D of r-time to download up to the next switch point. Just before the received data is added to the buffer, the buffer will have drained to B−α·D. In order to avoid stalling, we want that quantity to be positive; as a safety cushion it should even be proportional to the playback duration D of the fragment added to the buffer once it is downloaded, so it should be at least β·D for some β>0. To summarize, we want B−αD≥β·D.

Solving for a gives B/D−β≥α. This suggests that the representation selection process should choose a ratio playback versus download rate not exceeding B/D−β. The functions $\lambda(x)$ and $\mu(x)$ are bounds on acceptable such ratios; thus they should be functions of x=B/D not exceeding x−β.

We replace B/D by $B/\max\{D, 1\}$ in practice to take the additional cost of an RTT for transmitting one fragment into account. More generally, 1 can be replaced by some multiple of an approximation of the RTT, or other parameters taking into account the reaction time of the processes to initiate downloads of media data from servers.

Figure 18:
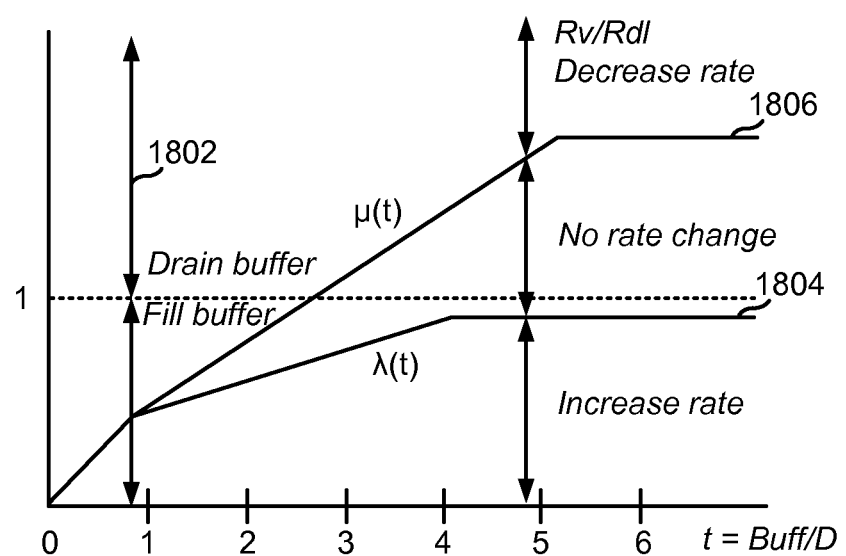
FIG. 18 illustrates examples of the lambda and mu functions as might be used to select a playback rate.

FIG. 18 illustrates examples of the λ and µ functions as might be used to select a playback rate. The x-axis is the buffer level in units of D, the y-axis is the receive fraction, i.e., the playback representation rate divided by the current receive or download rate. As illustrated by line 1802, if the receive fraction is less than one, the buffer will grow, and if it is greater than one, it will shrink. Three areas are identified. First, if the player is below λ-curve 1804 at a decision point, it will switch up in rate. If it is between λ-curve 1804 and µ-curve 1806, it will stay at the selected rate. If it is above µ-curve 1806, it will switch down.

Figure 19:
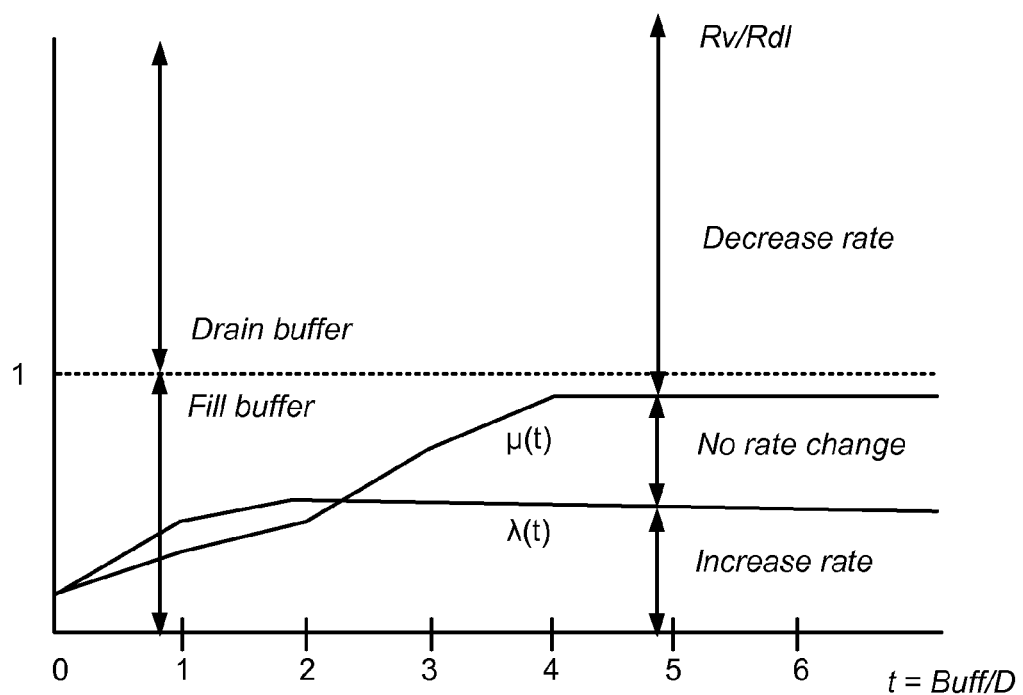
FIG. 19 shows an example choice of the (lambda, mu)-functions using a "conservative" setting.

FIG. 19 shows an example choice of the (λ, μ)-functions using a "conservative" setting. This setting is "conservative" in that it does not use all the bandwidth available, but will in exchange stall very rarely.

Figure 20:
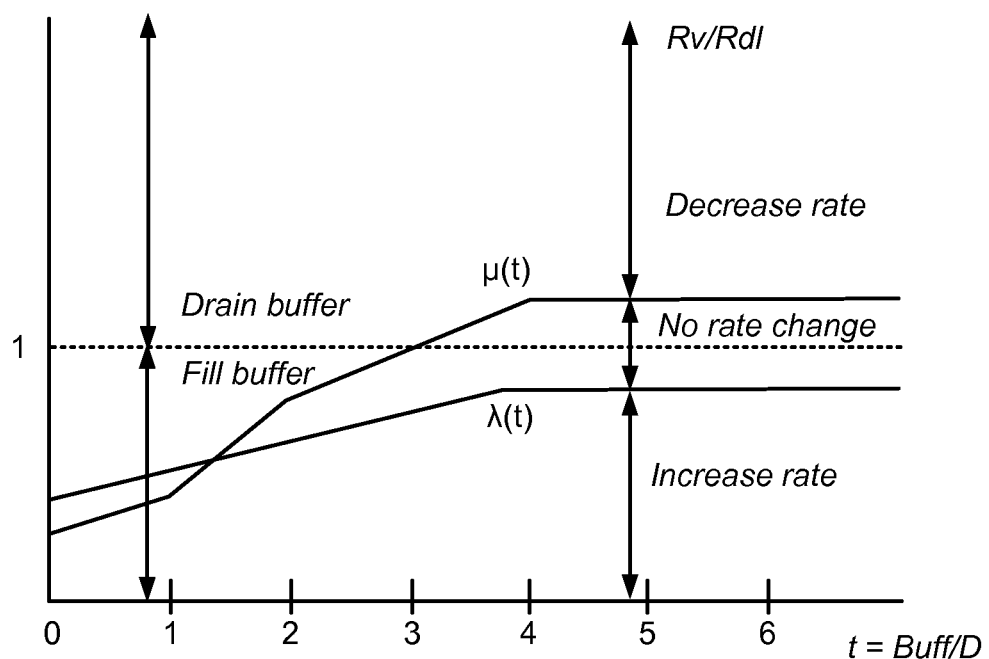
FIG. 20 shows an example choice of the (lambda, mu)-functions using a "moderate" setting.

FIG. 20 shows an example choice of the (λ, μ)-functions using a "moderate" setting. This setting is "moderate" in that it uses more bandwidth than the conservative one, but is a bit more prone to stalls.

Figure 21:
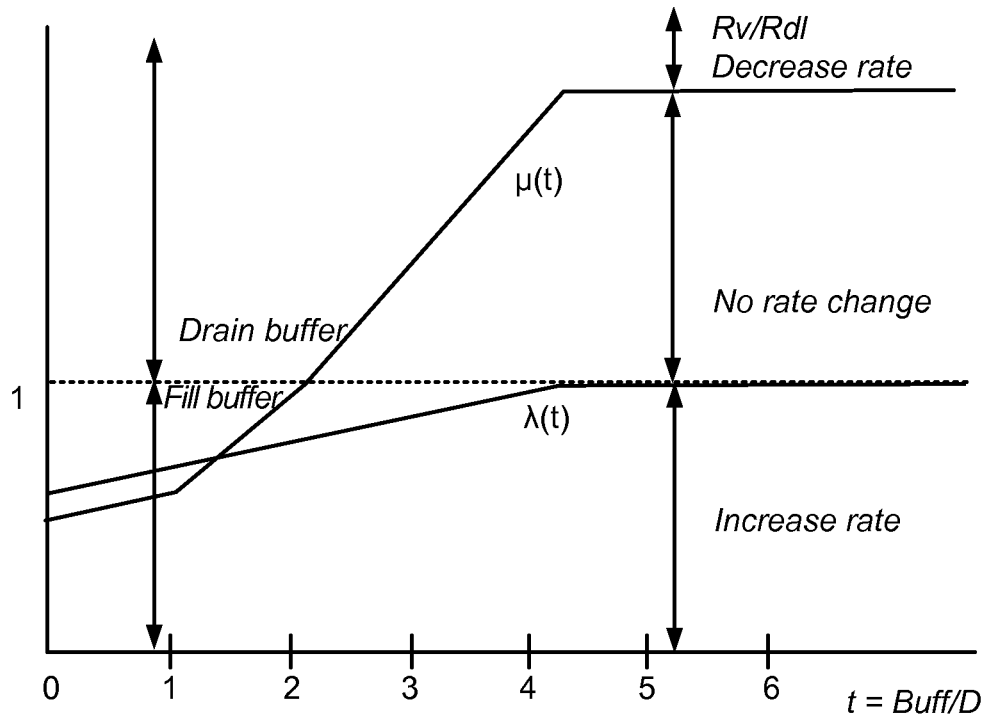
FIG. 21 shows an example choice of the (lambda, mu)-functions using an "aggressive" setting.

FIG. 21 shows an example choice of the (λ, μ)-functions using an "aggressive" setting. This setting is "aggressive" in that it tries to aggressively use all the available bandwidth. It might stall more often than the other two presented example settings.

Figure 22:
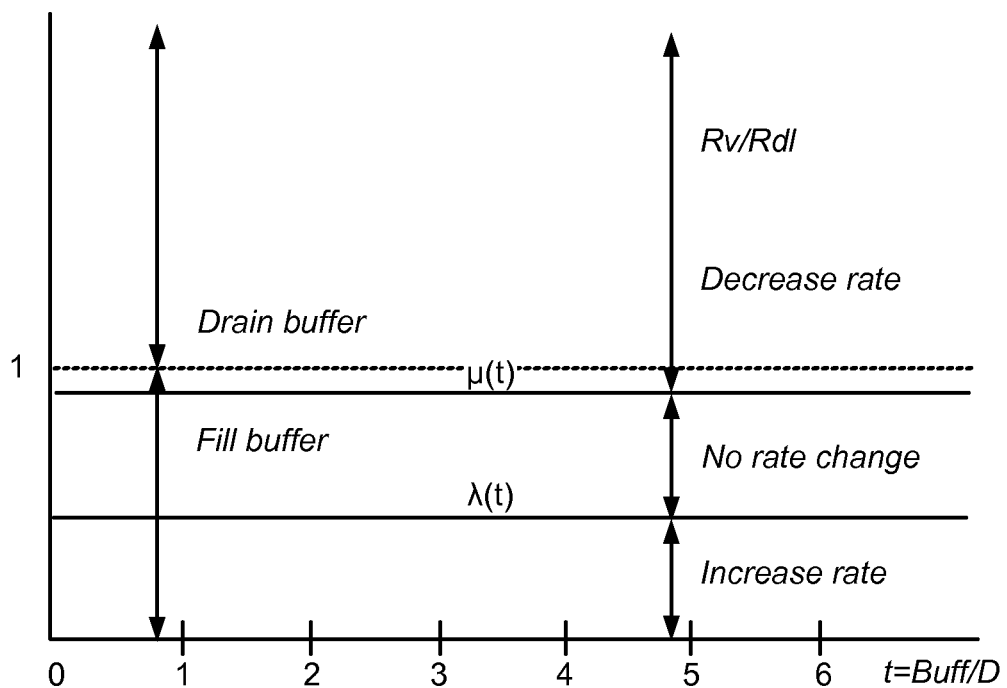
FIG. 22 shows an example choice of the (lambda, mu)-functions using a process for emulating an MLB process, to some extent.

FIG. 22 shows an example choice of the (λ, μ)-functions using a process for emulating an MLB process, i.e., a process similar to one proposed by some researchers working with Major League Baseball (MLB), to some extent. Note that the (λ, μ)-functions do not vary based on the media buffer fullness.

Figure 23:
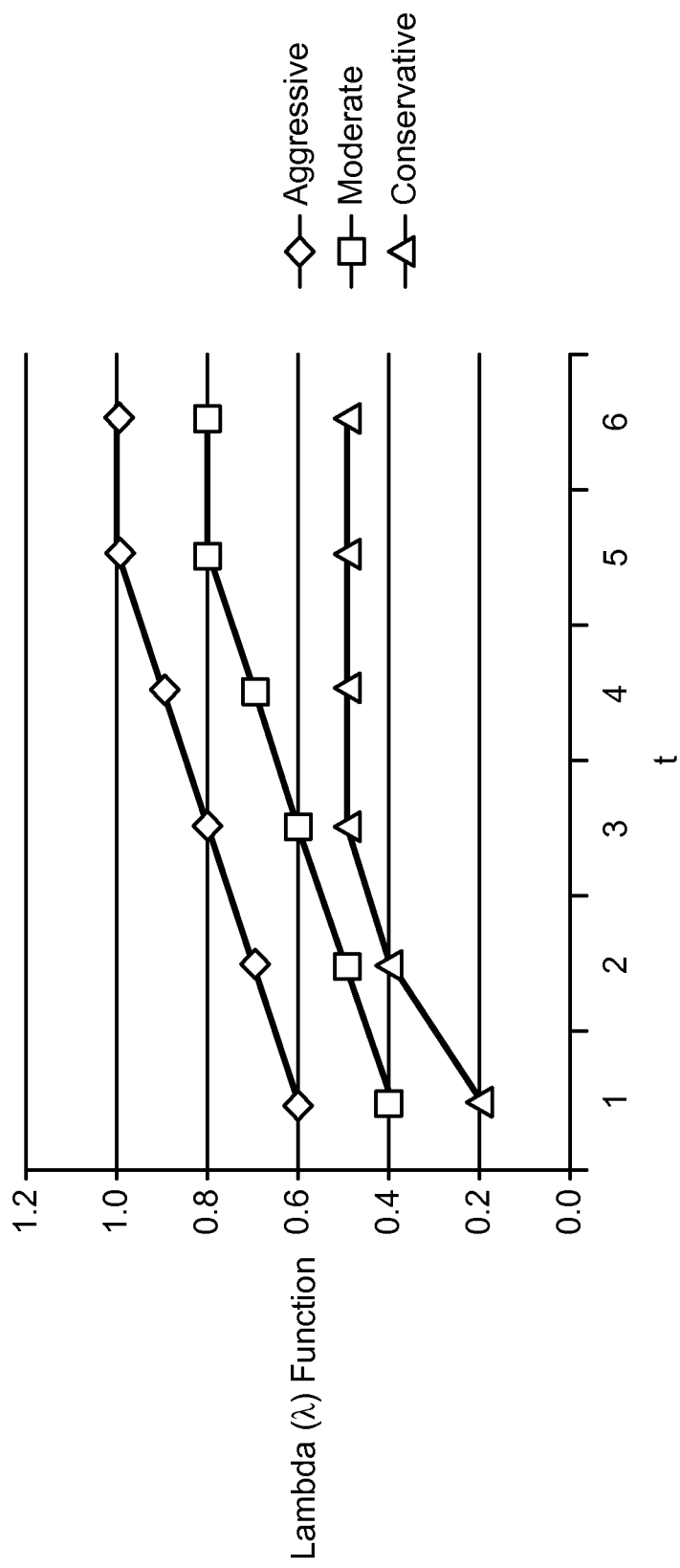
FIG. 23 illustrates an example of side-by-side values for the lambda settings.

FIG. 23 illustrates an example of side-by-side values for the λ and μ settings.

Figure 24:
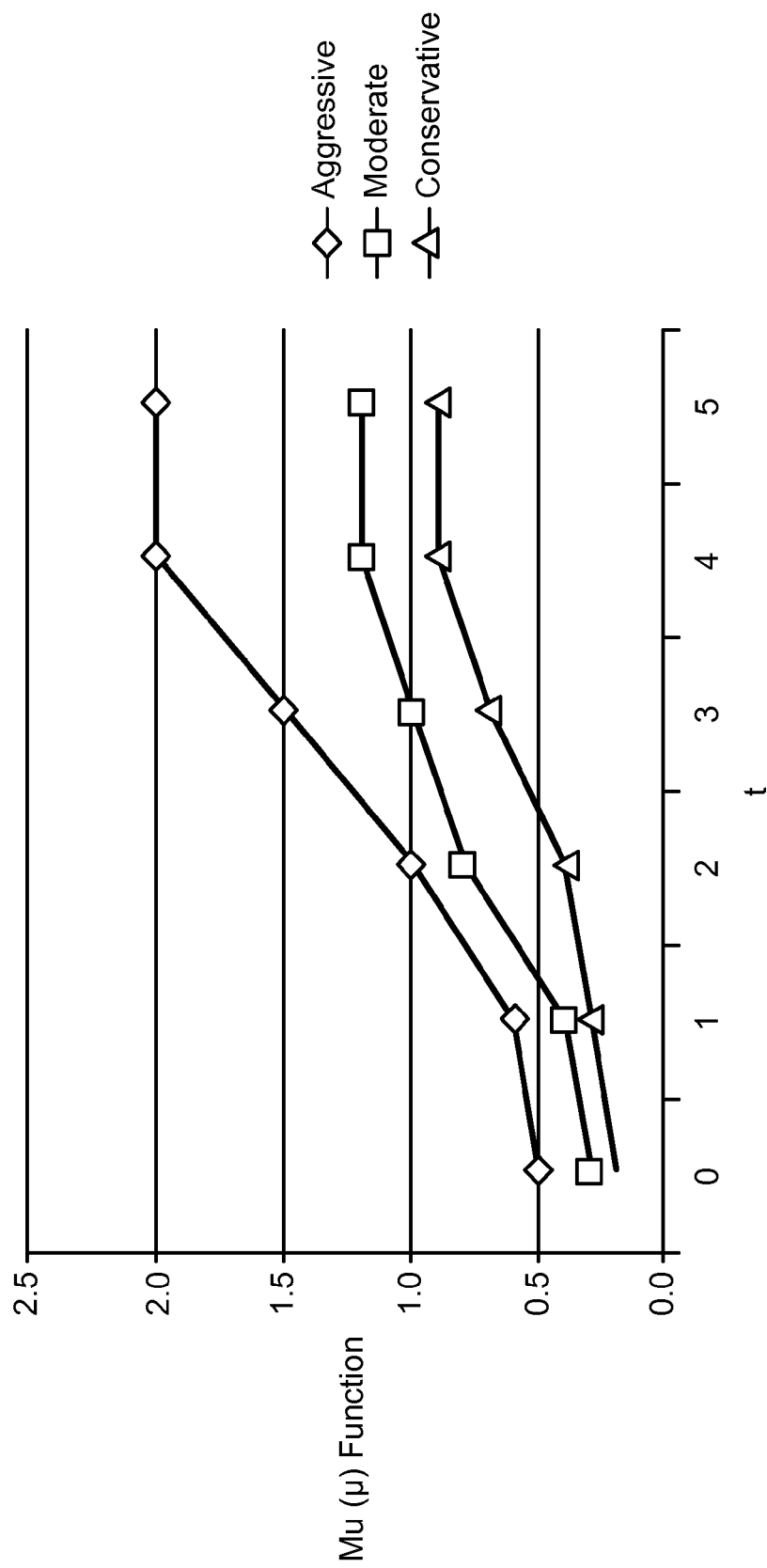
FIG. 24 illustrates an example of side-by-side values for the mu settings.

FIG. 24 illustrates an example of side-by-side values for the λ and μ settings.

FIG. 36 comprises tables of values as might be used for λ and μ in rate selection.

Figure 25:
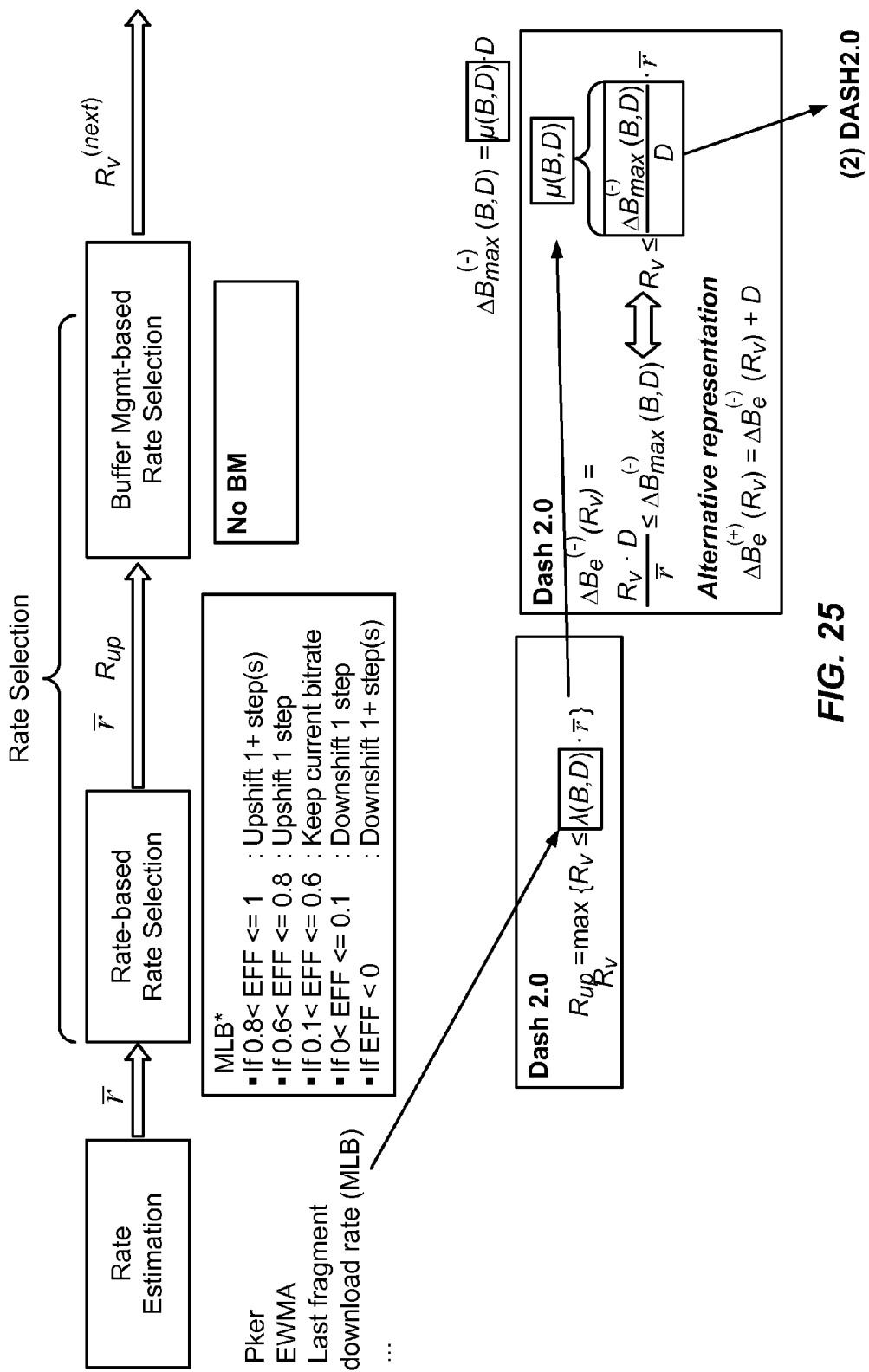
FIG. 25 illustrates a process for rate estimation, then rate-based rate selection, then buffer management-based rate selection.

FIG. 25 illustrates a process for rate estimation, then rate-based rate selection, then buffer management-based rate selection. In this example process, one or more of the approaches described herein are used to perform rate estimation. Based on that estimate, a new playback rate is selected and possible adjusted based on buffer management rules.

5. Request Cancellation

In some cases, even a good rate selection process cannot alone prevent video playback stalls. For example, if the download rate dropped precipitously after the request was made but before completed, the selected bitrate may have been too large, and the slow download rate could lead to a playback stall before the next switch opportunity to change the playback rate is even reached.

As another example, the media buffer may be full of relatively low playback rate media when the available bandwidth increases dramatically, e.g., due to a transition from a cellular connection to a WiFi connection. In this case, it can be advantageous to discard a large portion of the media already downloaded but not yet played out, download again portions of p-time discarded but this time choosing a higher playback rate representation to download. Thus, the already downloaded low playback rate media is cancelled, and a higher playback rate media from another representation is downloaded in its place to be played out, thus leading to a higher quality user experience.

For this reason, a streaming module implementation can implement a module which monitors the download rate and may cancel earlier decisions in certain circumstances. If a request is cancelled, the streaming module should then issue a new request based on a newer, more suitable estimate of the download rate. We call this monitoring module a request cancellation process here.

A request cancellation process may cancel requests for different reasons. For example, it may cancel requests because the download rate has sharply dropped, and playback is in danger of stalling due to the data not being received fast enough. Another reason to cancel is if it is determined that higher quality media could be selected and retrieved in time for play back. Yet another reason to cancel is where the receiver determines that a stall will occur regardless of what the receiver does and estimates whether a cancellation would shorten the stall period relative to allowing completion of a pending request. The receiver then chooses the action that goes with the estimated shorter stall, also potentially taking into account the quality of the media representation to be played back. Of course, whether or not there is a stall and its duration if there is a stall may differ from the estimate.

The actual cancellation, once it is decided, can be achieved by closing the TCP connection on which the request was issued. Closing will have the effect of telling the server not to continue sending data for the cancelled fragment, and thus the bandwidth used by the closed connection becomes available for fetching replacement data.

The streaming module can then issue a request to replace the cancelled piece. It may be necessary to open a new TCP connection for this purpose.

An implementation has several options of choosing the replacement request. Which one is the most suitable one may depend on the type of content that is being played out.

It may try to pick a replacement request that allows for seamless play back of the stream. In the general case this means that the replacement request must have a switch point at or before the end time of the previous downloaded fragment.

In that case, the player should cancel if a stall is predicted when continuing download without cancellation, and it is predicted that with a cancellation and selection of a replacement segment, a stall can either be avoided or at least reduced in duration. It can then pick the highest quality media request with that property for the replacement request.

The rate cancellation process can predict stalls as follows: It can compute an estimated completion time of the issued request by dividing the number of outstanding bytes in the fragment by an estimate of the download rate. If that time is later than the deadline by which the fragment is needed for smooth playback, a stall is predicted.

When an imminent stall is predicted, the request cancellation process determines whether a switch in rate is likely to improve things or not; a decision to cancel is only made when an improvement is likely.

One implementation can estimate the time it takes to load the replacement fragment based alone on the rate estimate and the size of a candidate replacement fragment.

Another implementation might take the additional overhead due to cancellation into account as well: It can add a multiple of an estimated RTT to account for the time needed to cancel an existing request and issue a new request. Data that is queued for delivery on the network from the canceled request, but has not arrived at the destination can contribute to additional delay. The client can estimate this delay by dividing the TCP receive window size by the estimated rate. Another estimate of delay can be based on an estimated bandwidth-delay product. The client can take a combination of the two estimates, such as the maximum of the two.

In summary, the client computes the sum of the time needed to download the entire replacement fragment, a quantity typically proportional to the RTT, plus an estimate of the queuing delay. If a stall is predicted and that time is smaller than the estimated remaining time to download the current fragment, a cancellation is issued.

A request cancellation process may also cancel at startup, when the player notices that downloading the first fragment takes longer than desired, because the initial rate choice was not accurate.

Another rate cancellation implementation may also pick a replacement request that does not allow for seamless playback, but instead implies skipping a number of frames. This may be necessary when playing live content which requires the end-to-end latency to be kept small.

An implementation that does cancellations with frame skips may pick the replacement fragment in a way so that the frame skip is as small as possible.

The implementation may choose, as replacement request, the highest quality request that can be sustainably downloaded without exceeding a specified stall duration or skip frame duration.

A different kind of cancellation can be implemented for already downloaded fragments: If a player has already buffered some media that is going to be played out, it may decide that to fetch a higher quality representation over the network and stream that, while discarding the previously buffered lower-quality version.

That cancellation process may decide to do these replacement operations if it determines that it can receive better quality video in time so that it can be played out without stalling.

Figure 26:
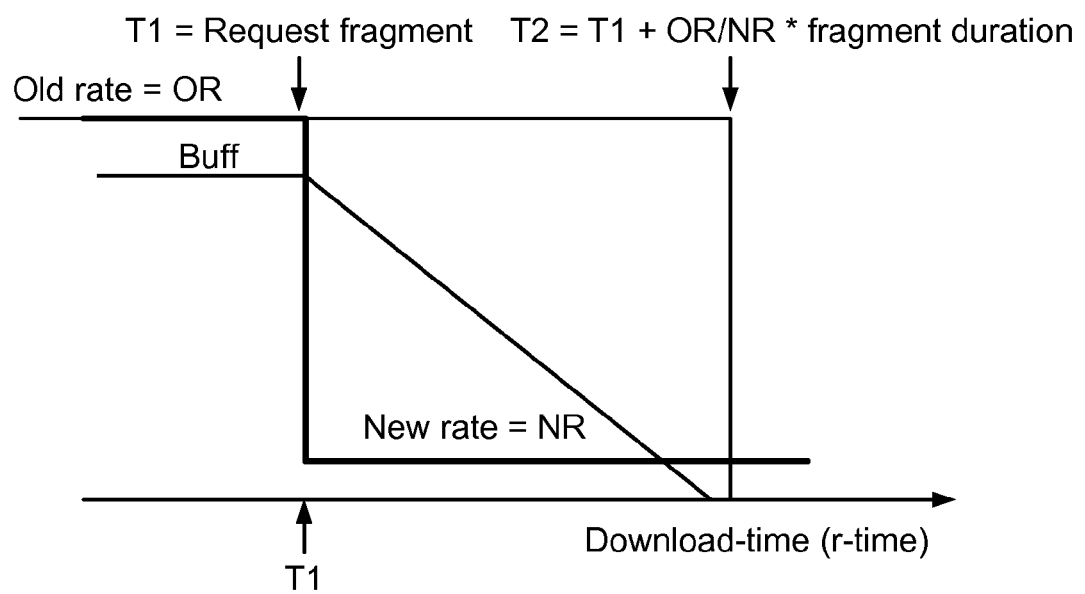
FIG. 26 illustrates a rate drop without a request cancellation.

FIG. 26 illustrates a strong drop in download rate happening just immediately after a new fragment request at time T1. Up until the request the receive rate was OR, and then it dropped to NR. The buffer level now drops. The newly requested fragment will be completely downloaded at time about T2=T1+OR/NR*fragment duration. If OR/NR is large, this might be more than the p-time duration of media content in the buffer at time T1, which means that the requested fragment cannot be played back without a stall. Note that the pker estimator will have converged to the rate NR much faster, but since the request was made previous to T1 the download of the fragment is made before the estimate has a chance to converge to the new rate NR. To avoid the stall, and issue a new request with the corrected estimate, it is necessary to cancel the request and reissue a request in a more suitable bitrate.

Figure 27:
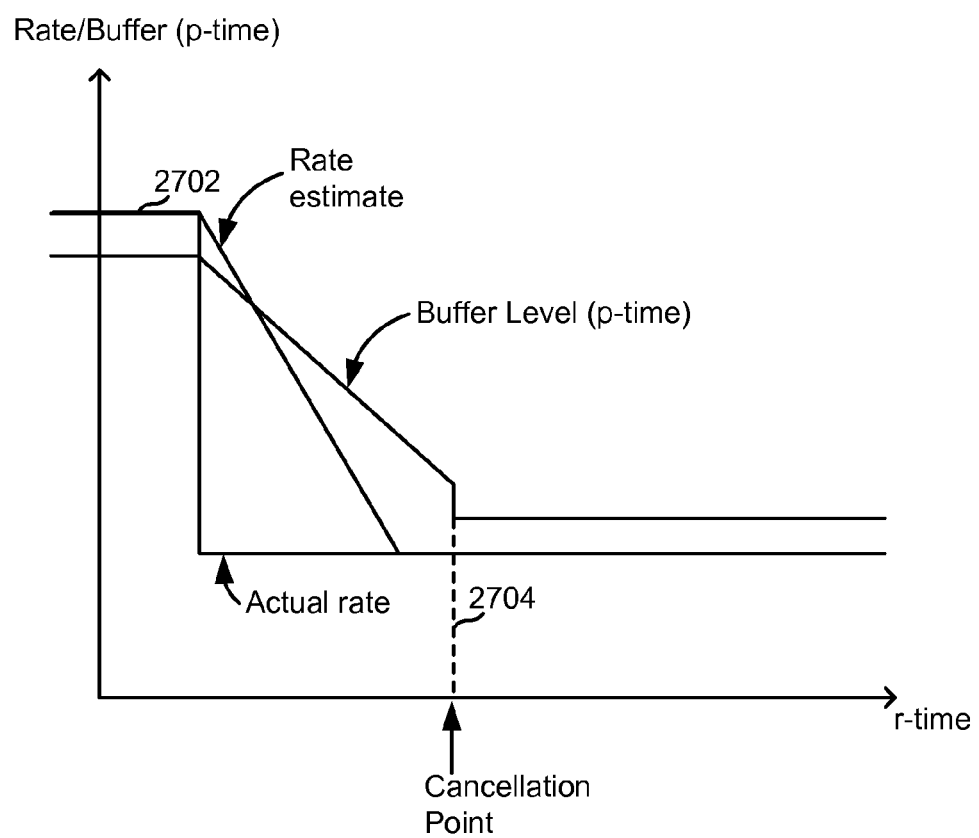
FIG. 27 illustrates a rate drop with request cancellation.

FIG. 27 illustrates a case with request cancellation. After a sharp drop in download rate (line 2702), the buffer starts draining, and the estimated download rate (e.g., a pker process) starts converging to the new download rate. At some point, the stream manager notices that the fragment will not be received in time for playback without stalling. That point is marked as "cancellation point" 2704 in the plot of FIG. 27. At that point, the fragment that has been partially received will be cancelled, and it is evicted from the buffer (hence the additional drop in the buffer level). But after that, a fragment with the correct rate can be requested, and thus the buffer level does not drop further. In fact, if a nontrivial rate-selection process is used, it may grow again.

Figure 28:
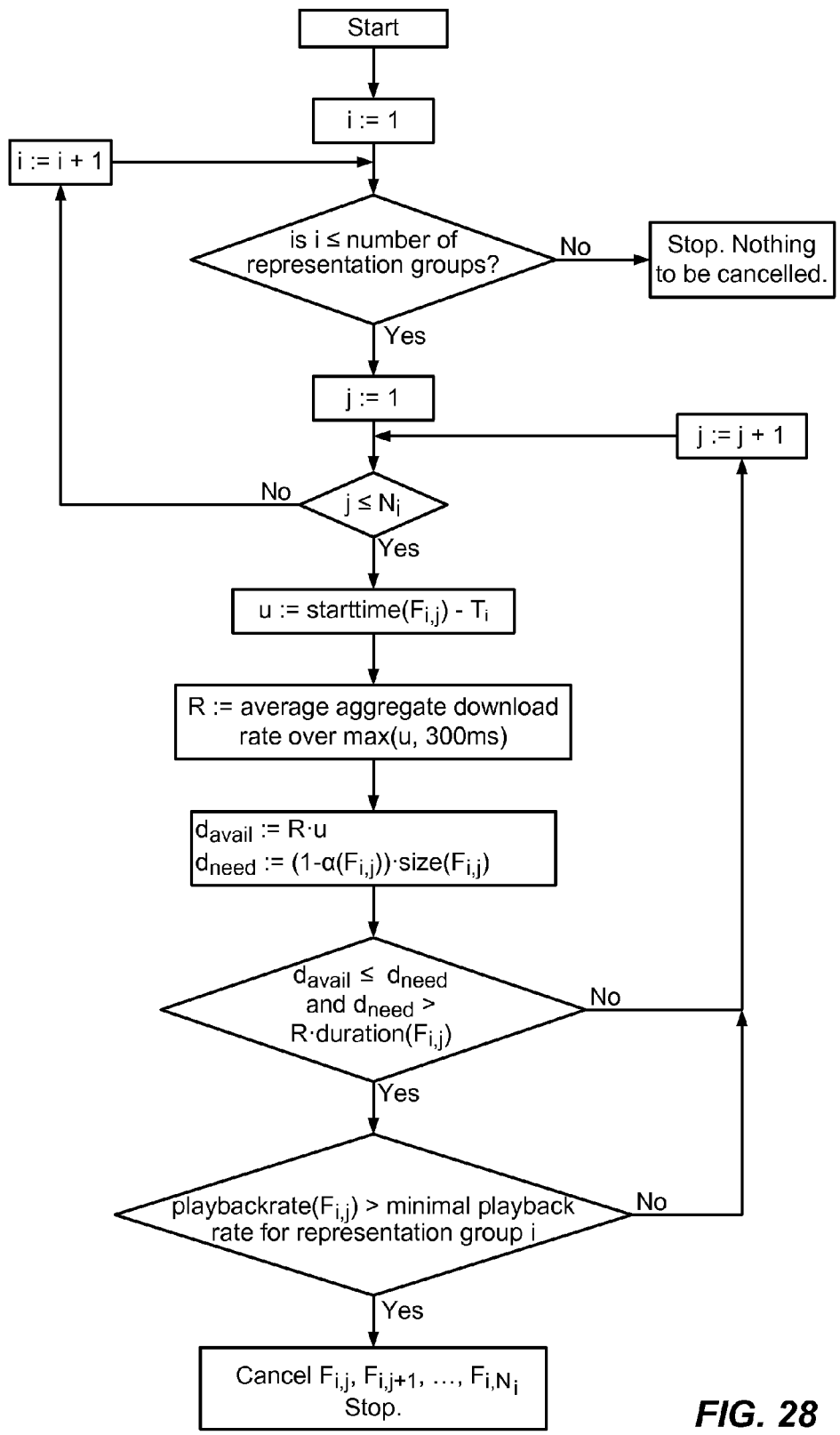
FIG. 28 is a flowchart illustrating an example request cancellation process.

FIG. 28 is a flowchart illustrating an example request cancellation process.

FIG. 29 illustrates a process for request cancellation detection.

We now describe a request cancellation implementation based on the above details.

In this section, $N_i$ denotes the number of fragments in representation group i that have been requested, but not yet completely received. Those are referenced as $F_{i,1}, \ldots, F_{i,N_i}$. Assume furthermore that the $F_{i,j}$ are sorted in increasing start-p-time order, $\alpha(F_{i,j})$ is the amount of bytes already downloaded for the requested fragment $F_{i,j}$ divided by its size in bytes. The variable T denotes the current playback p-time. A request cancellation detection process might proceed as shown by the pseudocode of FIG. 29.

When the request cancellation detection process is run, it can either return nil, in which case no action is to be taken, or it will identify a fragment in a group to cancel. If such a fragment is identified, it means that this fragment, and everything in the same group coming behind it (in p-time order), is to be cancelled, and flushed from the buffer. The SM should then invoke its rate decision process again, and issue new alternative requests for the section.

To explain the process, assume for the time being that only a single request is ever outstanding. In that case, let R be an accurate estimate of the download rate, and let $d_{avail}$ be the number of bytes that still could be received until the fragment in question is to be played out. The quantity $d_{need}$ is the number of bytes still missing in that fragment. Thus, if $d_{avail} < d_{need}$, we predict that the player will stall before playing the fragment $F_{i,j}$. This explains the first "if" condition in the process above.

Even if a stall is predicted, it makes only sense to cancel if a cancellation would result in avoiding the stall, or at least reduce its duration. After cancellation, a new fragment would have to be selected, and downloaded from scratch. If there is only one representation group, and the rate decision process chooses the right rate, this would take time approximately times the duration ($F_{i,j}$), where is the currently relevant lambda factor. On the other hand, if the SM decides not to switch, finishing the current fragment download would take time $d_{need} \cdot R^{-1}$. Assuming, for simplicity, $\lambda=1$, we get the second condition, possibly with other factors.

6. The Request Accelerator

The straightforward way for a streaming media client is to fetch the media with a single HTTP connection. Such a client would process the fragment requests sequentially. Such an approach has some disadvantages in video streaming. First, general networking software is often tuned only for maximum throughput over a long download. While this is good for receiving large files, it conflicts with other important streaming goals, such as a steady reception rate. Second, due to the nature of TCP, the full capacity of the link can not necessarily be used with such a HTTP connection. If the channel experiences some delay and packet loss, TCP limits the actual throughput that can be achieved, which potentially prevents the streaming client from streaming good quality media.

To avoid these problems, a special HTTP client can be implemented, which we call a request accelerator (RA) herein. The request accelerator has special processes to avoid or reduce the problems mentioned before. An implementation of a request accelerator can make use of several key ingredients to achieve its goal. It can use several TCP connections to receive the data. Those connections can be active in parallel. It can split up data requests into smaller chunk requests, which can be individually downloaded on the different connections and reassembled to one big piece in the request accelerator. It can tune the TCP connection parameters (such as in particular the TCP receive window size), so that the connections are fair to one another, and have relatively steady data reception. It can dynamically adjust the number of TCP connections to use based on measured network conditions and target playback rates.

The ideal number of TCP connections to use depends on the network conditions, and in particular the round trip time (RTT) and the packet loss behavior. The RA therefore can use methods to estimate these quantities.

An RA can estimate the RTT by sampling the time it takes from issuing a HTTP request until the response starts coming in. One implementation may use an estimate of the RTT obtained by taking the minimum of all such samples obtained over a fixed period of time, say the last few seconds. Another implementation may use the minimum of the last N obtained samples, where N is some integer, as the estimate.

It is often difficult to obtain measurements of packet loss above the TCP layer, as the TCP protocol handles packet loss and delivers consecutive prefixes of data to the application. Thus, it is sometimes useful instead to fix a reasonable value for the packet loss as an input to the RA process. An implementation may estimate the loss to be constant. Lacking any packet loss measurements, the RA may estimate the loss to be 1%, or the RA may estimate the loss to be 0.1%. The estimate may be determined by the type of connection, e.g., the estimate may be set to 0.1% for a WiFi connection and may be set to 1% for a cellular connection. Other methods such as variance in RTTs may be used by the RA to indirectly infer packet loss. Alternatively, an implementation may obtain a packet loss estimate by querying the operating system kernel for information on that.

Another implementation may estimate the loss in the application itself. To do that, it may use the following procedure which is based on the observation that data from a network socket is generally received in maximum segment sized (MSS) chunks, but that a packet loss causes the reception of a much larger chunk, a burst of approximately the size of a whole TCP receive window. Let M be the MSS in bytes (a good guess is M=1500); then if n bytes have received, the number of packets sent is about n/M. Let z the number of socket reads that resulted in more than k·M bytes read, where k is some small integer. Assume k is chosen large enough so that it is unlikely that k or more packets arrived between two network reads of the application. For an application that constantly waits on the socket, k=3 should be fine. Then, p=z·M/n is an estimate of the packet loss probability. By counting z and n from a desired starting point, this procedure can estimate the packet loss rate over any desired range of time.

Given an estimate of the RTT and the packet loss probability, an application can compute a good number of connections needed. The process may in particular choose a number of connections that is large enough so that the target download rate can be achieved with that number of connections. The achievable rate of a single rate is generally limited by the TCP equation on achievable throughput, which says that roughly a single TCP connection can achieve an average download rate of T=MSS/(RTT·√p). Thus, the process may choose the number of connections to be proportional to the target download rate divided by T.

The RA may also impose lower and upper bounds on the number of TCP connections to use, for practical reasons. For example, the RA may bound the maximum number of connections it opens to 8, and the minimum number of connections to 2.

The bandwidth, the loss probability, and the RTT are subject to change. The request accelerator monitors those quantities and changes the number of connections dynamically.

A request accelerator can split a HTTP request into smaller subrequests and reassemble the returned data response for every subrequest into a coherent response corresponding to the original request. There are a number of advantages to splitting requests into subrequests. First, in order to utilize the available TCP connections, it is necessary to be able to issue requests on all of them. A media streaming player may not provide enough requests to use all the connections. Request splitting mitigates this problem, since it results in a larger number of subrequests, which can then be issued on different connections. Second, request splitting results in shorter requests, which reduces the risk of untimely data delivery: if some TCP connections are temporarily slower than others, they can still be used with short requests. They will deliver a response slower than the faster connection, but the additional relative delay to complete the overall request may typically not be that large, since the requests are small.

In general, if more connections are in use, it is preferable to create more subrequests per request. To achieve this, the Request Accelerator can split each request into n subrequest when there are n connections.

Another implementation picks the number of subrequests per request depending on the request size. If the subrequest size is chosen to be of a size that is predicted to take a fixed amount of time (2 seconds, say) to download, then requests will be split into more subrequests if there are more connections, achieving the desired effect.

The splitting rule should make sure that there are no unnecessarily small subrequests. For example, an RA implementation could impose a minimum subrequest size in its splitting processes, and split into fewer subrequests if the minimum is not met.

When multiple TCP connections are used they possibly compete for bandwidth. On a large time scale, each connection will receive the same amount as the others, but on a smaller scale, such as over a couple of seconds, some TCP connections may be significantly slower than others. This poses a problem for streaming, since it implies that some subrequests may take much longer than others, which can lead to playback stalls.

In order to avoid this, the RA can use TCP flow control to "tame" the connections. It can limit the maximum receive window of each TCP connection sufficiently, so that no connection can use significantly more than its fair share of throughput. The amount of data in flight (sent but not yet acknowledged) over a TCP connection is roughly the download rate divided by the RTT. Thus, if the TCP receive window is set to roughly, or slightly more than, the target download rate for the connection divided by the estimated RTT then the download rate will be restricted to roughly or slightly more than the target download rate. Thus, setting the TCP receive window size can act as a governor, ensuring that a given TCP connection does not download at such a high rate that it forced other TCP connections to download at much lower rates. With such a mechanism in place, the connections tend to fetch at roughly the same speed, because slow connections then have the bandwidth available to speed up to their fair share, but at the same time the connections can achieve an aggregate download rate that is at least, or slightly higher than, the aggregate target reception rate.

The RA can adjust the receive window in the client by adjusting the receive buffers. It readjusts these setting always between consecutive requests.

An implementation can set the TCP receive window of each connection to slightly more than the product of the estimated RTT and the target download rate divided by the number of connections.

The target download rate can be determined for example from the media rate that one aims to play back. Another implementation can set the target rate based on the current playback rate (e.g., twice the current download rate).

6.1 Embodiment of an RA

We now describe an embodiment of a request accelerator that incorporates the elements described above.

Figure 30:
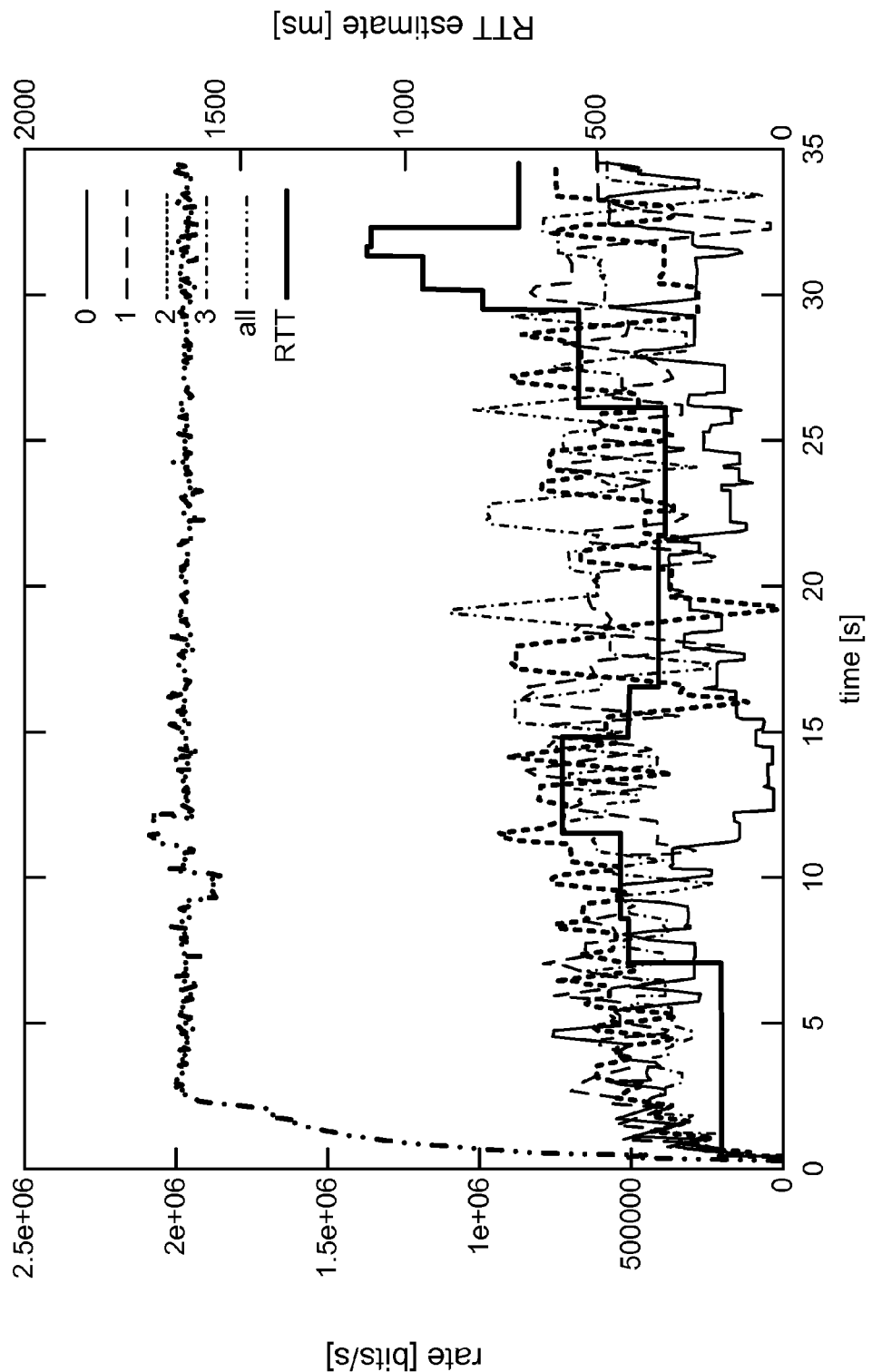
FIG. 30 is a plot of behavior of fetching with multiple TCP connections, but without receive buffer tuning.
Figure 31:
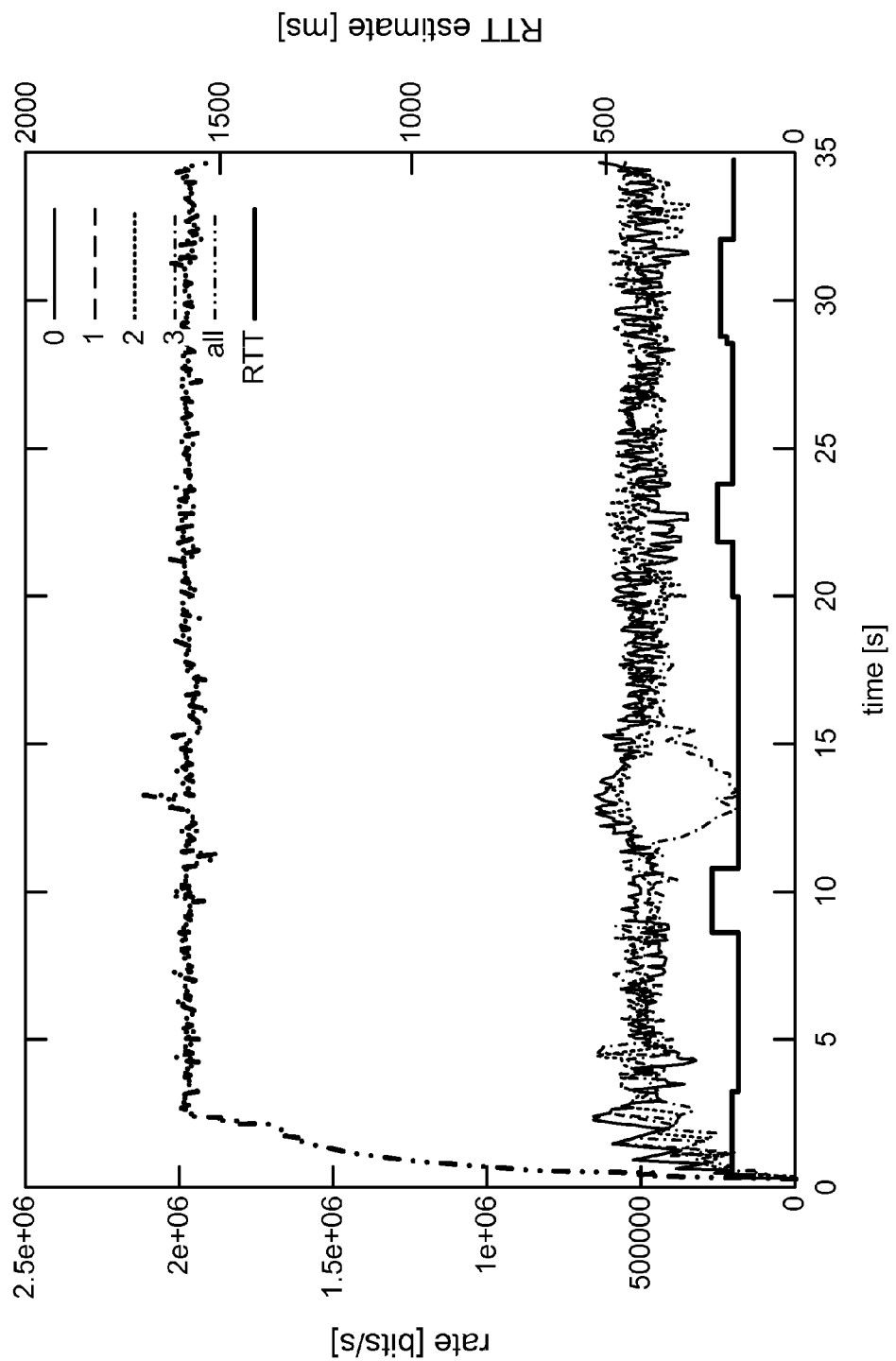
FIG. 31 is a plot of other behaviors of fetching with multiple TCP connections, and with receive buffer tuning.

FIG. 30 is a plot of behavior of fetching with multiple TCP connections. FIGS. 30-31 show the behavior under different conditions. In the example, the connection to a web server was bandwidth limited to 2 megabits per second ("mbps"), the round trip time was 150 ms, and there was 0.1% packet loss. There were four connections active fetching fragments. The plots of FIGS. 30-31 show the instantaneous rates of the four connections, as well as the aggregate rates, as well as an RTT estimate obtained in the client.

In FIG. 30, the receive buffers of the connections are not limited. In FIG. 31, they are limited to about twice the bandwidth-delay-product.

In the example of FIG. 30 and FIG. 31, both methods achieve the 2 mbps total throughput steadily. In the case where the connections have limited receive windows (FIG. 31), the delivery among the connections is much more even: Most of the time they receive at about the same rate. That is not at all true for the connections with unlimited windows (FIG. 30), where some connections are slower than the other ones over long stretches of time.

Uneven connection speeds are problematic for streaming application, since it might mean that some urgent data is coming in only very slowly (on a slow connection) while bandwidth is diverted away to the faster connections which might fetch data that is not needed as urgently.

Another difference between unlimited and limited receive windows is the RTT at which the client operates. With the limits in place, the RTT stays low, close to the propagation delay. With no receive window limiting, as the amount of data in flight exceed the underlying propagation delay times the capacity of the connection the queuing delay can become very significant, and cause high RTT. A high RTT is undesirable for a media streaming client, since the reaction time of the client to many events is generally a multiple of the RTT. For example, the client reaction time to a user seek event that causes new media content to be downloaded, or a reduction in download speed that causes a request cancellation or switch of representations, is generally many multiples of the current RTT, and thus the general responsiveness of the client to such events will be degraded when the RTT is large.

Figure 32:
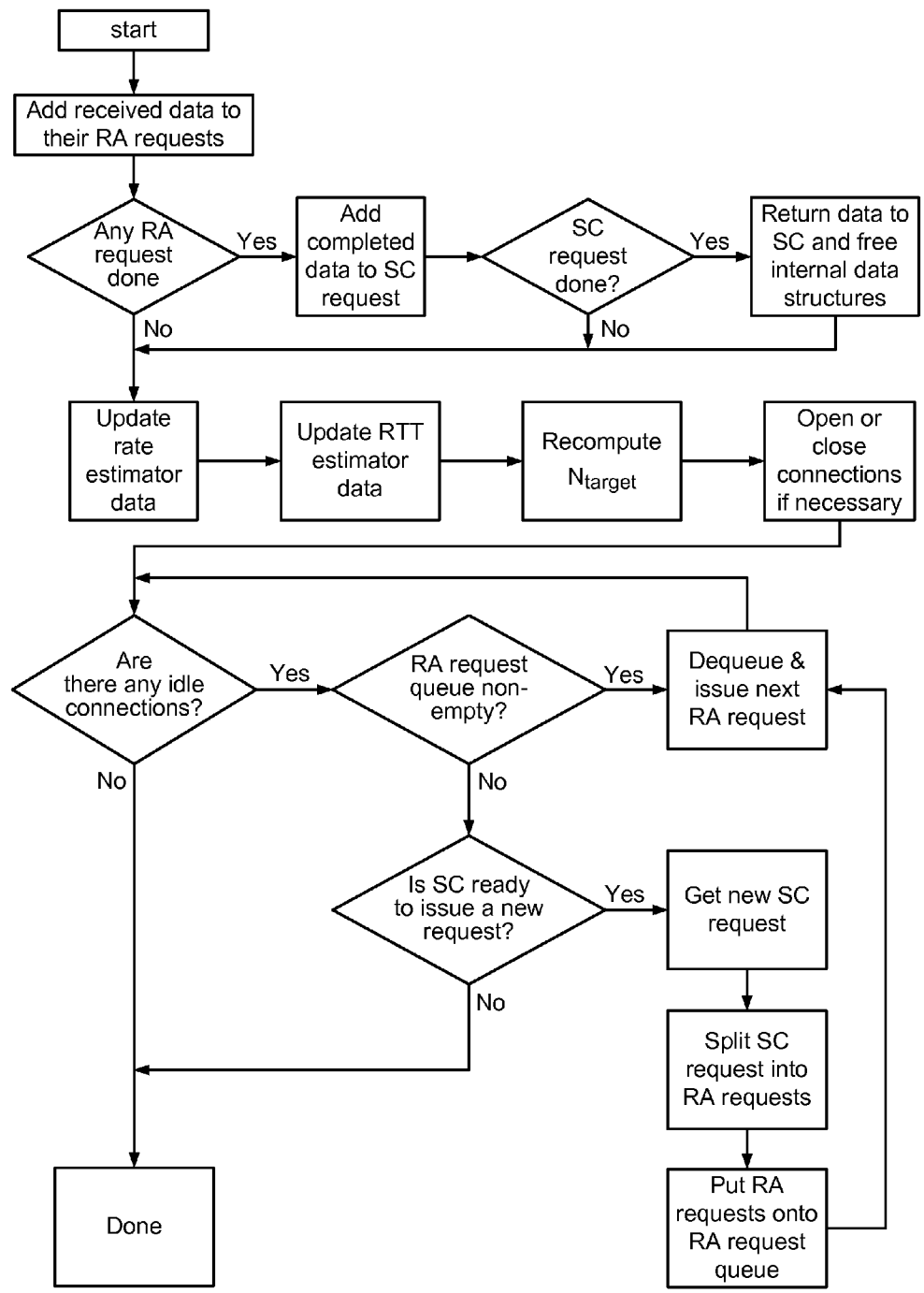
FIG. 32 is a flowchart of an example request accelerator process.

FIG. 32 is a flowchart of a request accelerator process.

FIG. 33 illustrates a process for finding a number of subrequests to make for a given fragment request.

FIG. 34 illustrates a process for selecting individual requests chosen to be disjoint intervals of source requests having computed sizes. In this process, the subrequest sizes are intentionally randomized, so that the time when the connections are idle varies from connection to connection. This avoids that all connections are idle at the same time, resulting in better channel utilization. The request sizes are also ordered, so that larger requests go out earlier, helping to keep the differences in idle times bounded.

Figure 35:
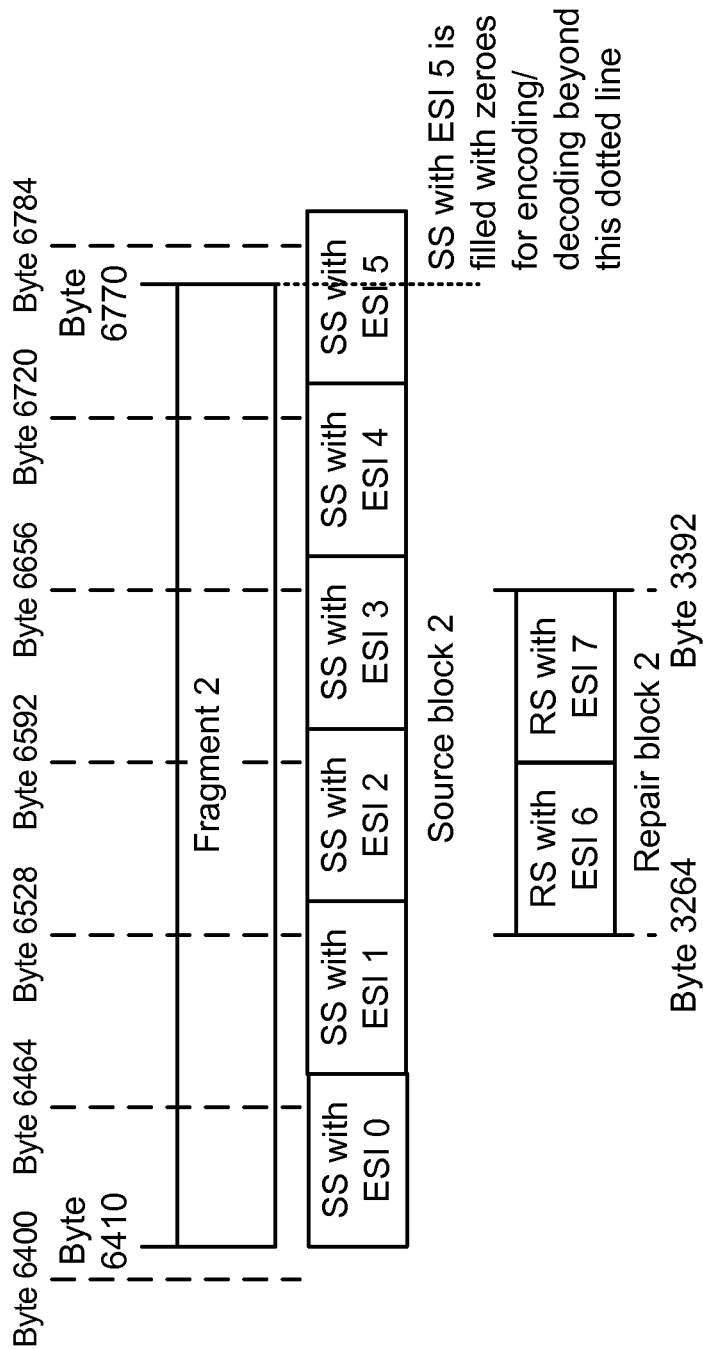
FIG. 35 shows an example of time offsets and fragment structure for a repair segment determined by time offsets.

FIG. 35 shows an example of time offsets and fragment structure for a repair segment determined by time offsets.

In operation, the Request Accelerator receives HTTP requests (each request being a URL and a byte range) from SC.

The Request Accelerator downloads the requested byte ranges over HTTP and hands the data, once it has been completely received, back to the SC. The RA aims to achieve a sufficiently large download speed, but at the same time make sure that each fragment is received before its deadline time. A high download speed makes it possible to choose a high quality video representation, while respecting the deadline makes sure that the playback proceeds with no stalls.

In order to achieve the goal of a high download speed, the RA manages a varying number of open TCP connections, all of which are used to receive data over HTTP. The RA takes care of the details of how many connections to use, of opening or reopening them if necessary, and of how to dispatch requests to connections.

The RA will in some cases decide to split source requests into smaller so-called RA requests which are then dispatched to different connections, and the response data of which is transparently reassembled by the RA upon arrival. For example, for a source request comprising the first 64 kilobytes of some file, the RA may create two RA requests; one for the 32 kilobyte chunk and another one for the second 32 kilobyte chunk of that file. The RA can then request those two chunks in parallel on two different connections, and create a coherent 64 kilobyte response for the original request once the two 32 kilobyte chunks have been received.

The RA might issue RA requests that are more than just plain subranges of source requests. For example, it might issue a request for FEC data of a fragment in addition to the plain video data. In that case, the RA would transparently decode the FEC information once it has been received, and present only the final, decoded fragment to the source.

The RA autotunes itself to the network conditions. For example, if the RTT is large, the RA may decide to issue larger chunk requests, so as to avoid a lot of idle time between requests. Another example of autotuning is that the RA tries to keep the speeds of the individual connections similar, so as to ensure timeliness of its requests. In order to be able to do those things, the RA preferably has direct access to the sockets of its connections. For example, in a Unix-like environment, it might be able to set socket options using the setsockopt( ) function.

The RA measures and keeps track of the network state; this includes in particular measuring the download rate and the estimated round trip time (RTT). It collects this information first because connection autotuning depends on their availability, and second, because the bandwidth information needs to be passed on to the SM, which uses it to compute its rate estimates.

Another piece of information that the RA forwards (via the SC) to the SM is progress information about outstanding requests, i.e., how much data of a given request has already been received. The SM uses that information for both its rate estimates as well as for the request cancellation decisions.

The RA keeps track of information needed by the SM to make bandwidth estimates. This information is the total amount of r-time spent downloading, $T_r$, and the total amount of bytes downloaded, Z. Both these numbers are monotonically increasing, and frequently polled by the SM. The $T_r$ timer is running if and only if at least one connection is active. A connection is considered active if it is sending out a HTTP request or waiting for response data to come in. The Z counter counts the incoming bytes and is aggregate over all connections.

6.1.1 The RA Download Rate History

The request accelerator keeps track of some history of rate by keeping a growing array of ($T_r$, Z)-pairs, which are stored in their historical order. We call this array mapTrZ. The updates in mapTrZ happen frequently; at least at fixed intervals in time (e.g., every 100 ms), and possibly also when new data is received.

The RA can make use of mapTrZ to compute a windowed bandwidth estimate as follows. Consider a window of interest of width t, and let mapTrZ[last] be the last entry in mapTrZ. Then find the largest index i, such that mapTrZ[i]·$T_r$≤mapTrZ[last]·$T_r$−t. Note that i can be found efficiently with binary search. The rate average is then as shown in Equation 8.

$$R := \frac{mapTrZ[\text{last}] \cdot Z - mapTrZ[i] \cdot Z}{mapTrZ[\text{last}] \cdot T_r - mapTrZ[i] \cdot T_r} \quad \text{(Eqn. 8)}$$

Equation 8 assumes that the differences in subsequent $T_r$ are small compared to t. This is ensured by sampling often enough, and never picking a tiny window width t.

In practice, an arbitrarily growing array is a nuisance. The maximum duration over which the past is looked at can be upper bounded, therefore there is a way to implement mapTrZ as a ring buffer of fixed size instead. This can be done as follows. Whenever the mapTrZ array is to be updated, and the mapTrZ array contains already at least two pairs, replace the last entry if $T_r$−mapTrZ[last−1]·$T_r$<100 ms, and add a new entry otherwise.

6.1.2 Round Trip Time ("RTT") Estimates

The RA collects bandwidth estimates. A simple way, a priori, to get an RTT sample is to measure the difference in time when a HTTP GET request is sent out on an idle connection, and the response is starting to come in.

However, such measurements do include queuing delay: If the client has other open active connections, then the last hop sending data to the client may buffer a number of packets, if its link to the client has a lower rate than the rate at which it can receive data. In that case, packets may be delivered with longer delay than they intrinsically do.

It is desirable, in our case, to know the RTT discounting for the queuing delay induced by activity of the client itself. To get an estimate of that quantity, we proceed as follows:

During each period of activity, we collect RTT samples with the timing method described before; each GET results in a sample. The current estimate is then the minimum of all those samples. The list of samples is flushed whenever the RA becomes inactive. (The client becomes inactive, for example, when the high watermark of section 3 is exceeded, and started downloads have finished.) In inactive periods, or in active periods before any RTT sample has been received, the RTT estimate is the last known estimate.

The RTT estimator can also return a symbolic "no RTT estimate is known" value, which can be used at client startup for example.

6.1.3 Adjusting the Number of TCP Connections

Tuning the TCP flow control allows the RA to keep the bandwidth in the different connections roughly the same. A number of configurable tuning constants might include $k_R$ (rate measurement window measured in RTTs; suggested value: 30), $k_N$ (a proportionality factor; suggested value: 8192 bytes), $N_{min}$ ($N_{target}$ lower cap; suggested value: 1), and $N_{max}$ (target upper cap; suggested value: 8).

The estimated bandwidth-delay-product (BDP) is defined to be BDP:=RTT·R, where RTT is the estimated RTT (as above) where R is the average receive rate over the last $k_R$·RTT time (estimated with the window method).

The target number of connections is then defined to be as in Equation 9, where $k_N$ is a configurable constant.

$$N_{target} := \max(N_{min}, \min(N_{max}, \lceil BDP/k_N \rceil))$$ (Eqn. 9)

The value of $N_{target}$ is i periodically recomputed. If the number of currently open connections is less than $N_{target}$, new connections are opened immediately to match $N_{target}$. If, on the other hand, $N_{target}$ is less than the number of currently open connections, no immediate action is taken. Instead, whenever an RA request is finished, the RA checks whether too many connections are open, and if so, closes the connection that just became idle.

6.1.4 Adjusting the TCP Receive Window on the Connections

The RA sets the TCP receive window size of each connection to $\lceil c_w \cdot BDP/N_{target} \rceil$. Here, $c_w$ is a configurable hardcoded constant, for example $c_w$=3. The RA sets the TCP receive window size of the connection whenever it is going to issue the next HTTP request on that connection.

6.1.5 The Request Splitting Process

Each source request handed to the RA is split into potentially more than one RA request, each of which corresponds to a different part of the range requested. Once the RA requests corresponding to a given source request are all completed, the received data is reassembled to a complete fragment by the RA, which is then returned to the SC.

For a given HTTP request, the RA determines the number, n, of RA requests using a process that depends on a few tunable values. The value of n depends on the following tunable constants: $T_{wn}$ (rate estimate window width; suggested value: 4 s), $D_{min}$ (minimal fetch duration; suggested value: 2 s), and $c_s$ (minimal fetch duration in RTTs; suggested value: 6).

The process for finding the number n of subrequests to make for a given fragment request is then as shown in the pseudocode of FIG. 33.

The individual requests are then chosen to be disjoint intervals of the source requests using, for example, the process shown in FIG. 34, having the computed sizes.

6.1.6 The Request Dispatching Process

The request accelerator maintains a set of RA requests. Whenever a connection becomes ready to issue the next request, a request is dequeued from the RA queue if the queue is nonempty, and issued on the idle connection. If the queue is empty, a new fragment request is obtained from the SC. That request is then split up into RA requests and queued on the RA queue. The queuing is preferably done in the order of the slices as returned by the process for finding the number of subrequests to make for a given fragment request.

HTTP connections may get shut down for various reasons, e.g. because a web server timeout has occurred, or the number of requests that can be issued on a single connection has been exceeded. The RA should handle this situation gracefully and transparently. Whenever a connection is shut down, the RA reopens the connection automatically. If a request was in progress on the closed connection, it is dequeued from the connection, and a new RA request for the not-yet-received portion is placed in front of the RA queue.

This procedure ensures that closed connections have minimal impact on the performance.

6.1.7 RA Parameter Choice in a Specific Embodiment

A TCP connection is constrained by its flow control: The advertised receive window upper-bounds the amount of data that is allowed to be unacknowledged at any point in time. Thus, if W denotes the size of the receive window, and bdp the bandwidth-delay-product of that connection, we have bdp≤W (condition 1). The method in Section 6.1.4 describes choosing a receive window size, such that this condition (1) is met, provided $c_w$>1. This ensures that the individual connections cannot take substantially more than their fair proportion of the available bandwidth. To allow for rate increases, and to avoid a rate downward spiral, it is preferable to choose $c_w$ somewhat bigger than 1, e.g., $c_w$=2 or $c_w$=4. The larger the value, the faster the rate can grow, but the less fair the connections are to one another.

Another limit is imposed by the TCP congestion control process. If p denotes the packet loss probability, and M denotes the TCP maximum segment size, the rate r of a single connection is bounded as indicated by Equation 10.

$$r \leq \frac{M}{RTT \cdot \sqrt{p}}$$ (Eqn. 10)

Now, rewriting this in terms of BDP and the number of connections N (using bdp=r·RTT and BDP=N·bdp), we get what is shown in Equation 11.

$$BDP \frac{\sqrt{p}}{M} \leq N \quad \text{(Eqn. 11)}$$

This suggests that $k_N$ should be chosen to be a bit less than $M/\sqrt{p}$ in Equation 9 in order to ensure that the inequality in Equation 11 holds. A typical value for M is 1 kilobyte, and if we set p=0.01, then $M/\sqrt{p}$=10 kilobytes. Thus, in this example, setting $k_N$=8,192 bytes as suggested in Section 6.1.3 for setting N in Equation 9 ensures that the inequality of Equation 11 is satisfied. A receiver can be appropriately configured or programmed.

We now turn to the process of Section 6.1.3 above, to compute the number n of RA requests for a given source request. A priori, we would like to make the slices as small as possible, since small slices present a number of advantages: If one connection is slow compared to the other ones, this is less likely to cause problems with small requests, because small requests will finish quickly even on a slow connection. Therefore, in a small slice setting, a slow connection will essentially just end up servicing less requests. Another advantage of small slices is that they cause the RA to work on a relatively short section in time of the buffer, so it tends to consolidate its effort to the most urgent work area.

However, making the slices small comes at a cost: First, each request induces some overhead, both on the uplink, and on the downlink. Second, after finishing one request, the connection will stay idle for about an RTT. Hence, the request splitting process should ideally attempt to choose as small chunks as possible, subject to neither cause too much uplink traffic, nor to substantially underutilize the capacity of each available link. The preferable properties are thus:

1. Aim for at most one request per connection per $D_{min}$ of real time. This causes the uplink traffic to be bounded by a value proportional to $N_{target}$ in the worst case.

2. Aim for at most one request per connection every $c_s$·RTT. This causes the activity time of the connection to be at least about $c_s/(c_s+1)$, i.e., close to 1 for moderate $c_s$.

A good choice of $D_{min}$ depends on the use case. Picking it of the order of (but less than) the desired end-to-end delay, usually is the typical duration of a fragment. If the end-to-end delay is to be large, larger buffers can be used, and the ill-effect of larger slices is smaller. On the other hand, on short end-to-end delay, the buffers are small, and hence the slices should be small to avoid the slow connections causing stalls. In that scenario, the higher cost of smaller request is worth the gained stability in the buffer level.

The parameters used can be tuned to according to a profile indicator in the MPD (Media Presentation Description), as that is a summary of the properties of the streamed media to the client. Instead of downloading every media segment and showing them to the end user, the client can choose to "skip" segments based on different use cases from the profile inside the MPD.

A lower bound on the choice of $c_s$ can be devised as follows. If there are N connections open, and the RA is active, there will be about $N \cdot c_s/(c_s+1)$ connections active on the average. In order to ensure that the receive windows of all N connections is in aggregate large enough to sustain the aggregate target rate, it is desirable that $c_w \cdot c_s/(c_s+1)$ is at least 1.

This bound is conservative. The estimated number $N \cdot c_s/(c_s+1)$ of active connections is just an average, not taking into account variance, although it is likely there will be some variance. In practice, it is advantageous to make $c_s$ about two to three times the value that is suggested by the bound above, e.g., when $c_w$=3 and $c_s$=6 then $c_w \cdot c_s/(c_s+1)$ is at least 2.5.

6.2. RA with Forward Error Correction

When data is received over several TCP connections, they sometimes have temporarily differing download rates. When a request of a fragment is split into several subrequests, then the whole fragment is only received when the last subrequest response (chunk) is received. When a fragment needs to be urgently received, this can become a problem, since one of the subrequests may be handled on a slow connection, preventing the fragment from being received quickly.

A content provider may, in addition to the video data, provide additional forward error correction ("FEC") repair data for each fragment, which the client can fetch to help reconstructing the original fragment. For instance, assume a client has 4 connections and needs to urgently receive a fragment of size 4000 bytes. Its Request Accelerator may split the fragment up into 4 ranges of 1000 bytes each and issue one request on each of the 4 connections. It might be that the connections 1 is fast, connection 4 is moderately fast, but that the second and third connections are much slower. So, even if the total download rate is in principle high enough to download the whole fragment in time, it may arrive only very late because connections 2 and 3 are stuck.

To avoid this problem, a client could try to use connections 1 to fetch the same data as connection 2 or 3 does, as soon as it is done with its own subrequest. This can help, but the RA must make a decision on which connection needs more help; whether it is 2 or 3. If it makes the wrong prediction, it may be needlessly downloading duplicate data, and the fragment may still not arrive in time.

A better Request Accelerator may use connection 1 to fetch some repair data instead. The repair (that is FEC coded) data, if downloaded successfully, can be used to reconstruct the missing data, regardless if data from request 2 or 3 is missing. The only constraint is that the amount of data received is enough to reconstruct the fragment. In other words, in our example, the number of repair bytes plus the number of fragment bytes received must be greater-or-equal-than 4000.

In an implementation, the content provider provides access to FEC repair data for the coded video segments. It may make the repair data available in a way similar to the original video data. For example, it may provide, for each media segment file, an additional FEC file containing the repair information. The content provider can provide the necessary information and parameters to use the FEC in a media presentation description. In another implementation, the media presentation description does not contain any information about FEC, but the client can access it using a common convention, such as a rule on how to derive the name of an FEC repair URL from a segment URL.

A client implementation can implement processes on how and when to request repair data. The amount of repair data requested may depend on how much data is outstanding. It may in addition depend on how soon the fragment needs to be available. For example, if there is ample time left, one would hope to receive all the source data in time, so requesting any repair is probably superfluous. On the other hand, if the fragment is becoming urgent, one might want to request a lot of repair data, since a stall is imminent should the client fail to get enough data for that fragment in time. Therefore an implementation can set the amount of repair data requested to be $\beta(B)S$, where S is the amount of outstanding source data, and $\beta(B)$ is a decreasing function of the buffer level.

Another implementation might make the amount of outstanding data proportional to the amount of outstanding data in the most incomplete request, rather than the total amount outstanding.

6.2.1 Embodiment of a Repair Segment Generator

All of the calculations below that would relate to how the DASH standard using FEC, and in particular using RaptorQ for FEC, are preferably performed using fixed-point/integer arithmetic. This includes calculating the number and positions of the source symbols within a fragment of a representation, and calculating the number and positions of the repair symbols for a fragment within the repair segment should be done using fixed-point arithmetic. This is because the exact same result needs to be achieved by the ingestion process that produces the FEC repair fragments from the source segments as the RA process that uses combinations of received FEC repair fragments and source fragments to decode the source fragment, and thus these calculations must have exactly the same outcome. Using floating-point calculations instead of fixed-point arithmetic can produce subtle buggy behavior on occasion that is hard to track down, due to different corner case behavior of different floating-point implementations on different platforms, and would not be acceptable in a standard where both end-points must produce exactly the same result of a calculation.

All other calculations described below that do not involve calculating the number and positions of the repair symbols for a fragment within a repair segment can be done with floating point if desired (although fixed point would also be fine), as there is no dependency between the ingestion and the RA processes to calculate exactly the same results.

The repair segments can be generated in a separate process based on the already processed source segments that include sidx tables. The two inputs to the process, in addition to the source segments themselves, are the repair fraction R and the symbol size S. To facilitate using fixed point arithmetic for the calculations of the number and positions of repair symbols of a repair fragment within a segment, the value of R can be expressed in per mille, i.e., R=500 means that the fraction is ½.

Within each segment, at the beginning of the source segment, there is the segment indexing information, which comprises a time/byte-offset segment map. The time/byte-offset segment map is a list of time/byte-offset pairs (T(0), B(0)), (T(1), B(1)), ..., (T(i), B(i)), ..., (T(n), B(n)), wherein T(i−1) represents a start time within the segment for playback of the i-th fragment of media relative to initial start time of the media amongst all media segments, T(i) represents an end time for the i-th fragment (and thus the start time for the next fragment), and the byte-offset B(i−1) is the corresponding byte index of the beginning of the data within this source segment where the i-th fragment of media starts relative to the beginning of the source segment, and B(i) is the corresponding number of bytes in the segment up to and including the i-th fragment (and thus B(i) is the index of the first byte of fragment i+1). If the segment contains multiple media components, then T(i) and B(i) may be provided for each component in the segment in an absolute way or they may be expressed relative to another media component that serves a reference media component. In any case, B(0) is the start byte index of the first fragment in the segment, which may be greater than zero due to the sidx information that precedes the first fragment in the segment. If B(0) is not zero, there are some repair symbols at the beginning of the repair segment that correspond to the sidx. Depending on the implementation, these first repair symbols may protected the data in the segment up to the beginning of the first fragment, or they may be padded-zero data bytes that are not used.

The repair fraction R might be signaled in the MPD along with the repair segment metadata, or obtained by other means (TBD). As an example of a value for R, if R=500 then the repair segment size is (very closely) approximated as 0.5 times the corresponding size of the source segment from which it is generated, and the size of the size of the repair fragment of the repair segment corresponding to a source fragment within the source segment is also (very loosely) approximated as 0.5 times the size of the source segment. For example, if a source segment contains 1,000 kilobytes of data, then the corresponding repair segment contains approximately 500 kilobytes of repair data.

The value of S may also be signaled in the MPD along with the repair segment metadata, or obtained by other means. For example, S=64 indicates that the source data and the repair data comprises symbols of size 64 bytes each for the purposes of FEC encoding and decoding. The value of S might be chosen to be proportional to the streaming rate of the representation of the associated source segment. For example, if the streaming rate is 100 Kbps then S=12 bytes might be appropriate, whereas if the streaming rate is 1 Mbps then S=120 bytes might be appropriate, and if the streaming rate is 10 Mbps then S=1,200 bytes might be appropriate. One goal might be to have a good trade-off between how granular fragments are partitioned into symbols and the processing requirements for FEC decoding compared to the streaming rate. For example, at a streaming rate of 1 Mbps, and fragments of size around 500 ms, each fragment is around 64 KB of data, and if S=120 then the fragment consists of approximately 500 source symbols, which means that each symbol is around 0.2% of the data needed to recover a source block, which means that the extra reception needed due to the symbol granularity is upper bounded by 0.2% times the number of HTTP connections over which the fragment is being received. For example, if the number of HTTP connections is 6 then the symbol granularity reception overhead is bounded by 1.2%.

The repair segment can be generated for a source segment as follows. Each fragment of the source segment is considered as a source block for FEC encoding purposes, and thus each fragment is treated as a sequence of source symbols of a source block from which repair symbols are generated. The number of repair symbols in total generated for the first i fragments is calculated as TNRS(i)=divceil(R*B(i), S*1000), wherein divceil(I, J) is the function that outputs the smallest integer with a value that is at least I divided by J, i.e., divceil(I, J)=(I+J−1) div J, where div is fixed-point division where the result is rounded down to the nearest integer. Thus, the number of repair symbols generated for fragment i is NRS(i)=TNRS(i)−TNRS(i−1).

The repair segment comprises a concatenation of the repair symbols for the fragments, wherein the order of the repair symbols within a repair segment is in the order of the fragments from which they are generated, and within a fragment the repair symbols are in order of their encoding symbol identifier ("ESI").

Note that by defining the number of repair symbols for a fragment as described above, the total number of repair symbols for all previous fragments, and thus the byte index and byte range for the symbols of repair fragment i only depends on R, S, B(i−1) and B(i), and does not depend on any of the previous or subsequent structure of the fragments within the source segment. This is advantageous because it allows a client to quickly compute the position of the start of a repair block within the repair segment, and also quickly compute the number of repair symbols within that repair block, using only local information about the structure of the corresponding fragment of the source segment from which the repair block is generated. Thus, if a client decides to start downloading and playback of a fragment from the middle of a source segment, it can also quickly generate and access the corresponding repair block corresponding to the fragment from within the corresponding repair segment.

The number of source symbols in the source block corresponding to fragment i is calculated as NSS(i)=divceil(B(i)−B(i−1), S). The last source symbol is padded out with zero bytes for the purposes of FEC encoding and decoding if B(i)−B(i−1) is not a multiple of S, i.e., the last source symbol is padded out with zero bytes so that it is S bytes in size for the purposes of FEC encoding and decoding, but these zero padding bytes are not stored as part of the source segment. In this embodiment, the ESIs for the source symbol are 0, 1, . . . , NSS(i)−1 and the ESIs for the repair symbols are NSS(i), . . . , NSS(i)+NRS(i)−1.

The URL for a repair segment in this embodiment can be generated from the URL for the corresponding source segment by simply adding for example the suffix ".repair" to the URL of the source segment.

The repair segment may also be part of the corresponding source segment, e.g., appended to the end. The structure of a combined segment may also be that the source fragments and repair fragments are consecutive within the combined segment, i.e., the combined segment comprises the first source fragment, followed by the first repair fragment, followed by the second source fragment, followed by the second repair fragment, etc. As one skilled in the art will recognize, the methods and processes described above can be easily adopted to apply to such combined segments.

6.2.2 Embodiment of a Request Accelerator Using Repair Segments

The repair indexing information and FEC information for a repair segment is implicitly defined by the indexing information for the corresponding source segment, and from the values of R and S, where R is expressed as an integer between 0 and 1000 indicating per mille, and S is expressed in bytes. The time offsets and the fragment structure comprising the repair segment are determined by the time offsets and structure of the corresponding source segment. The byte offset to the beginning and end of the repair symbols in the repair segment corresponding to fragment i can be calculated as RB(i−1)=S*divceil(R*B(i−1), S*1000) and RB(i)=S*divceil(R*B(i), S*1000), respectively. The number of bytes in the repair segment corresponding to fragment i is then RB(i)−RB(i−1), and thus the number of repair symbols corresponding to fragment is calculated as NRS(i)=(RB(i)−RB(i−1))/S. (Note that there is no need for a divceil operation here since it is guaranteed that the numerator is a multiple of S, but divceil could be used here and the result would still be correct.) The number of source symbols corresponding to fragment i can be calculated as NSS(i)=divceil(B(i)−B(i−1), S), where the last source symbol is padded with zeroes for decoding purposes if necessary, same as described for encoding. Thus, the repair indexing information for a repair block within a repair segment and the corresponding FEC information can be implicitly derived from R, S and the indexing information for the corresponding fragment of the corresponding source segment.

As an example, consider the example shown in FIG. 35, showing a fragment 2 that starts at byte offset B(1)=6,410 and ends at byte offset B(2)=6,770, i.e., fragment 2 is 6,770−6,410 bytes in size, and 6,770 is the start byte index of fragment 3. In this example, the symbol size is S=64 bytes, and the dotted vertical lines show the byte offsets within the source segment that correspond to multiples of S. The overall repair segment size as a fraction of the source segment size is set to R=500 per mille (repair is approximately ½ of the source) in this example. The number of source symbols in the source block for fragment 2 is calculated as NSS(2)=divceil(6,770−6,410, 64)=(6,770−6,410+64−1)div 64=6, and these 6 source symbols have ESIs 0, . . . , 5, respectively, wherein the first source symbol is the first 64 bytes of fragment 2 that starts at byte index 6,410 within the source segment, the second source symbol is the next 64 bytes of fragment 2 that starts at byte index 6,474 within the source segment, etc. The end byte offset of the repair block corresponding to fragment 2 is calculated as RB(2)=64*divceil(500*6,770, 64*1,000)=64*(3,385,000+64,000−1)div 64,000=64*53=3,392, and the start byte offset of the repair block corresponding to fragment 2 is calculated as RB(1)=64*divceil(500*6,410, 64*1,000)=64*(3,205,000+64,000−1)div 64,000=64*51=3,264, and thus in this example there are two repair symbols in the repair block corresponding to fragment 2 with ESIs 6 and 7, respectively, starting at byte offset 3,264 within the repair segment and ending at byte offset 3,392.

This is illustrated in FIG. 35. Note that, in the example shown in FIG. 35, even though R=500 (repair is approximately ½ of the source) and there are 6 source symbols corresponding to fragment 2, the number of repair symbols is not 3, as one might expect if one simply used the number of source symbols to calculate the number of repair symbols, but instead worked out to be 2. As opposed to simply using the number of source symbols of a fragment to determine the number of repair symbols, the way it is done here makes it possible to calculate the positioning of the repair block within the repair segment solely from the index information associated with the corresponding source block of the corresponding source segment. For this to be a consistent calculation at the ingestion process and within the RA process, it is important that the calculations of the number and positions of the repair symbols for a repair fragment within a repair segment be calculated using fixed-point arithmetic. Furthermore, as the number, K, of source symbols in a source block grows, the number of repair symbols, KR, of the corresponding repair block is closely approximated by K*R/1,000, as in general, KR is at most divceil(K*R, 1,000) and KR is at least divfloor((K−1)*R, 1000), where divfloor(I, J)=I div J.

7. Illustrated Examples

FIG. 25 illustrates a rate selection process. The higher the settings for λ and μ are, the more aggressive the setting is. FIG. 23 illustrates different values for the parameter λ. FIG. 24 illustrates different values for the parameter μ. A hybrid setting tries to reduce the rate fluctuation by two main mechanisms. The first is by being more cautious to increase rate when B is larger, and the second is to try harder to stay at current rate when B is smaller.

Example settings for pker x.y: C=x*min(y*Tdl, B) might be x.y set to 8.1, 4.2, 2.4, 4.4 or other x.y values. Note that pker's actual averaging window is longer than C due to skip of the download suspension period. No skip with EWMA & assume the rate in a download suspension period is the same as that of the last download interval.

For MWA (Moving Window Average), $H(z)=(1/D)*((1-z^{-D})/(1-z^{-1}))$, where D is the window size. $X_i=\min\{R_k: k \geq i\}$ where $R_k$ is the EWMA of the rate with the weight $W_k$ where $W_1 < W_2 < W_3 < \ldots$ . For EWMA, $H(z)=((1-\beta)/(1-\beta z^{-1}))$, where β is the weight of the previous average. MWA and EWMA are roughly equivalent in some cases.

If the adaptive estimator has a longer averaging window, that reduces the rate switch frequency while maintaining about the same average rate for live streaming Different settings work well for different scenarios. The aggressive setting works well for more stationary scenarios, while the less aggressive setting suits more volatile scenarios better. If the bandwidth is higher than the highest representation rate by certain margin for a significant portion of the time (e.g., % of the time when 20-sec average is higher than the rate cap), it is beneficial to go with the more aggressive setting. Ideally, the device should be able to detect the scenario types and apply the appropriate setting. The scenario detection can be based on factors like radio tech type, number of rate changes within certain unit time, moving speed, etc. A simpler strategy can be based on the above observation: use more aggressive setting when the "overall" bandwidth is higher than the rate cap.

8. Setting Rate Selection Parameters

In this section, examples of setting rate selection parameters are provided.

For the MLB, EFF=1−Rv/Rdl, where Rv is the current rate of the representation selected and Rdl is the current download rate. The suggested rule is the following:

---

If EFF < 0, then go down perhaps more than one rate
If 0 <= EFF < 0.1, then go down one rate
If 0.1 <= EFF < 0.6, then stay at the current rate
If 0.6 <= EFF < 0.8, then go up one rate
If 0.8 <= EFF <= 1, then go up perhaps more than one rate
Let alpha = Rv/Rdl. Then this roughly translates into:
If alpha <= 0.4, then go up at least one rate
If 0.4 < alpha <= 0.9, then stay at the same rate
If 0.9 < alpha, then go down at least one rate

---

Putting this into the context of the DASH client rate selection process:

Let RUP be the rate of the representation corresponding to UP, let RDOWN be the rate of the representation corresponding to DOWN, and as above let Rv be the rate of the currently chosen representation. RUP is chosen to be as large as possible so that RUP<=lambda(t)*Rdl, and that RDOWN is chosen to be as large as possible so that RDOWN<=mu(t)*Rdl. The parameter t=B/(D+delta), where B is the current amount of presentation time in the media buffer, D is a bound on the time until the next possible switch point beyond the point where the current decision is being made, and delta is a small parameter that takes into account network latency and round trip times, e.g., delta might be set to 1 second or 2 seconds as an approximation, or delta might be set according to a measured upper bound on the current RTT.

The overall choice of the next rate RNEXT is as follows:
If RUP<Rv then RNEXT=min{Rv, RDOWN} else RNEXT=RUP.

The above MLB parameters can be approximated by setting lambda(t)=0.4*R and mu(t)=0.9 for all t, where R is the ratio of the rate of the next higher representation to that of the rate of the current representation. For example, if the current rate is 500 Kbps, and the next higher rate is 750 Kbps, then R=1.5 and thus lambda(t)=0.6. This approximates the MLB process as follows.

At a decision point, if EFF>=0.6, i.e., alpha<=0.4, then Rv<=0.4*Rdl, in which case RUP will be at least Rv*R (since lambda(t)=0.4*R for all t) and thus RNEXT=RUP, i.e., the rate can go up to the next higher representation at rate Rv*R, and if Rdl is even much larger than 0.4*Rv then RUP is going to be greater than Rv*R (depending on the granularity of representation rates), and RUP will be more than one rate above Rv*R if EFF is for example greater than 0.8. If EFF<0.1 then Rv>0.9*Rdl, in which case RDOWN will be less than Rv (since RDOWN<=0.9*Rdl), and then the rate will go down, i.e., RNEXT<Rv. If EFF is between 0.1 and 0.6 then RUP<=Rv*R and RDOWN>=Rv, in which case RNEXT will be chosen to be equal to Rv.

9. Rate Selection Parameter Sets

The tables below specify some possible rate selection parameter sets. The values of lambda and mu for intermediate values of t not shown in the tables below should be calculated by linearly interpolating between the surrounding values. The values of lambda and mu for values of t beyond those shown in the tables below should be set to the lambda and mu values for the maximum value of t shown.

If the constraints mu(t)<=t and lambda(t)<=t are met for all t, theoretically there would not be a stall in playback, but from a practical point it might be preferable to have a small stall in playback rather than have no stall but continue playing out at a much reduced rate, e.g., jumping from 1 Mbps to 20 Kbps might be a worse experience than jumping from 1 Mbps to 250 Kbps with a 1 second pause in between. A minimum value of lambda and mu is set in the tables of FIG. 36, noting that for values mu(t)>t and/or lambda(t)>t it is likely that a stall will occur (although a stall might occur in any case when the buffer is this empty independent of the settings of lambda (t) and mu(t)).

As has now been explained, a client device can provide for rate adaptation and download processes for adaptive video streaming over HTTP. Clients that stream video over the Internet (and other networks) face a problem of fluctuating bandwidth. If a high-quality video is streamed, the link may not be fast enough at times, causing the player to interrupt and rebuffer. In other cases, low-quality video uses much less bandwidth, but is a lesser user experience. One solution is to adaptively adjust the video quality: Choose a better quality when the throughput is high, automatically switch down.

However, adaptive video streaming poses a number of challenges: (1) the process or algorithm for choosing the video rate (quality) should act quick enough to adapt to rate drops as well as rate increases. At the same time, it should avoid premature or erratic decisions, and avoid unnecessary rate switching decisions. The client should aim at fetching the data at sufficiently high rate so a high video quality can be achieved. At the same time, the download process should ensure that the data is received timely. Each frame should be received in its entirety before it is played out. They should be able to achieve these goals without needing an unnecessarily large playback buffer. Some problems of large buffers are that, for live events, the amount of video in the buffer is limited by the target end-to-end latency, severely limiting the possible playback buffer in these cases. Also, dependence on a large buffer may cause undesirable delays at playback starts or seeks, because the buffer needs to be prefilled. Also, a large playback buffer uses a lot of memory, and that might be scarce in mobile phones and other client devices.

To solve these issues, a process for rate estimation that will react quickly to reception rate changes. A rate estimation can be an adaptive windowed average, specially tailored for use in streaming video. A rate estimator takes into account the video buffer level and the change in video buffer level in a way so to guarantee that the rate adjusts fast enough if there is a need, while keeping the windowing width large (and thus the measurement variance) large. The guarantees provided by the process might be that (a) If B is the amount of video data (in seconds of playback time) in the buffer when a rate drop happens, then the estimator will have adjusted its rate estimate within the time it takes for the buffer to drain to B/2, and (b) if B is the amount of data in the buffer while a rate increase happens, the rate estimator adjusts quickly enough to the new rate so it could in principle be seen within time at most 3*B (provided a smart rate changing process).

A rate decision process can make rate decisions so (a) the buffer is filled, when it is at low levels, (b) uses the buffer to avoid erratically changing rates, even if small download rate estimates are observed, (c) in a steady rate scenario, chooses the correct steady rate quickly. Multimedia download strategies are used for HTTP that (a) allow for accurate rate estimations, (b) are able to achieve the link capacity even if the network delays and packet loss rates are high, and (c) achieve timely delivery of the stream. To achieve this, we can use multiple HTTP connections, decompose media requests into smaller chunk requests, depending on the network conditions, synchronize the connections using the TCP flow control mechanisms, and request data in bursts. We can also use an HTTP pipelining process to keep the connections busy.

A number of features, aspects and details have now been explained. As explained, in various embodiments, method steps can be performed by corresponding programmed elements, instructions provided to a processor, hardware or other apparatus as might be apparent to one of ordinary skill in the art. Likewise, elements might be enabled by processes or program elements. A structure of elements of an embodiment might simply comprise a set of instructions executed by a processor but described herein as a corresponding method step.

In various embodiments, download rate acceleration might or might not be used. An example of download rate acceleration is a method or apparatus that accelerates downloads by using HTTP requests over TCP connections. A TCP connection has a particular window size and the nodes at the ends of the TCP connection can vary the setting for the window size. On novelty is setting the window size for successive HTTP requests where the size is a function of the target download rate. Thus, as the target download rate changes, the TCP window size can change.

In one embodiment, a method and/or apparatus or computer readable media is used for controlling data downloading over a network path between a source and a receiver coupled by the network path, the method comprising, for each of a plurality of TCP connections between the source and the receiver, determining a TCP receiver window size for that TCP connection, wherein a TCP connection between the source and the receiver can be a direct connection or an indirect connection, determining a target download rate for media content, wherein the target download rate varies between at least two values for at least two consecutive HTTP requests, using each TCP connection of the plurality of TCP connections to download a plurality of media data elements of the media content to be downloaded, wherein the media content is a portion or all of a response to a plurality of HTTP requests, wherein the determined TCP receiver window size for a given TCP connection is determined based, at least in part, on the target download rate, and wherein the determined TCP receiver window size varies between at least two values for the at least two consecutive HTTP requests.

The determined TCP receiver window size for a current TCP connection can be determined based, at least in part, on a product of a current estimated round-trip time ("ERTT") for the current TCP connection multiplied by a multiplier rate, wherein the multiplier rate is within a range bounded by the target download rate for the current TCP connection and a rate that is higher than the target download rate by a predetermined amount. The current ERTT can be determined by a measure of a minimum observed RTT over an immediately previous measurement period, such as one second, ten seconds, fifty seconds, etc. The current ERTT can be determined by a measure at an end of a quiescent period, the quiescent period following a download period and being a period wherein no active HTTP requests over the TCP connections have been present for a pre-determined duration time period. The target download rate can be proportional to a current aggregate download rate over all TCP connections used, divided by the number of TCP connections used, such as twice or three times the current aggregate download rate. The target download rate can be proportional to a playback rate of the media content, the playback rate being a rate over an aggregate across all TCP connections used, divided by the number of TCP connections used. Each media data element can be divided into a number of chunks having sizes within a predetermined range of variance, where the number of such chunks is based on the number of TCP connections used. The number of such chunks can be further based on at least one of a current estimated round-trip time ("ERTT") for the current TCP connection, a current download rate, and/or size of a media fragment being requested. The predetermined range of variance can be zero and thus each chunk has the same size per fragment request, and wherein the number of chunks is equal to the number of TCP connections used times a predetermined factor. Each chunk can have a size greater than or equal to a minimum number of bytes. A later HTTP request for a subsequent media data element might be assigned to a first available TCP connection.

Controlling might also include determining a number of TCP connections to use between the source and the receiver, wherein the number is greater than one, and wherein the number of TCP connections to use is determined, at least in part, based on the determined at least one network condition, and using each of the number of TCP connections to download a plurality of media data elements of the media content to be downloaded, wherein the media content is a portion or all of a response to a plurality of HTTP requests. The number of TCP connections used can be based on an estimated round-trip time ("ERTT") for TCP connections, the target download rate, and an estimate of a loss rate. The loss rate can be estimated to be 1% or 0.1%. The number of TCP connections to use can be between two and sixteen, inclusive, and/or proportional to a product of (a) the target download rate, (b) the ERTT, and (c) a square root of an estimated loss rate. For each of the TCP connections, a TCP receiver window size might be determined for that TCP connection based on the target download rate, wherein the determined TCP receiver window size varies between at least two values for the at least two consecutive HTTP requests.

In one embodiment, a method and/or apparatus or computer readable media is used for estimating a download rate that looks to a presentation buffer and makes an estimate of the download rate based on how big/full/empty the buffer is, i.e., where its level is. For example, estimating a download rate at a receiver coupled to data sources by a network path having a finite bandwidth, wherein the download rate is a rate at which data can be received over the network path at the receiver, might comprise monitoring a presentation buffer of the receiver, wherein the presentation buffer stores media data at least between a time the media data is received and a time the media data is consumed by a presentation element associated with the receiver, determining a nonzero estimation period over which an estimate of the download rate is to be based, storing indications of buffer levels over the estimation period, wherein a buffer level at a given time corresponds to how much of the presentation buffer is occupied at that time, at least approximately, by the media data that is received and not yet consumed by the presentation element, and using the stored indications as part of a measure of the estimated download rate.

The presentation element might comprise a display and an audio output. The estimation period might have a duration proportional to a measured buffer level, with a predetermined proportionality factor. The duration of the estimation period might be taken to be proportional to the number of bytes of unconsumed media data in the presentation buffer at a measuring time, and/or a function of an addition rate at which media is added to the presentation buffer, and/or proportional to a time used to download a predetermined portion of the presentation buffer. The predetermined time duration might correspond to a time duration over which a predetermined proportion of the contents of the presentation buffer were downloaded. The estimation period might be the lesser of the time over which a predetermined proportion of the contents of the presentation buffer was downloaded and the presentation time of the media data present in the presentation buffer.

In one embodiment, a method and/or apparatus or computer readable media is used for playback rate selection, wherein the playback rate is the rate at which media is consumed from the presentation buffer, measured in memory units/time, such as megabits/second. When a receiver makes a request for some media, there is a playback rate for that media. Often, but perhaps not always, higher quality media has a higher playback rate and thus presents a trade-off. Which playback rate to use/request is a function, at least at times, of how much media is in the presentation buffer. A receiver might receive media for playing out using a presentation element of the receiver, wherein the playing out results in media being consumed from a presentation buffer at a playback rate and wherein the receiver is configured to select from a plurality of playback rates, comprising monitoring the presentation buffer, wherein the presentation buffer stores media data at least between a time the media data is received and a time the media data is consumed by a presentation element associated with the receiver, storing an indication of a buffer level, wherein the buffer level corresponds to how much of the presentation buffer is occupied by the media data that is received and not yet consumed by the presentation element, determining an estimated download rate, using the stored indication and the estimated download rate to compute a target playback rate, and selecting from among the plurality of playback rates according to the target playback rate.

The selected playback rate can be less than or equal to a predetermined multiplier of the estimated download rate and the predetermined multiplier is an increasing function of the buffer level. The predetermined multiplier can be an affine linear function of a playback time duration of the media data in the presentation buffer, the predetermined multiplier can be less than one when there the buffer level of the presentation buffer is less than a threshold amount. The predetermined multiplier can be greater than or equal to one when the presentation time duration of the media data in the presentation buffer is greater than or equal to a preset maximum amount of presentation time. The predetermined multiplier can be a piecewise linear function of the playback time duration of the media data in the presentation buffer. The selected playback rate can be less than or equal to a predetermined multiplier of the estimated download rate and the predetermined multiplier an increasing function of the number of bytes of media data in the presentation buffer. The playback rate can be selected to be the largest available playback rate of the plurality of playback rates that is less than or equal to a proportional factor times the download rate estimate, where the proportional factor is an increasing function of the playback time duration of the media data in the presentation buffer divided by an estimate of reaction time to rate changes. The reaction time can be an upper bound on presentation time between switch points in the media data and/or the estimate of the reaction time can be an average on presentation time between switch points in the media data. The estimate of the reaction time can be greater than or equal to a predetermined constant times an estimated round-trip time ("ERTT").

A receiver that receives media for playing out using a presentation element of the receiver, wherein the playing out results in media being consumed from a presentation buffer at a playback rate and wherein the receiver is configured to select from a plurality of playback rates, can comprise a method or apparatus for monitoring the presentation buffer, wherein the presentation buffer stores media data at least between a time the media data is received and a time the media data is consumed by a presentation element associated with the receiver, storing an indication of a buffer level, wherein the buffer level corresponds to how much of the presentation buffer is occupied by the media data that is received and not yet consumed by the presentation element, determining an allowed variance of the buffer level, using the stored indication of buffer level and the allowed variance of the buffer level to compute a target playback rate, and selecting from among the plurality of playback rates according to the target playback rate.

The playback rate can be selected based on an upper proportional factor, a lower proportional factor, a download rate estimate, a current playback rate, the buffer level, and an estimate of reaction time to rate changes. The upper proportional factor and the lower proportional factor can both be increasing functions and/or piecewise linear functions of the playback time duration of the media data in the presentation buffer divided by the estimate of the reaction time to rate changes, wherein the upper proportional factor is greater than or equal to the lower proportional factor. The playback rate can be selected to be the same as a previous playback rate when the previous playback rate is between the lower proportional factor times the estimated download rate and the upper proportional factor times the download rate estimate. The playback rate can be selected to be the largest available playback rate that is no larger than the upper proportional factor times the estimated download rate when the previous play back rate is above the upper proportional factor times the download rate estimate. The playback rate can be selected to be the largest available playback rate that is no larger than the lower proportional factor times the estimated download rate when the previous play back rate is below the lower proportional factor times the download rate estimate.

In one embodiment, a method and/or apparatus or computer readable media is used for making requests, but also for determining whether to cancel in process requests. As a receiver makes requests for segments/portions/fragments of media, and receives a response to the request, stores the media from the response and possibly makes another request, it might determine that cancelling a request and issuing a different request might be preferable. The playback rate of the media might be determined by the receiver being the most aggressive and selecting the highest playback rate that it expects to obtain without running out of media in the presentation buffer as it is consumed. Where the download rate unexpectedly falls, the receiver decides whether to cancel its current request and make a new request for lower playback rate media or let the current request play out. Cancelling a high playback rate request and replacing it with a lower playback rate request may result in the contents of the presentation buffer lasting longer, but cancelling a request midstream may cause loss of any partially received media for that request.

In one such embodiment, a receiver receives media for playing out using a presentation element of the receiver, wherein the playing out results in media being consumed from a presentation buffer at a playback rate and wherein the receiver is configured to select from a plurality of playback rates. Determining a request action comprises monitoring the presentation buffer, wherein the presentation buffer stores media data at least between a time the media data is received and a time the media data is consumed by a presentation element associated with the receiver, storing an indication of a buffer level, wherein the buffer level corresponds to how much of the presentation buffer is occupied by the media data that is received and not yet consumed by the presentation element, maintaining a state of an issued request for downloading a selected first chunk of media data, and when an issued request is outstanding, determining, based on network conditions and the state of the issued request, whether to continue the request or cancel the request.

Determining whether to continue the request or cancel the request might comprise determining whether there will be enough time to complete a download for the request before the first media data should be played out, and if there is not enough time, cancelling the request. Determining whether to continue the request or cancel the request might further comprise determining whether there will be enough time to download a higher rate second chunk before either the selected first chunk or the selected second chunk is to be played out, and if there is enough time, cancelling the request and issuing a request for the second chunk. Determining whether to continue the request or cancel the request might further comprise detecting that a stall will occur, based on download rates and media consumption rates, estimating a stall period between a time when the presentation element is unable to consume media data at a rate dictated by the media being consumed and a time when the presentation element is able to resume consuming media data at the rate dictated by the media being consumed, determining an effect a continuation or cancellation would have on the stall period, and if cancelling the request would shorten the stall period, cancelling the request.

Other features might include selecting a second chunk of media data, wherein the second chunk of media data has a start presentation time and that start presentation time is the same start presentation time as the first chunk of media data and requesting a download of the second chunk of media data, selecting a second chunk of media data, wherein the second chunk of media data has a start presentation time and that start presentation time is later than a start presentation time of the first chunk of media data, and requesting a download of the second chunk of media data. The second chunk of media data might be chosen by the receiver so that its start presentation time compared to that of the start presentation time of the first chunk is a lowest difference available to the receiver, and/or so that its playback is a maximum playback rate with a predetermined maximum gap between its start presentation time and the start presentation time of the first chunk of media data.

Some embodiments might include determining whether a download of a remaining portion of the first chunk of media data cannot be completed in time for playback, determining whether a download of the second chunk of media data can be completed in time for playback, and basing the determination of whether to continue the request or cancel the request for the first chunk of media data and instead request the second chunk of media data on whether the download of the remaining portion of the first chunk of media data cannot be completed in time for playback and whether the download of the second chunk of media data can be completed in time for playback. The playback rate of the media data in the second chunk of data might be chosen to be the highest playback rate supported at the receiver. The receiver might request media data covering the presentation time of at least some media data already in the presentation buffer, download the requested media data, play out the requested media data, and discard at least some of the corresponding media data already in the presentation buffer. The playback rate of the requested media data might be a maximum playback rate, subject to a constraint on a maximum presentation time duration of corresponding media data discarded from the presentation buffer. The requested media data might be chosen so that its start presentation time is an earliest start presentation time available to the receiver.

In some receivers, downloading is dependent on the buffer level and the receivers use a concept of a high watermark and a low watermark. In such a receiver, media data is downloaded from a source and stored in a presentation buffer of the receiver. The fill level (or just "level") of the presentation buffer is determined, wherein the fill level represents what portion of the presentation buffer contains media data not yet consumed by a presentation element. If the fill level is above a high fill threshold ("high watermark"), the downloading stops, and if the fill level is below a low fill threshold ("low watermark"), the downloading restarts. The fill level can be updated as media data is consumed by the presentation element. The fill level can be measured in units of memory storage capacity and/or units of presentation time. Downloading can be based on an estimated round-trip time ("ERTT") wherein the ERTT is reset when the media data download is restarted. If downloading occurs over a plurality of TCP connections, a number of TCP connections used can be reset when the media data download is restarted. The high fill and low fill thresholds might vary over time.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method of estimating a download rate at a receiver coupled to data sources by a network path having a finite bandwidth, wherein the download rate is a rate at which data is received over the network path at the receiver, the method comprising:

monitoring a presentation buffer of the receiver, wherein the presentation buffer stores media data at least between a time the media data is received and a time the media data is consumed by a presentation element associated with the receiver;

determining a buffer level of the presentation buffer;

determining, as a function of the determined buffer level, a duration of a nonzero estimation period over which an estimate of the download rate is to be based, wherein the duration of the estimation period is decreased when the determined buffer level is below a low threshold, and wherein the duration of the estimation period is increased when the determined buffer level is above a high threshold;

storing indications of buffer levels over the estimation period, wherein a buffer level at a given time corresponds to an amount of the presentation buffer occupied at the given time by the media data received and not yet consumed by the presentation element; and using the stored indications as part of a measure of the estimated download rate.

2. The method of claim 1, wherein the presentation element comprises a display and an audio output.

3. The method of claim 1, further comprising determining the duration of the estimation period to be proportional to the determined buffer level, with a predetermined proportionality factor.

4. The method of claim 1, further comprising determining the duration of the estimation period to be proportional to a number of bytes of unconsumed media data in the presentation buffer at a measuring time.

5. The method of claim 1, further comprising determining the duration of the estimation period as, at least in part, a function of an addition rate at which media is added to the presentation buffer.

6. The method of claim 1, further comprising determining the duration of the estimation period to be proportional to a time in use to download a predetermined portion of the presentation buffer.

7. The method of claim 6, wherein the estimated download rate is an average download rate over a previous duration of time equal to the estimation period.

8. The method of claim 1, further comprising determining the duration of the estimation period to be lesser of a time over which a predetermined proportion of contents of the presentation buffer was downloaded and a presentation time of the media data present in the presentation buffer.

9. The method of claim 8, wherein the estimated download rate is an average download rate over a previous duration of time equal to the estimation period.

10. Non-transitory computer readable media comprising program code for execution by a processor for estimating a download rate at a receiver coupled to data sources by a network path having a finite bandwidth, wherein the download rate is a rate at which data is received over the network path at the receiver, the program code comprising:

program code for monitoring a presentation buffer of the receiver, wherein the presentation buffer stores media data at least between a time the media data is received and a time the media data is consumed by a presentation element associated with the receiver;

program code for determining a buffer level of the presentation buffer;

program code for determining, as a function of the determined buffer level, a duration of a nonzero estimation period over which an estimate of the download rate is to be based, wherein the duration of the estimation period is decreased when the determined buffer level is below a low threshold, and wherein the duration of the estimation period is increased when the determined buffer level is above a high threshold;

program code for storing indications of buffer levels over the estimation period, wherein a buffer level at a given time corresponds to an amount of the presentation buffer occupied at the given time by the media data received and not yet consumed by the presentation element; and program code for using the stored indications as part of a measure of the estimated download rate.

11. The non-transitory computer readable media of claim 10, further comprising program code to interface to a display and an audio output.

12. The non-transitory computer readable media of claim 10, further comprising program code to calculate the duration of the estimation period over which the download rate is measured to be proportional to the determined buffer level, with a predetermined proportionality factor.

13. The non-transitory computer readable media of claim 10, further comprising program code to calculate the duration of the estimation period to be proportional to a number of bytes of unconsumed media data in the presentation buffer at a measuring time.

14. The non-transitory computer readable media of claim 10, further comprising program code to calculate the duration of the estimation period, at least in part, as a function of an addition rate at which media is added to the presentation buffer and/or proportional to a time used to download a predetermined portion of the presentation buffer.

15. The non-transitory computer readable media of claim 14, wherein the estimated download rate is an average download rate over a previous duration of time equal to the estimation period.

16. The non-transitory computer readable media of claim 10, wherein the estimation period is the lesser of a time over which a predetermined proportion of contents of the presentation buffer was downloaded and a presentation time of the media data present in the presentation buffer.

17. The non-transitory computer readable media of claim 16, wherein the estimated download rate is an average download rate over a previous duration of time equal to the estimation period.

* * * * *